(12) United States Patent
Maruyama et al.

(10) Patent No.: US 7,583,342 B2
(45) Date of Patent: Sep. 1, 2009

(54) OPTICAL RESIN FILM AND POLARIZING FILM AND LIQUID CRYSTAL DISPLAY DEVICE USING THE SAME

(75) Inventors: Yoichi Maruyama, Minami-Ashigara (JP); Yukito Saitoh, Minami-Ashigara (JP); Yoshiaki Hisakado, Minami-Ashigara (JP); Susumu Sugiyama, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 491 days.

(21) Appl. No.: 11/504,690

(22) Filed: Aug. 16, 2006

(65) Prior Publication Data

US 2007/0046864 A1 Mar. 1, 2007

(30) Foreign Application Priority Data

Aug. 17, 2005 (JP) ............................. 2005-236753
Mar. 10, 2006 (JP) ............................. 2006-066459

(51) Int. Cl.
*G02F 1/1335* (2006.01)
*G02B 5/30* (2006.01)

(52) U.S. Cl. .................................... 349/117; 359/500
(58) Field of Classification Search ............... 349/117; 359/500
See application file for complete search history.

(56) References Cited

U.S. PATENT DOCUMENTS

| 2002/0015807 A1 | 2/2002 | Sugino et al. | |
| 2004/0241344 A1* | 12/2004 | Kawanishi et al. | 428/1.1 |
| 2005/0260392 A1 | 11/2005 | Sugino et al. | |
| 2006/0050388 A1 | 3/2006 | Kim et al. | |

FOREIGN PATENT DOCUMENTS

| CN | 1334557 A | 2/2002 |
| JP | 62-210423 A | 9/1987 |
| JP | 3027805 B2 | 1/2000 |
| JP | 3330574 B2 | 7/2002 |
| JP | 2003-279730 A | 10/2003 |
| WO | WO 2004/070463 A1 | 8/2004 |

\* cited by examiner

*Primary Examiner*—Jerry T Rahll
(74) *Attorney, Agent, or Firm*—Buchanan Ingersoll & Rooney PC

(57) ABSTRACT

An optical resin film, which has Re ($\lambda$) and Rth ($\lambda$) satisfying retardation requirements (A) to (D), and has an in-plane width direction retardation (Re) variation coefficient of 5% or less and a thickness direction retardation (Rth) variation coefficient of 10% or less: (A) $0.1 < Re(450)/Re(550) < 0.95$ (B) $1.03 < Re(650)/Re(550) < 1.93$ (C) $0.4 < (Re/Rth(450))/(Re/Rth(550)) < 0.95$ (D) $1.05 < (Re/Rth(650)/(Re/Rth(550)) < 1.9$, and a polarizing plate and a liquid crystal display device using the optical resin film.

8 Claims, 7 Drawing Sheets

OPTICAL RESIN FILM AND POLARIZING FILM AND LIQUID CRYSTAL DISPLAY DEVICE USING THE SAME

BACKGROUND OF THE INVENTION

1. Field of the Invention

The present invention relates to an optical resin film and a polarizing plate and a liquid crystal display device comprising same.

2. Description of the Related Art

Liquid crystal display devices have been widely used for monitor for personal computer and cellular phone, television, etc. because they are advantageous in that they can operate at low voltage with low power consumption and are available in small size and thickness. These liquid crystal display devices have been proposed in various modes depending on the alignment of liquid crystal molecules in the liquid crystal cell. To date, TN mode, in which liquid crystal molecules are aligned twisted at about 90 degrees from the lower substrate to the upper substrate of the liquid crystal cell, has been a mainstream.

A liquid crystal display device normally comprises a liquid crystal cell, an optical compensation sheet and a polarizer. The optical compensation sheet is used to eliminate undesirable coloring of image or expand the viewing angle. As such an optical compensation sheet there is used a stretched birefringent film or a transparent film coated with a liquid crystal. For example, JP-A-62-210423 discloses a technique for the expansion of the viewing angle involving the application to a TN mode liquid crystal cell of an optical compensation sheet obtained by spreading a discotic liquid crystal over a triacetyl cellulose film, and then orienting and fixing the coat layer. However, liquid crystal display devices for TV use which are supposed to give a wide screen image that can be viewed at various angles have severe requirements for dependence on viewing angle. These requirements cannot be met even by the aforementioned approach. To this end, liquid crystal display devices of modes different from TN mode, including IPS (In-Plane Switching) mode, OCB (Optically Compensatory Bend) mode, VA (Vertically Aligned) mode, have been under study. In particular, VA mode has been noted as liquid crystal display device for TV use because it gives a high contrast image and can be produced in a relatively high yield.

Despite its capability of attaining substantially full black display in the direction along the line normal to panel, VA mode liquid crystal display devices have been disadvantageous in that when the panel is viewed in oblique direction, light leakage occurs, causing the reduction of viewing angle. In order to solve this problem, it has been proposed that a retardation plate having a refractive anisotropy nx=ny>nz be provided at least one of the gaps between the liquid crystal layer and the polarizing plates to eliminate light leakage (as disclosed in JP-A-62-210423). It has also been proposed that a first retardation plate having a positive refractive anisotropy nx>ny=nz and a second retardation plate having a negative refractive anisotropy nx=ny>nz be used in combination to eliminate light leakage (as disclosed in Japanese Patent No. 3,027,805). It has further been proposed that an optically biaxial retardation plate having a refractive anisotropy nx>ny>nz be used to enhance the viewing angle properties of VA mode liquid crystal display device (as disclosed in Japanese Patent No. 3,330,574). The symbols nx, ny and nz represent the refractive index of the aforementioned retardation plate in X axis direction, Y axis direction and Z axis direction, respectively. The aforementioned X axis direction is an axis direction along which the aforementioned retardation plate shows the maximum refractive index in the in-plane direction. The aforementioned Y axis direction is an axis direction perpendicular to the aforementioned X axis direction in the aforementioned plane. The aforementioned Z axis direction indicates the thickness direction perpendicular to the aforementioned X axis direction and the aforementioned Y axis direction.

However, these approaches merely allow the elimination of light leakage with respect to a certain wavelength range (e.g., green light in the vicinity of 550 nm) but don't take into account light leakage in other wavelength ranges (e.g., blue light in the vicinity of 450 nm, red light in the vicinity of 650 nm). Accordingly, these approaches leave something to be desired in the solution to so-called color shift, that is, coloration with blue or red developed when viewed obliquely during black display.

SUMMARY OF THE INVENTION

The invention has been worked out under these circumstances. An aim of the invention is to provide an optical resin film which exhibits a high contrast ratio over a wide range and can inhibit color shift and a polarizing plate and a liquid crystal display device comprising same.

These aims are accomplished by the following constitutions.

(1) An optical resin film, which has Re ($\lambda$) and Rth ($\lambda$) satisfying retardation requirements (A) to (D), and has an in-plane width direction retardation (Re) variation coefficient of 5% or less and a thickness direction retardation (Rth) variation coefficient of 10% or less:

(A) $0.1 < Re(450)/Re(550) < 0.95$
(B) $1.03 < Re(650)/Re(550) < 1.93$
(C) $0.4 < (Re/Rth(450))/(Re/Rth(550)) < 0.95$
(D) $1.05 < (Re/Rth(650))/(Re/Rth(550)) < 1.9$ wherein Re ($\lambda$) represents an in-plane retardation value of the optical resin film with respect to light having a wavelength of $\lambda$ nm;

Rth ($\lambda$) represents a thickness direction retardation value of the optical resin film with respect to light having a wavelength of $\lambda$ nm; and Re/Rth ($\lambda$) represents a ratio of an in-plane retardation value to a thickness direction retardation value of the optical resin film with respect to light having a wavelength of $\lambda$ nm (unit: nm).

(2) The optical resin film as described in (1) above, which comprises a cellulose acylate film.

(3) The optical resin film as described in (1) or (2) above, which comprises at least one selected from the group consisting of plasticizer, ultraviolet absorber, peel accelerator, dye and matting agent.

(4) The optical resin film as described in any of (1) to (3) above, which comprises at least one retardation developer comprising a rod-shaped compound or a discotic compound.

(5) A polarizing plate comprising:

a polarizer having a polyvinyl alcohol; and at least two protective films provided on both sides of the polarizer, wherein at least one of the at least two protective films is an optical resin film as described in any of (1) to (4) above.

(6) The polarizing plate as described in (5) above, which further comprises at least one layer selected from the group consisting of a hard coat layer, an anti-glare layer and an anti-reflection layer provided on a surface of one of the at least two protective films.

(7) The polarizing plate as described in (5) or (6) above, which further comprises an optically anisotropic layer provided on at least one of the at least two protective films.

(8) A liquid crystal display device comprising a polarizing plate as described in any of (5) to (7) above.

DETAILED DESCRIPTION OF THE INVENTION

Figure 1:
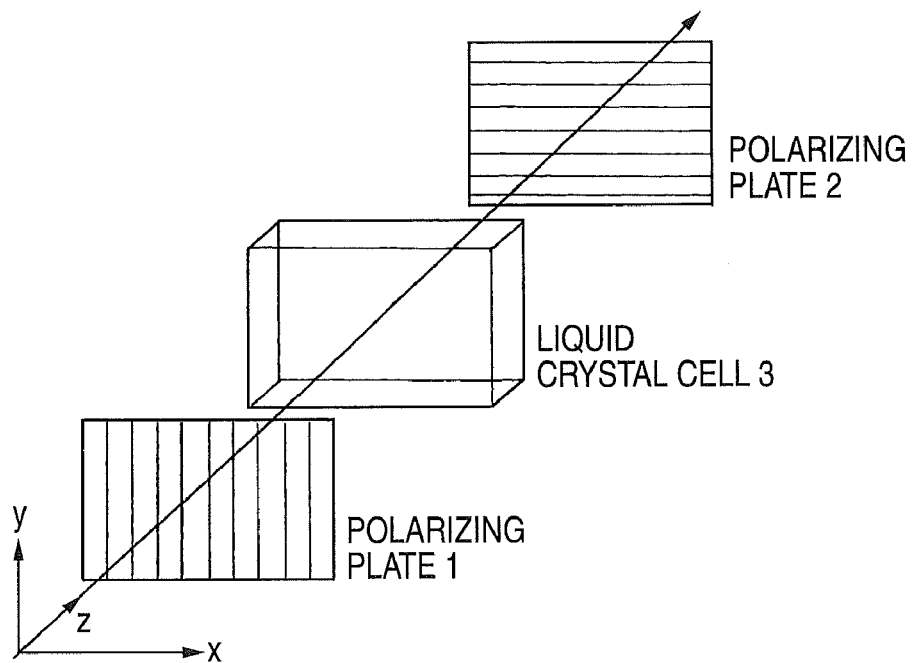
FIG. 1 is a schematic diagram illustrating an example of the configuration of a related art VA mode liquid crystal display device.

The effect of the invention will be described in connection with the attached drawings. FIG. 1 is a diagrammatic view illustrating the configuration of an ordinary VA mode liquid crystal display device. A VA mode liquid crystal display device comprises a liquid crystal cell 3 having a liquid crystal layer which causes liquid crystal molecules to align vertically with respect to the surface of the substrate when no voltage is applied thereto, i.e., during black display and polarizing plates 1 and 2 aligned with the liquid crystal cell 3 interposed therebetween and their transmission axes (shown by the stripes in FIG. 1) disposed perpendicular to each other. In FIG. 1, light is incident on the liquid crystal display device on the polarizing plate 1 side thereof. When light propagating in the direction normal to the surface of the polarizing plate 1, i.e., z axis direction is incident on the liquid crystal display device, the light beam transmitted by the polarizing plate 1 passes through the liquid crystal cell 3 while being linearly polarized, and then is fully blocked by the polarizing plate 2. As a result, an image having a high contrast can be displayed.

Figure 2:
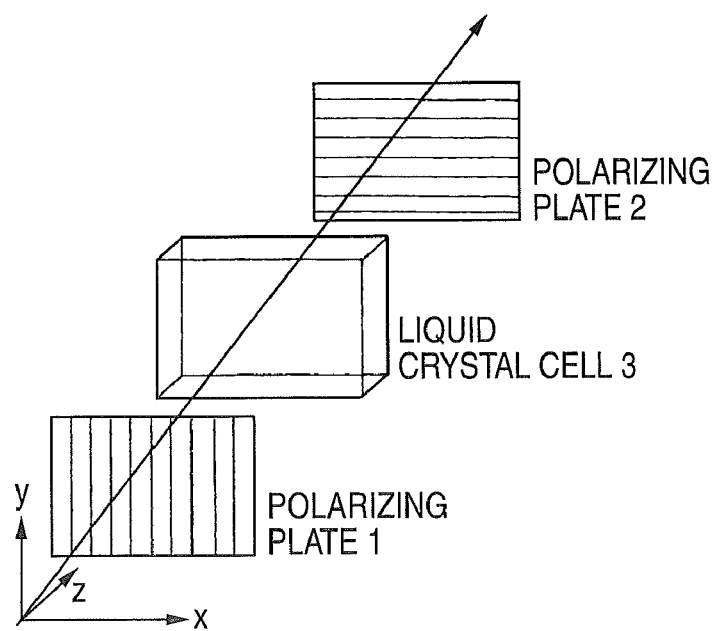
FIG. 2 is a schematic diagram illustrating another example of the configuration of a related art VA mode liquid crystal display device.

As shown in FIG. 2, however, oblique incidence of light behaves unlike the normal incidence. Light which is incident on the liquid crystal display device in an oblique direction which is not z axis direction, i.e., direction oblique to the polarizing direction of the polarizing plates 1 and 2 (so-called OFF AXIS), is affected by an oblique retardation to show a change of polarization when it is transmitted by the vertically aligned liquid crystal layer of the liquid crystal cell 3. Further, the apparent transmission axis of the polarizing plates 1 and 2 are deviated from perpendicular alignment. Due to the two causes, light incident in the oblique direction in OFF AXIS cannot be fully blocked by the polarizing plate 2, causing light leakage during black display and hence contrast drop.

The polar angle and the azimuthal angle will be defined as follows. The polar angle is the angle of tilt from the direction normal to the surface of the film, i.e., z axis in FIGS. 1 and 2. For example, the direction normal to the surface of the film has a polar angle of 0°. The azimuthal angle indicates the direction of the line rotated clockwise from the positive direction of x axis. For example, the positive direction of x axis has an azimuthal angle of 0°. The positive direction of y axis has an azimuthal direction of 90°. The aforementioned oblique directions in OFF AXIS mainly include those having a polar angle which is not 0° and an azimuthal angle of 45°, 135°, 225° and 315°.

Figure 3:
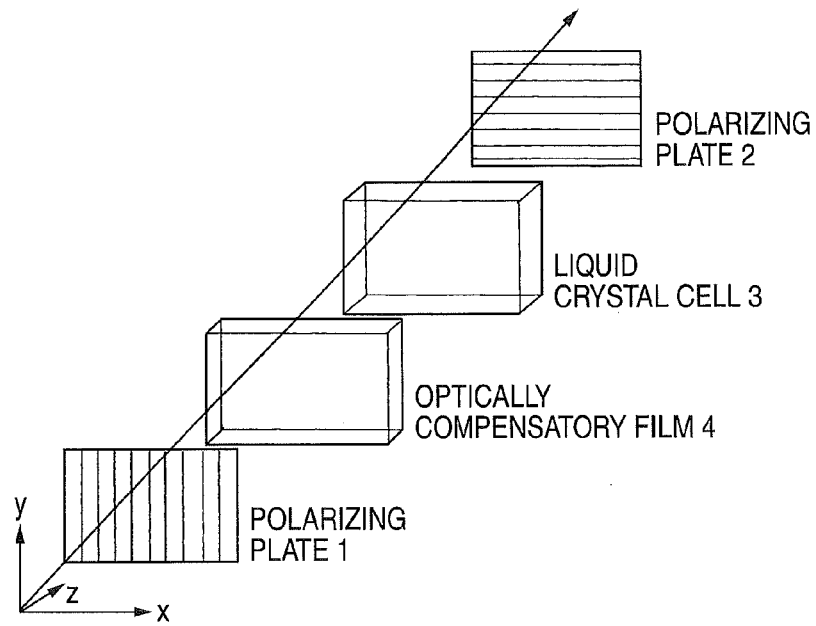
FIG. 3 is a schematic diagram illustrating an example of the configuration of a liquid crystal display device of the invention.

FIG. 3 depicts a diagrammatic view of an example of configuration for illustrating the effect of the invention. The configuration of FIG. 3 is the same as that of FIG. 1 except that an optical resin film (hereinafter also referred to as "optically compensatory film") 4 is provided interposed between the liquid crystal cell 3 and the polarizing plate 1. As previously mentioned, the optically compensatory film 4 satisfies the following relationships:

(A) $0.1 < Re(450)/Re(550) < 0.95$
(B) $1.03 < Re(650)/Re(550) < 1.93$
(C) $0.4 < (Re/Rth(450))/(Re/Rth(550)) < 0.95$
(D) $1.05 < (Re/Rth(650))/(Re/Rth(550)) < 1.9$

In accordance with the invention, the use of an optically compensatory film having the aforementioned optical properties makes it possible to optically compensate R, G and B light which are incident obliquely with slow axis and retardation which vary with wavelength. As a result, as compared with the related art liquid crystal display devices, the viewing angle contrast during black display can be drastically improved and the coloration in the viewing direction during black display can be drastically eliminated. In the specification, the wavelength of R, G and B light are 650 nm, 550 nm and 450 nm, respectively. The wavelength of R, G and B light are not necessarily represented by these values. However, these wavelength values are thought to be suitable for the definition of optical properties by which the effect of the invention can be exerted.

Figure 4:
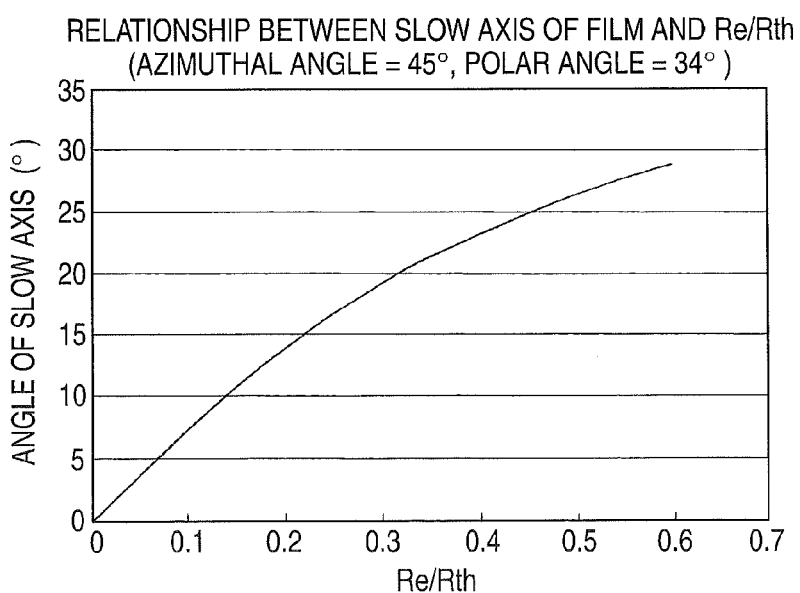
FIG. 4 is a graph illustrating the optical properties of an example of the optically compensatory film to be used in the invention.

In the invention, Re/Rth, which is the ratio of Re to Rth, is particularly noted. This is because the value of Re/Rth determines the two intrinsic polarizing axes along which light propagates through a biaxial birefringent medium in oblique direction. FIG. 4 depicts an example of the result of calculation of the relationship between the direction of one of the two intrinsic polarizing axes and Re/Rth developed when light is obliquely incident on the optically compensatory film to be used in the invention. In this calculation, it is supposed that the direction of propagation of light is at an azimuthal angle of 45° and a polar angle of 34°. As can be seen in the results shown in FIG. 4, once Re/Rth is determined, one of the intrinsic polarizing axes is determined. How the incident light changes in its polarization as it passes through the optically compensatory film is mainly determined by the orientation of the in-plane slow axis of the optically compensatory film and the retardation of the optically compensatory film. In the invention, Re/Rth relationship is defined for R, G and B wavelengths to optimize both the in-plane slow axis and retardation, which are factors that mainly determine the change of polarization, for R, G and B wavelengths. As a result, even when there are two factors, i.e., effect of oblique retardation of liquid crystal layer on obliquely incident light and deviation of apparent transmission axis of polarizing plates 1 and 2, complete compensation by one optically compensatory film is allowed, making it possible to eliminate contrast drop. This means that when the parameter of the film is determined with R, G and B representing all the visible light ranges, substantially complete compensation can be made over the entire visible light range.

A VA mode liquid crystal display device has its liquid crystal molecules vertically aligned when no voltage is applied thereto, i.e., during black display. Accordingly, it is preferred that the in-plane slow axis of the optically compensatory film 4 be disposed perpendicular or parallel to the polarizing plate 1 or the polarizing plate 2 so that the polarization of light incident in the direction along the normal line cannot be affected by the retardation of the optically compensatory film 4 during black display. An optically compensatory film may be provided also between the polarizing plate 2 and the liquid crystal cell 3. In this case, too, the in-plane slow axis of the optically compensatory film is preferably disposed perpendicular or parallel to the polarizing plate 1 or the polarizing plate 2.

Figure 5:
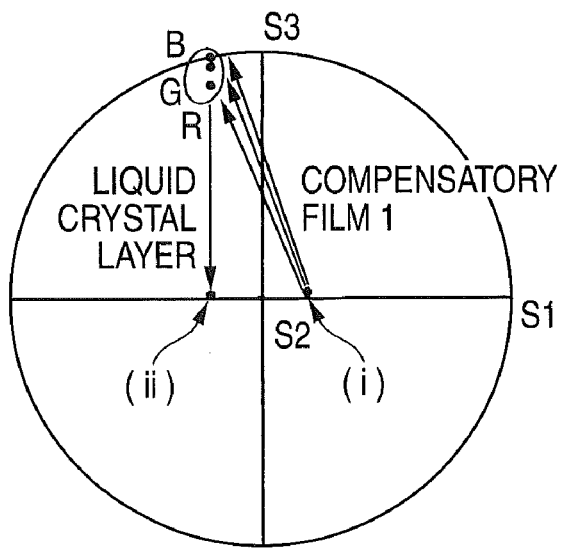
FIG. 5 is a schematic diagram of Poincaré sphere used to explain the change of polarization of light incident on a liquid crystal display device of the invention.

FIG. 5 depicts a diagram illustrating the compensating mechanism in the configuration of FIG. 3 using a Poincaré sphere. In this diagram, the propagation of light is at an azimuthal angle of 45° and a polar angle of 34°. In FIG. 5, S2 axis is an axis extending in the direction perpendicular to paper as viewed on the drawing. FIG. 5 is a diagram of Poincaré sphere as viewed from the positive side of S2 axis. Since FIG. 5 is shown two-dimensionally, the displacement of points due to the change of polarization is represented by the straight line arrow in the drawing. Actually, the change of polarization developed when light passes through the liquid crystal layer or optically compensatory film is represented by the rotation around a specific axis determined according to respective optical properties at a specific angle on Poincaré sphere.

The polarization of incident light passing through the polarizing plate 1 in FIG. 3 corresponds to the point (i) in FIG. 5. The polarization of light blocked by the absorption axis of the polarizing plate 2 in FIG. 3 corresponds to the point (ii) in FIG. 5. In a related art VA mode liquid crystal display device, OFF AXIS light leakage in oblique direction is attributed to the deviation of these points (i) and (ii). An optically compensatory film is normally used to cause the polarization of incident light to change from the point (i) to the point (ii), including the change of polarization in the liquid crystal layer. The liquid crystal layer of the liquid crystal cell 3 exhibits a positive refractive anisotropy and is vertically aligned. Accordingly, the change of polarization of incident light developed when light passes through the liquid crystal layer is shown by the arrow extending downward in FIG. 5 and is represented by the rotation around S1 axis. Accordingly, in order that the visible light which has passed through the liquid crystal layer might be fully blocked by the polarizing plate 2, the starting point of rotation must be on the line developed by the rotation of the point (ii) around S1 axis for each of R, G and B. Further, since the angle of rotation is proportional to the value $\Delta n'd'/\lambda$ obtained by dividing the effective retardation $\Delta n'd'$ of the liquid crystal layer in oblique direction by wavelength, the angle of rotation is not the same at the various wavelength ranges R, G and B. Accordingly, in order that all the polarization of R, G and B might reach the point (ii) after rotation, it is necessary that the polarization of R, G and B before rotation be on the line developed by the rotation of the point (ii) around S1 axis according to the respective angle of rotation as shown in FIG. 5. In the invention, in order that the polarization of R, G and B light which has passed through the optically compensatory film 4 and been ready to pass through the liquid crystal cell 3 might be as mentioned above, an optically compensatory film arranged such that Re/Rth of R, G and B satisfy a predetermined relationship is provided to effect optical compensation.

Figure 6:
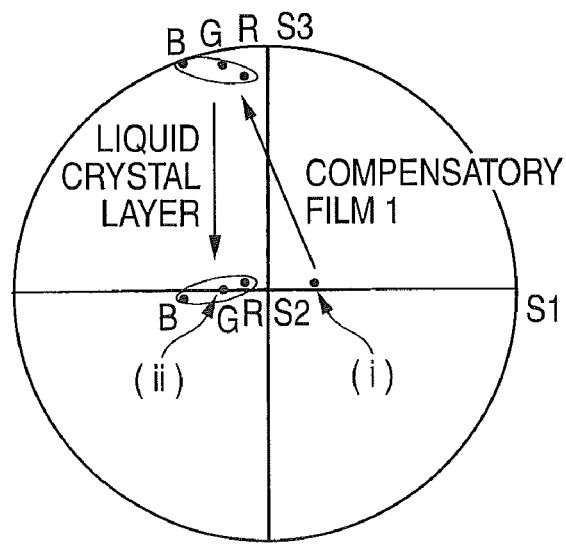
FIG. 6 is a schematic diagram of Poincaré sphere used to explain the change of polarization of light incident on an example of a related art liquid crystal display device.

On the other hand, an example of the related art configuration is similarly shown in FIG. 6. The example shown in FIG. 6 concerns the use of an optically compensatory film having a constant Re/Rth with respect to wavelength. In this case, even when the optical properties of the optically compensatory film on G light is adjusted such that the starting point of rotation by the liquid crystal layer is on the line developed by the rotation of the point (ii) around S1 axis, the starting point of rotation for R and B light cannot be disposed on the same line. Accordingly, R and B light which have passed through the liquid crystal layer cannot change with the polarization of the point (ii) and thus cannot be fully blocked by the absorption axis of the polarizing plate. As a result, the leakage of R and B light occurs, causing color shift during black display. Even when an optically compensatory film optimized only for R and B light is used, similar troubles can occur.

The invention is characterized by the provision of a film with optical properties that the wavelength dispersion of retardation differs from light incident in the direction along the normal line to light incident in oblique direction, e.g., at a polar angle of 60° and the positive use of such a film in optical compensation. The scope of the invention is not limited to the display mode of liquid crystal layer. The invention can be used for liquid crystal display devices having a liquid crystal layer of any display mode such as VA, IPS, ECB, TN and OCB modes.

The optical resin film (optically compensatory film) of the invention will be further described hereinafter with reference to their optical properties, raw materials, production methods, etc.

In the case where the numerical value indicates physical property value, characteristic value or the like, the term "(numerical value 1) to (numerical value 2)" as used herein is meant to indicate "not smaller than (numerical value 1) to not greater than (numerical value 2)". Further, the term "(meth) acrylate" as used herein is meant to indicate "at least any of acrylate and methacrylate". This can apply to "(meth)acrylic acid", etc.

[Optically Compensatory Film]

The optically compensatory film of the invention contributes to expand the viewing angle contrast of liquid crystal display devices, particularly of VA mode, and eliminate color difference of these liquid crystal display devices dependent on the viewing angle. The optically compensatory film of the invention may be disposed either or both in between the viewer side polarizing plate and liquid crystal cell and in between the back side polarizing plate and liquid crystal cell. For example, the optically compensatory film of the invention may be incorporated as an independent member in the interior of the liquid crystal display device. Alternatively, the protective film for protecting the polarizing film in the optically compensatory film may be provided with optical properties so that the optically compensatory film can act also as a transparent film that is incorporated in the interior of liquid crystal display device as a member of the polarizing plate.

As mentioned above, the optically compensatory film of the invention satisfies the following relationships:
- (A) 0.1<Re (450)/Re (550)<0.95;
- (B) 1.03<Re (650)/Re (550)<1.93;
- (C) 0.4<(Re/Rth (450))/(Re/Rth (550)))<0.95; and
- (D) 1.05<(Re/Rth (650)/(Re/Rth (550))<1.9, more preferably
- (A) 0.3<Re (450)/Re (550)<0.9
- (B) 1.05<Re (650)/Re (550)<1.8
- (C) 0.6<(Re/Rth (450))/(Re/Rth (550)))<0.8
- (D) 1.2<(Re/Rth (650)/(Re/Rth (550))<1.7

Re/Rth in R, G and B each preferably fall within a range of from 0.1 to 0.8.

The thickness-direction retardation (Rth) of the entire optically compensatory film is preferably predetermined to cancel the retardation of the liquid crystal layer. Accordingly, the preferred range of the thickness-direction retardation (Rth) of the entire optically compensatory film varies with the embodiment of the various liquid crystal layers. For example, in the case where the optically compensatory film of the invention is used for the optical compensation of a VA mode liquid crystal cell (e.g., VA mode liquid crystal cell having a product $\Delta n \cdot d$ of from 0.2 μm to 1.0 μm wherein d is the thickness of the liquid crystal cell (μm) and $\Delta n$ is the refractive anisotropy of the liquid crystal cell), the thickness-direction retardation (Rth) of the entire optically compensatory film is preferably from 70 nm to 400 nm, more preferably from 100 nm to 400 nm, even more preferably from 100 nm to 300 nm. Re retardation value of the optically compensatory film is not specifically limited but is normally from 20 nm to 150 nm, preferably from 20 nm to 70 nm, more preferably from 30 nm to 70 nm. Further, the thickness of the optically compensatory film is not specifically limited but is 110 μm or less, preferably from 40 μm to 110 μm, more preferably from 60 μm to 110 μm, even more preferably from 80 μm to 110 μm.

The optically compensatory film has three average refractive indexes nx, ny and nz in the x, y and z axis directions, which are perpendicular to each other, respectively. The three values are refractive indexes characteristic to the optically compensatory film. Rth and Re are determined by these values and the thickness $d_1$ of the film. Accordingly, by properly selecting the raw materials, the added amount of these raw materials, the production conditions, etc. and adjusting these factors within desired ranges, an optically compensatory film that satisfies the aforementioned optical requirements can be prepared. Since nx, ny and nz vary with wavelength, Rth and Re, too, vary with wavelength. The aforementioned optically compensatory film can be prepared by making the use of these characteristics.

In the invention, the material of the optically compensatory film is not specifically limited. For example, the optically compensatory film may be a stretched birefringent polymer film or an optically anisotropic layer formed by fixing a liquid crystal compound specifically aligned. Further, the optically compensatory film is not limited to single layer structure and may have a laminated structure having a plurality of layers laminated on each other. In the embodiment of laminated structure, the material of the various layers may not be the same. For example, a laminate of a polymer film with an optically anisotropic layer made of a liquid crystal compound may be used.

In the case where a liquid crystal compound is used to prepare the aforementioned optically compensatory film, the optically anisotropic layer prepared by fixing a liquid crystal compound specifically aligned exhibits desired optical properties when used in the form of single layer or a laminate of a plurality of layers because the liquid crystal compound has various alignment embodiments. In some detail, the aforementioned optically compensatory film may be in a form having a support and one or more optically anisotropic layers formed on the support. The retardation of this form of an optically compensatory film as a whole can be adjusted by the optical anisotropy of the optically anisotropic layer. Liquid crystal compounds can be classified as rod-shaped liquid crystal compound and discotic liquid crystal compound by the shape of the molecule. These liquid crystal compounds each are of low molecular type or polymer type. Any of these types of liquid crystal compounds may be used. In the case where a liquid crystal compound is used to prepare the aforementioned optically compensatory film, a rod-shaped liquid crystal compound or discotic liquid crystal compound is preferably used. More preferably, a rod-shaped liquid crystal compound having a polymerizable group or a discotic liquid crystal compound having a polymerizable group is used.

The optically compensatory film may be made of a polymer film. The polymer film may be a stretched polymer film. As the material of the polymer film there is normally used a synthetic polymer (e.g., polycarbonate, polysulfone, polyether sulfone, polyacrylate, polymethacrylate, norbornene resin, triacetyl cellulose). A cellulose acylate-based film obtained by film-forming a composition having a rod-shaped compound having an aromatic ring (that is, aromatic compound having two aromatic rings) incorporated in cellulose acylate is also preferred. By properly adjusting the kind and added amount of the aromatic compound and the film stretching conditions, a polymer film having desired optical properties can be prepared.

(Retardation Distribution)

In the invention, the coefficient of variation of crosswise in-plane retardation (Re) of the optically compensatory film is preferably 5% or less, more preferably 3% or less, even more preferably 2% or less. The coefficient of variation of thickness-direction retardation (Rth) of the optically compensatory film is preferably 10% or less, more preferably 8% or less, even more preferably 5% or less.

The aforementioned value of retardation distribution is represented by the coefficient of variation of retardation values measured at a crosswise interval of 1 cm on the film obtained.

(Method for Measuring Retardation)

Using a Type KOBRA21ADH automatic birefringence meter (produced by Ouji Scientific Instruments Co., Ltd.), the film sample was measured for three-dimensional birefringence at a crosswise interval of 1 cm at a wavelength of 590 nm in an atmosphere of 25° C. and 60% RH. Re and Rth thus measured were then subjected to calculation by the following equation to determine coefficient of variation (CV).

Coefficient of variation (CV)=Standard deviation/ average retardation×100

(Wavelength Dispersion Properties)

Using a Type KOBRA21ADH automatic birefringence meter (produced by Ouji Scientific Instruments Co., Ltd.), the film sample was measured for three-dimensional birefringence at a wavelength of 450 nm, 550 nm and 650 nm in an atmosphere of 25° C. and 60% RH. The retardation value s thus obtained were used as Re (450), Re (550) and Re (650), respectively.

[Production Method]

The production of the film of the invention is preferably carried out by the following production method 1 or production method 2.

A production method involving both the production method 1 and production method 2 is also preferred.

The production methods 1 and 2 which is preferably used in the invention will be further described hereinafter.

(Production Method 1)

In order to prepare a film having a small variation of crosswise retardation according to the invention, it is important to control the drying conditions at the film stretching process. At the stretching process, a tenter is normally used.

In the production method 1, the tenter is normally composed of step A of gripping the film in the crosswise direction, step B of crosswise stretching the film and step C of crosswise relaxing the film in this order.

Preferably, supposing that the average drying speed at the gripping step and stretching step is A %/sec and the average drying speed at the relaxing step is B %/sec, when the film is dried at A/B of from 1.9 to 4.2, a film having a small retardation distribution can be realized.

The term "drying speed" as used herein is meant to indicate the content of solvent in the film at the aforementioned at the aforementioned steps, i.e., % reduction of amount of residual solvent (mass-%) per unit time. (In this specification, mass ratio is equal to weight ratio.) Referring further to the measuring method, at the step of measuring average drying speed, the film sample which is being dried is sampled at an interval of 5 m at arbitrary point. The amount of residual solvent is then measured at the various points. The measurement is made at scores of sites. The percent reduction of the amount of residual solvent per minute is determined from conveying speed (m/min). The measurements are then averaged to determine the average drying speed.

In the invention, the ratio A/B of the average drying speed A %/sec at the gripping step A and stretching step B to the average drying speed B %/sec at the relaxing step C is preferably from 1.9 to 4.2, more preferably from 2.4 to 4.1. The means of adjusting the average drying speed such that A/B falls within the above defined range is not specifically limited. However, it is most effective to adjust the drying temperature and drying air flow rate at the various steps. It is also very important to keep the drying temperature and drying air flow rate uniform in the crosswise direction of the film.

(Production Method 2)

As a result of extensive studies, the inventors found that the employment of the production method involving the stretching step of stretching film and the shrinking step of shrinking film makes it possible to obtain an optical film having the aforementioned desired optical physical properties.

In the invention, a method for the production of an optical film involving a stretching step of stretching the film in the film conveying direction and a shrinking step of shrinking the film while being gripped in the crosswise direction or a method for the production of an optical film involving a stretching step of stretching the film in the crosswise direction and a shrinking step of shrinking the film in the film conveying direction is particularly preferably used.

[Polymer Employable in Film of the Invention]

As the polymer employable in the film of the invention there may be used, e.g., cellulose acylate described later. However, the polymer employable herein include in the film of the invention is not limited to cellulose acylate. The invention can be applied to all polymers that can be used as optical film. The same effect as in cellulose acylate can be expected.

As the polymer that can be used as optical film there may be used, e.g., polycarbonate copolymer or polymer resin having a cyclic olefin structure. When such a polymer is used, a film having a good resistance to environmental change can be obtained.

Examples of the polycarbonate copolymer employable herein include a polycarbonate copolymer comprising repeating units represented by the following formula (Z) and repeating units represented by the following formula (B) wherein the repeating units represented by the formula (Z) account for 30 to 80 mol-% of the total amount of the repeating units.

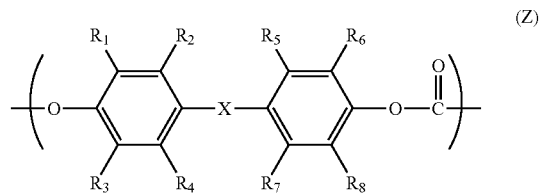

In the formula (Z), $R_1$ to $R_8$ each independently represent a hydrogen atom, halogen atom or $C_1$-$C_6$ hydrocarbon group. Examples of the $C_1$-$C_6$ hydrocarbon group include alkyl groups such as methyl, ethyl, isopropyl and cyclohexyl, and aryl groups such as phenyl. Preferred among these groups are hydrogen atom and methyl group.

In the formula (Z), X represents a group represented by the following formula (X). $R_9$ and $R_{10}$ each independently represent a hydrogen atom, halogen atom or $C_1$-$C_3$ alkyl group. Examples of halogen atom and $C_1$-$C_3$ alkyl group include the same halogen atoms and alkyl groups as listed above.

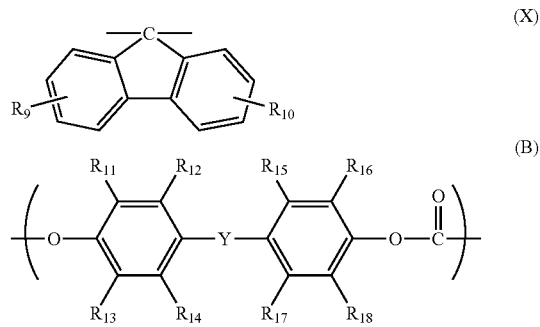

In the formula (B), $R_{11}$ to $R_{18}$ each independently represent a hydrogen atom, halogen atom or $C_1$-$C_{22}$ hydrocarbon group. Examples of the $C_1$-$C_{22}$ hydrocarbon group include $C_1$-$C_9$ alkyl groups such as methyl, ethyl, isopropyl and cyclohexyl, and aryl groups such as phenyl, biphenyl and terphenyl. Preferred among these groups are hydrogen atom and methyl.

In the formula (B), Y represents a group selected from the group consisting of the following groups in which $R_{19}$ to $R_{21}$, $R_{23}$ and $R_{24}$ each independently represent at least one group selected from the group consisting of hydrogen atom, halogen atom and $C_1$-$C_{22}$ hydrocarbon group. Examples of the hydrocarbon group include the same groups as described above. $R_{22}$ and $R_{25}$ each independently represent a $C_1$-$C_{20}$ hydrocarbon group. Examples of the hydrocarbon group include methyl, ethylene, propylene, butylene, cyclohexylene, phenylene, naphthylene, and terphenylene. Example of $Ar_1$ to $Ar_3$ include $C_6$-$C_{10}$ aryl groups such as phenyl and naphthyl.

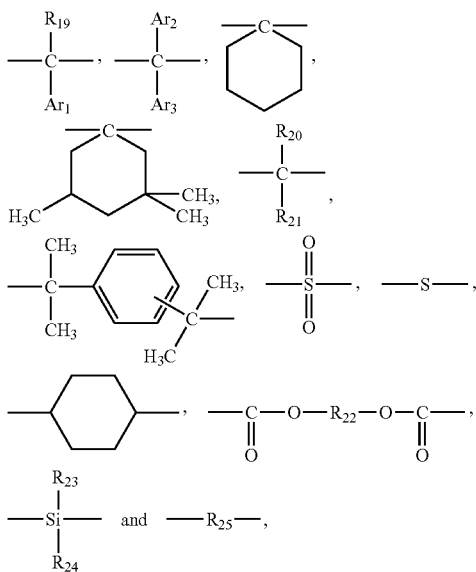

As the aforementioned polycarbonate copolymer there is preferably used a polycarbonate copolymer comprising from 30 to 60 mol-% of repeating units represented by the following formula (C) and from 40 to 70 mol-% of repeating units represented by the following formula (D).

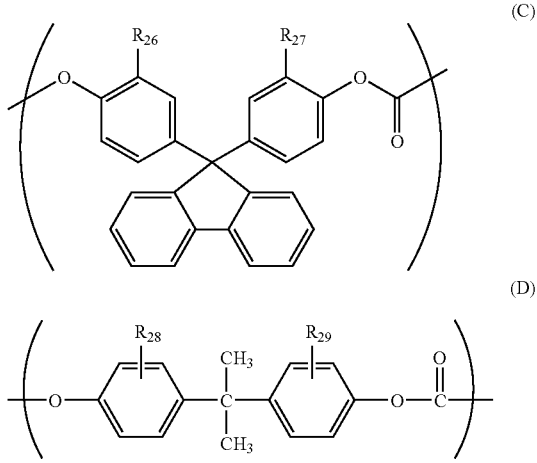

More preferably, a polycarbonate copolymer comprising from 45 to 55 mol-% of repeating units represented by the formula (C) and from 45 to 55 mol-% of repeating units represented by the formula (D) is used.

In the formula (C), $R_{26}$ to $R_{27}$ each independently represent a hydrogen atom or methyl group, preferably methyl group from the standpoint of handleability.

In the formula (D), $R_{28}$ to $R_{29}$ each independently represent a hydrogen atom or methyl group, preferably hydrogen atom from the standpoint of economy, film properties, etc.

As the optical film of the invention there is preferably used one comprising the aforementioned polycarbonate copolymer having a fluorene skeleton. The polycarbonate copolymer having a fluorene skeleton is preferably a blend of polycarbonate copolymers having different composition ratios of repeating units represented by the formula (Z) and repeating units represented by the formula (B). The percent content of the repeating units of formula (Z) is preferably from 30 to 80 mol-%, more preferably from 35 to 75 mol-%, even more preferably from 40 to 70 mol-% of the entire polycarbonate copolymer.

The aforementioned copolymer may be a combination of two or more of repeating units represented by the formula (Z) and two or more of repeating units represented by the formula (B).

The aforementioned molar ratio can be determined over the entire polycarbonate bulk constituting the optical film using, e.g., nuclear magnetic resonance (NMR) spectrometer.

The aforementioned polycarbonate copolymer can be produced by any known method. The polycarbonate is preferably produced by a method involving the polycondensation of a dihydroxy compound with phosgene, a melt polycondensation method or the like.

The intrinsic viscosity of the aforementioned polycarbonate copolymer is preferably from 0.3 to 2.0 dl/g. When the intrinsic viscosity of the aforementioned polycarbonate copolymer falls below 0.3, the resulting polycarbonate copolymer becomes so brittle that it cannot maintain its mechanical strength to disadvantage. On the contrary, when the intrinsic viscosity of the aforementioned polycarbonate copolymer exceeds 2.0, the resulting solution has too high a viscosity, causing a problem of generation of die line during solution film making or difficulty in purification at the end of polymerization.

The optical film of the invention may be a composition (blend) of the aforementioned polycarbonate copolymer with other polymer compounds. In this case, the polymer compounds preferably are compatible with the aforementioned polycarbonate copolymer or these polymers are preferably substantially the same in refractive index because the optical film of the invention needs to be optically transparent. Specific examples of the other polymers include poly(styrene-comaleic anhydride). Referring to the composition ratio of polycarbonate copolymer and polymer compound, the composition ratio of the polycarbonate copolymer is from 30 to 80% by mass, preferably from 40 to 80% by mass, and the composition ratio of the polymer compound is from 20 to 70% by mass, preferably from 20 to 60% by mass. In the case of blend, too, two or more of the repeating units of the polycarbonate copolymer may be provided in combination. The blend is preferably a compatible blend. Even though the components of the blend cannot be completely compatibilized with each other, the refractive index of the components can be combined to inhibit scattering of light from component to component, making it possible to enhance transparency. The blend may comprise three or more materials in combination. A plurality of polycarbonate copolymers and other polymer compounds may be combined with each other.

The mass-average molecular weight of the polycarbonate copolymer is from 1,000 to 1,000,000, preferably from 5,000 to 500,000. The mass-average molecular weight of the other polymer compounds each are from 500 to 100,000, preferably from 1,000 to 50,000.

Examples of the polymer resin having a cyclic olefin structure (hereinafter also referred to as "cyclic polyolefin-based resin" or "cyclic polyolefin") include (1) norbornene-based resin, (2) polymer of monocyclic olefins, (3) polymer of cyclic conjugated dienes, (4) vinyl alicyclic hydrocarbon polymer, and hydrides of polymer resins (1) to (4). Examples of the polymer which is preferably used in the invention include addition (co)polymer cyclic polyolefin containing at least one repeating unit represented by the following formula (b) and addition (co)polymer cyclic polyolefin optionally further containing at least one repeating unit represented by the formula (a). Further, an addition (co)polymer (including ring-opening (co)polymer) containing at least one repeating unit represented by the formula (c)may be used to advantage. Moreover, an addition (co)polymer cyclic polyolefin containing at least one repeating unit represented by the formula (c) and optionally further containing at least one repeating unit represented by the formula (a) may be used to advantage.

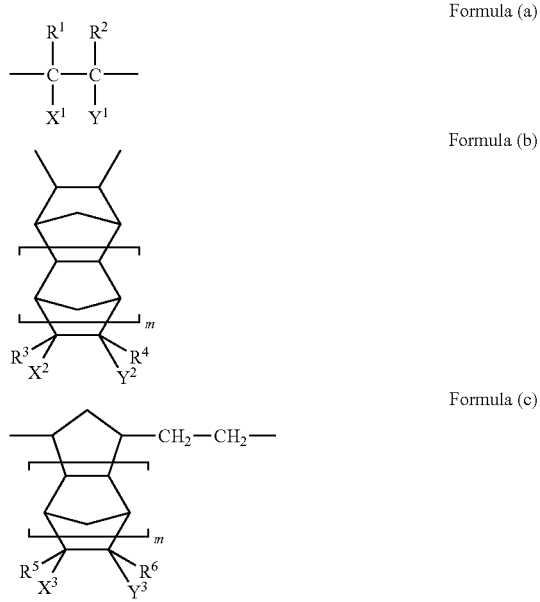

Formula (a)

Formula (b)

Formula (c)

In the formulae (a) to (c), m represents an integer of from 0 to 4. $R^1$ to $R^6$ each represent a hydrogen atom or $C_1$-$C_{10}$ hydrocarbon group. $X^1$ to $X^3$ and $Y^1$ to $Y^3$ each represent a hydrogen atom, $C_1$-$C_{10}$ hydrocarbon group, halogen atom, halogen-substituted $C_1$-$C_{10}$ hydrocarbon group, —$(CH_2)_n$COOR$^{11}$, —$(CH_2)_n$OCOR$^{12}$, —$(CH_2)_n$NCO, —$(CH_2)_n$NO$_2$, —$(CH_2)_n$CN, —$(CH_2)_n$CONR$^{13}$R$^{14}$, —$(CH_2)_n$NR$^{13}$R$^{14}$, —$(CH_2)_n$OZ, —$(CH_2)_n$W or (—CO)$_2$O or (—CO)$_2$NR$^{15}$ formed by $X^1$ and $Y^1$, $X^2$ and $Y^2$ or $X^3$ and $Y^3$. $R^{11}$, $R^{12}$, $R^{13}$, $R^{14}$ and $R^{15}$ each represent a hydrogen atom or $C_1$-$C_{20}$ hydrocarbon group. Z represents a hydrocarbon group or halogen-substituted hydrocarbon group. W represents SiR$^{16}_p$D$_{3-p}$ (in which $R^{16}$ repeating unit a $C_1$-$C_{10}$ hydrocarbon group; D represents a halogen atom, —OCOR$^{16}$ or —OR$^{16}$; and p represents an integer of from 0 to 3). The suffix n represents an integer of from 0 to 10.

The incorporation of functional groups having a great polarity as substituents $X^1$ to $X^3$ and $Y^1$ to $Y^3$ makes it possible to raise the thickness-direction retardation (Rth) of the optical film and hence the developability of the in-plane retardation (Re) of the optical film. When the film having a great Re developability is stretched during the film forming process, Re value of the film can be raised.

Norbornene-based addition (co)polymers are disclosed in JP-A-10-7732, JP-T-2002-504184, US2004229157A1, WO2004/070463A1, etc. A norbornene-based addition (co) polymer is obtained by the addition polymerization of norbornene-based polycyclic unsaturated compounds. If necessary, a norbornene-based polycyclic unsaturated compound may be subjected to addition polymerization with a conjugated diene such as ethylene, propylene, butene, butadiene and isoprene, nonconjugated diene such as ethylidene norbornene or linear diene compound such as acrylonitrile, acrylic acid, methacrylic acid, maleic anhydride, acrylic acid ester, methacrylic acid ester, maleimide, vinyl acetate and vinyl chloride. This norbornene-based addition (co)polymer is commercially available in the trade name of APL from Mitsubishi Chemical Corporation. APL is commercially available in various grades having different glass transition temperatures (Tg), e.g., APL8008T (Tg: 70° C.), APL6013T (Tg: 125° C.), APL6015T (Tg: 145° C.). Pelletized norbornene-based addition (co)polymers are commercially available in the trade name of TOPAS8007, 6013, 6015, etc. from Polyplastics Co., Ltd. Further, Appear3000 is commercially available from Ferrania Company.

A norbornene-based polymer hydride is prepared by subjecting a polycyclic unsaturated compound to addition polymerization or ring-opening metathesis polymerization followed by hydrogenation as disclosed in JP-A-1-240517, JP-A-7-196736, JP-A-60-26024, JP-A-62-19801, JP-A-2003-159767, and JP-A-2004-309979. In the norbornene-based polymer to be used in the invention, $R^5$ and $R^6$ each are preferably a hydrogen atom or —CH$_3$. $X^3$ and $Y^3$ each are preferably a hydrogen atom, Cl or —COOCH$_3$. The other substituents are properly selected. This norbornene-based resin is commercially available in the trade name of Arton G or Arton F from JSR Corporation or in the trade name of Zeonor ZF14, ZF16, Zeonex 250 or Zeonex 280 from ZEON CORPORATION. These products can be used in the invention.

The raw materials of the optical resin film of the invention, the production methods of the optical resin film of the invention, the polarizing plate and liquid crystal display device comprising same, etc. will be described hereinafter with reference mainly to the case where a cellulose acylate is used, but the invention is not limited to cellulose acylate.

(Cellulose Acylate)

The cellulose acylate useful in the invention will be described hereinafter.

The β-1,4-bonded glucose unit constituting cellulose has a free hydroxyl group in the 2-, 3- and 6-positiions. The cellulose acylate is a polymer obtained by esterifying some or whole of these hydroxyl groups by acyl group having two or more carbon atoms. The degree of substitution by acyl group means the percent esterification of hydroxyl group in cellulose in each of 2-, 3- and 6-positions (100% esterification means substitution degree of 1).

The total degree of substitution, i.e., DS2+DS3+DS6 is preferably from 2.00 to 3.00, more preferably from 2.20 to 2.90, particularly preferably from 2.40 to 2.82. Further, DS6/(DS2+DS3+DS6) is preferably 0.315 or more, particularly preferably 0.32 or more, most preferably 0.325 or more.

DS2 is the degree of substitution of hydroxyl group in the 2-position of glucose unit by acyl group (hereinafter occasionally referred to as "2-position substitution degree"), DS3 is the degree of substitution of hydroxyl group in the 3-position of glucose unit by acyl group (hereinafter occasionally referred to as "3-position substitution degree") and DS6 is the degree of substitution of hydroxyl group in the 6-position of glucose unit by acyl group (hereinafter occasionally referred to as "6-position substitution degree").

The number of acyl groups to be incorporated in the cellulose acylate of the invention may be only one or two or more. When two or more acyl groups are used, one of the acyl groups is preferably an acetyl group. Supposing that the sum of the degree of substitution of hydroxyl group in the 2-position, 3-position and 6-position by acetyl group is A, the sum of the degree of substitution of hydroxyl group in the 2-position, 3-position and 6-position by propionyl group is B and the sum of the degree of substitution of hydroxyl group in the 2-position, 3-position and 6-position by butyryl group is C, A is preferably from 1.60 to 2.0, more preferably from 1.7 to 1.9. The sum (B+C) is preferably from 0.60 to 0.80, more preferably from 0.65 to 0.75.

For the measurement of the degree of substitution by acetyl group, propionyl group and/or butyl group, ASTM: D-817-96 (method for testing cellulose acetate, etc.) may be employed. The measurements are then subjected to calculation.

For the determination of the amount of hydroxyl groups left unsubstituted in the 2-, 3- and 6-positions in the cellulose acylate, the hydroxyl groups left unsubstituted in the cellulose acylate are substituted by acyl group. The cellulose acylate thus substituted is then subjected to $^{13}$C-NMR. For the details of measurement method, reference can be made to Teduka et al, "Carbohydr. Res.", 273 (1995), pp. 83-91.

(Method of Synthesizing Cellulose Acylate)

A basic principle of the method of synthesizing cellulose acylate is described in Migita et al, "Mokuzai Kagaku (Wood Chemistry)", pp. 180-190, Kyoritsu Shuppan, 1968. A typical synthesis method involves liquid phase acetylation in the presence of a carboxylic anhydride-acetic acid-sulfuric acid catalyst.

In order to obtain the aforementioned cellulose acylate, a cellulose material such as cotton linter and wood pulp is pretreated with a proper amount of acetic acid, and then put in a carboxylated mixture which has been previously cooled to undergo esterification to synthesize a complete cellulose acylate (the sum of degrees of substitution by acyl in the 2-, 3- and 6-positions is almost 3.00). The aforementioned carboxylated mixture normally comprises acetic acid as a solvent, carboxylic anhydride as an esterifying agent and sulfuric acid as a catalyst. The carboxylic anhydride is normally used stoichiometrically in excess of the sum of the amount of cellulose reacting with the carboxylic anhydride and water content present in the system. The termination of the esterification reaction is followed by the addition of an aqueous solution of a neutralizing agent (e.g., carbonate, acetate or oxide of calcium, magnesium, iron, aluminum or zinc) for the purpose of hydrolyzing excessive carboxylic anhydride left in the system and neutralizing part of the esterification catalyst. Subsequently, the complete cellulose acylate thus obtained is kept at a temperature of from 50 to 90° C. in the presence of a small amount of an acetylation reaction catalyst (normally remaining sulfuric acid) to undergo saponification ripening that causes the conversion to cellulose acylate having a desired acyl substitution degree and polymerization degree. At the time when such a desired cellulose acylate is obtained, the catalyst remaining in the system is completely neutralized with a neutralizing agent mentioned above or the cellulose acylate solution is put in water or diluted sulfuric acid without being neutralized (alternatively, water or diluted sulfuric acid is put in the cellulose acylate solution) to separate the cellulose acylate which is then washed and stabilized or otherwise processed to obtain the aforementioned specific cellulose acylate.

In the aforementioned cellulose acylate film, the polymer component constituting the film is preferably made substantially of the aforementioned specific cellulose acylate. The "substantially" as used herein is meant to indicate 55% or more (preferably 70% or more, more preferably 80% or more) of the polymer component.

The aforementioned cellulose acylate is preferably used in particulate form. 90% by mass or more of the particles used preferably have a particle diameter of from 0.5 to 5 mm. Further, 50% by mass or more of the particles used preferably have a particle diameter of from 1 to 4 mm. The particulate cellulose acylate preferably is in a form as much as close to sphere.

The polymerization degree of cellulose acylate which is preferably used in the invention is preferably from 200 to 700, more preferably from 250 to 550, even more preferably from 250 to 400, particularly from 250 to 350 as calculated in terms of viscosity-average polymerization degree. The average polymerization degree can be measured by an intrinsic viscosity method proposed by Uda et al (Kazuo Uda, Hideo Saito, "Seni Gakkaishi (JOURNAL OF THE SOCIETY OF FIBER SCIENCE AND TECHNOLOGY, JAPAN)", No. 1, Vol. 18, pp. 105-120, 1962). For more details, reference can be made to JP-A-9-95538.

When low molecular components are removed, the resulting cellulose acylate has a raised average molecular weight (polymerization degree). However, the viscosity of the cellulose acylate is lower than that of ordinary acylates. Thus, as the aforementioned cellulose acylate, those freed of low molecular components are useful. Cellulose acylates having a small content of low molecular components can be obtained by removing low molecular components from cellulose acylates which have been synthesized by an ordinary method. The removal of the low molecular components can be carried out by washing the cellulose acylate with a proper organic solvent. In order to produce the cellulose acylate having a small content of low molecular components, the amount of the sulfuric acid catalyst in the acetylation reaction is preferably adjusted to a range of from 0.5 to 25 parts by mass based on 100 parts by mass of cellulose acylate. When the amount of the sulfuric acid catalyst falls within the above defined range, a cellulose acylate which is desirable also in the light of molecular weight distribution (uniform molecular weight distribution) can be synthesized. When used in the production of the cellulose acylate, the cellulose acylate preferably has a water content of 2% by mass or less, more preferably 1% by mass or less, particularly 0.7% by mass or less. A cellulose acylate normally contains water and is known to have a water content of from 2.5 to 5% by mass. In order to provide the cellulose acylate with a water content falling within this range in the invention, the cellulose acylate needs to be dried. The drying method is not specifically limited so far as the desired water content is attained.

For the details of cotton as starting material of the aforementioned cellulose acylate and its synthesis method, reference can be made to Kokai Giho No. 2001-1745, Mar. 15, 2001, Japan Institute of Invention and Innovation, pp. 7-12.

The cellulose acylate film according to the invention can be obtained by filming a solution of the aforementioned cellulose acylate and optionally additives in an organic solvent.

(Additives)

Examples of the additives which can be incorporated in the resin solution such as the aforementioned cellulose acylate solution in the invention include plasticizer, ultraviolet absorber, deterioration inhibitor, retardation (optical anisotropy) developer, retardation (optical anisotropy) reducer, particulate material, peel accelerator, and infrared absorber. In the invention, a retardation developer is preferably used. Further, at least one of plasticizer, ultraviolet absorber, peel accelerator, dye and matting agent is preferably used.

These additives may be in the form of solid material or oil-based material. In other words, these additives are not specifically limited in their melting point or boiling point. For example, ultraviolet absorbers having a melting point of 20°

C. or less and 20° C. or more may be used in admixture with each other or a plasticizer. For details, reference can be made to JP-A-2001-151901.

As the ultraviolet absorber there may be used an arbitrary kind of ultraviolet absorber depending on the purpose. Examples of the ultraviolet absorber employable herein include salicylic acid ester-based absorbers, benzophenone-based absorbers, benzotriazole -based absorbers, benzoate-based absorbers, cyano acrylate-based absorbers, and nickel complex salt-based absorbers. Preferred among these ultraviolet absorbers are benzophenone-based absorbers, benzotriazole-based absorbers, and salicylic acid ester-based absorbers. Examples of the benzophenone-based ultraviolet absorbers include 2,4-dihydroxybenzophenone, 2-hydroxy-4-acetoxybenzopheone, 2-hydroxy-4-methoxy benzophenone, 2,2'-di-hydroxy-4-metoxybenzopheone, 2,2'-di-hydroxy-4,4'-metoxybenzophenone, 2-hydroxy-4-n-octoxybenzophenone, 2-hydroxy-4-dodecyloxy benzophenone, and 2-hydroxy-4-(2-hydroxy-3-methacryloxy)propoxybenzophenone. Examples of the benzotriazole-based ultraviolet absorbers include 2(2'-hydroxy-3'-tert-butyl-5'-methylphenyl)-5-chlorobenzo triazole, 2(2'-hydroxy-5'-tert-butylphenyl)benzotriazole, 2(2'-hydroxy-3', 5'-di-tert-amylphenyl)benzotriazole, 2(2'-hydroxy-3',5'-di-tert-butylphenyl)-5-chlorobenzotriazole, and 2(2'-hydroxy-5'-tert-octylphenyl)benzotriazole. Examples of the salicylic acid ester-based absorbers include phenyl salicylate, p-octylphenyl salicylate, and p-tert-butyl phenyl salicylate. Particularly preferred among these exemplified ultraviolet absorbers are 2-hydroxy-4-methoxybenzophenone, 2,2'-dihydroxy-4,4'-methoxy benzophenone, 2(2'-hydroxy-3'-tert-butyl-5'-methyl phenyl)-5-chlorobenzotriazole, 2(2'-hydroxy-5'-tert-butylphenyl)benzotriazole, 2(2'-hydroxy3',5'-di-tert-amylphenyl)benzotriazole, and 2(2'-hydroxy-3',5'-di-tert-butyphenyl)-5-chlorobenzotriazole.

A plurality of ultraviolet absorbers having different absorption wavelengths are preferably used to obtain a high barrier effect within a wide wavelength range. As the ultraviolet absorber for liquid crystal there is preferably used one having an excellent absorption of ultraviolet rays having a wavelength of 370 nm or less from the standpoint of prevention of deterioration of liquid crystal or one having little absorption of visible light having a wavelength of 400 nm or more. Particularly preferred examples of the ultraviolet absorbers include benzotriazole-based compounds and salicylic acid ester-based compounds previously exemplified. Preferred among these ultraviolet absorbers are benzotriazole-based compounds because they cause little unnecessary coloration of cellulose ester.

As the ultraviolet absorbers there may be used also compounds disclosed in JP-A-60-235852, JP-A-3-199201, JP-A-5-1907073, JP-A-5-194789, JP-A-5-271471, JP-A-6-107854, JP-A-6-118233, JP-A-6-148430, JP-A-7-11056, JP-A-7-11055, JP-A-7-11056, JP-A-8-29619, JP-A-8-239509, and JP-A-2000-204173.

The amount of the ultraviolet absorbers to be incorporated is preferably from 0.001 to 5% by mass, more preferably from 0.01 to 1% by mass based on the cellulose acylate. When the amount of the ultraviolet absorbers to be incorporated falls below 0.001% by mass, the desired effect of these ultraviolet absorbers cannot be sufficiently exerted. On the contrary, when the amount of the ultraviolet absorbers to be incorporated exceeds 5% by mass, the ultraviolet absorbers can bleed out to the surface of the film.

Further, the ultraviolet absorber may be added at the same time as the dissolution of cellulose acylate or may be added to the dope prepared by dissolution. It is particularly preferred that using a static mixer, an ultraviolet absorber be added to the dope which is ready to be flow-casted because the spectral absorption characteristics can be easily adjusted.

The aforementioned deterioration inhibitor can be used to prevent the deterioration or decomposition of cellulose triacetate, etc. Examples of the deterioration inhibitor include compounds such as butylamine, hindered amine compound (JP-A-8-325537), guanidine compound (JP-A-5-271471), benzotriazole-based ultraviolet absorber (JP-A-6-235819) and benzophenone-based ultraviolet absorber (JP-A-6-118233).

As the plasticizer there is preferably used phosphoric acid ester or carboxylic acid ester. The aforementioned plasticizer is more preferably selected from the group consisting of triphenyl phosphate (TPP), tricresyl phosphate (TCP), cresyl diphenyl phosphate, octyl diphenyl phosphate, biphenyl diphenyl phosphate (BDP), trioctyl phosphate, tributyl phosphate, dimethyl phthalate (DMP), diethyl phthalate (DEP), dibutyl phthalate (DBP), dioctyl phthalate (DOP), diphenyl phthalate (DPP), diethylhexyl phthalate (DEHP), triethyl O-acetylcitrate (OACTE), tributyl O-acetylcitrate (OACTB), acetyltriethyl citrate, acetyltributyl citrate, butyl oleate, methylacetyl ricinoleate, dibutyl sebacate, triacetin, tributylin, butylphthalyl glycolate, ethylphthalylethyl glycolate, methylphthalylethyl glycolate, and butylphthalylbutyl glycolate. Further, the aforementioned plasticizer is preferably selected from the group consisting of (di)pentaerythritolesters, glycerolesters and diglycerolesters.

Examples of the peel accelerator include citric acid ethylesters. For the details of the infrared absorbers, reference can be made to JP-A-2001-194522.

Further, in the invention, a dye may be added to adjust hue. The content of the dye is preferably from 10 ppm to 1,000 ppm, more preferably from 50 ppm to 500 ppm based on the mass of the cellulose acylate. The incorporation of dye makes it possible to reduce light piping of the cellulose acylate film and improve yellowish tint. These compounds may be added together with the cellulose acylate or solvent during the preparation of the cellulose acylate solution or singly during or after the preparation of the cellulose acylate solution. Alternatively, these compounds may be added to the ultraviolet absorber solution to be inline added.

The dye to be used in the invention is preferably a compound represented by the following formula (I) or (II).

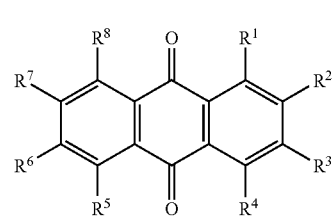

Formula (I)

wherein $R^1$, $R^2$, $R^3$, $R^4$, $R^5$, $R^6$, $R^7$ and $R^8$ each independently represent a hydrogen atom, hydroxyl group, aliphatic group, aromatic group, heterocyclic group, halogen atom, cyano group, nitro group, $COR^9$, $COOR^9$, $NR^9R^{10}$, $NR^{10}COR^{11}$, $NR^{10}SO_2R^{11}$, $CONR^9R^{10}$, $SO_2NR^9R^{10}$, $COR^{11}$, $SO_2R^{11}$, $OCOR^{11}$, $NR^9CONR^{10}R^{11}$, $CONHSO_2R^{11}$ or $SO_2NHCOR^{11}$ (in which $R^9$ and $R^{10}$ each independently represent a hydrogen atom, aliphatic group, aromatic group or heterocyclic group; $R^{11}$ represents an aliphatic group, aromatic group or heterocyclic group; $R^9$ and $R^{10}$ may be connected to each other to form a 5- or 6-membered ring); and R¹ and R² or R² and R³ may be connected to each other to form a ring.

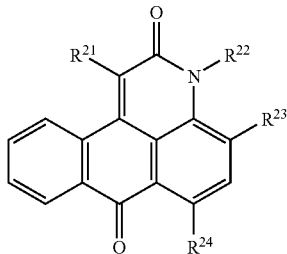

Formula (II)

wherein $R^{21}$, $R^{23}$ and $R^{24}$ each independently represent a hydrogen atom, hydroxyl group, nitro group, cyano group, aliphatic group, aromatic group, $COR^{29}$, $COOR^{29}$, $NR^{29}R^{30}$, $NR^{30}COR^{31}$ or $NR^{30}SO_2R^{31}$ (in which $R^{29}$ and $R^{30}$ have the same meaning as $R^9$ and $R^{10}$ in the formula (I), respectively; and $R^{31}$ has the same meaning as $R^{11}$ in the formula (I))$R^{22}$ represents an aliphatic group or aromatic group, with the proviso that one or more of $R^{21}$, $R^{22}$, $R^{23}$ and $R^{24}$ each are a group other than hydrogen atom.

The various groups constituting the formula (I) will be further described hereinafter. The aliphatic group represented by $R^1$ to $R^{11}$ represents a $C_1$-$C_{20}$ alkyl group (e.g., methyl, ethyl, n-butyl, isopropyl, 2-ethylhexyl, n-decyl, n-octadecyl), $C_1$-$C_{20}$ cycloalkyl group (e.g., cyclopentyl, cyclohexyl) or allyl group. The aliphatic group may have substituents [e.g., halogen atom (e.g., F, Cl, Br, I), hydroxyl group, cyano group, nitro group, carboxylic acid group, $C_6$-$C_{10}$ aryl group (e.g., phenyl, naphthyl), $C_0$-$C_{20}$ amino group (e.g., $NH_2$, $NHCH_3$, $N(C_2H_5)_2$, $N(C_4H_9)_2$, $N(C_8H_{17})_2$, anilino, 4-methoxyanilino), $C_1$-$C_{20}$ amide group (e.g., acetylamino, hexanoylamino, benzoylamino, octadecanoylamino), $C_1$-$C_{20}$ carbamoyl group (e.g., unsubstituted carbamoyl, methylcarbamoyl, ethylcarbamoyl, octylcarbamoyl, hexadecylcarbamoyl), $C_2$-$C_{20}$ ester group (e.g., methoxy carbonyl, ethoxycarbonyl, phenoxycarbonyl, n-butoxycarbonyl,dodecyloxycarbonyl), $C_1$-$C_{20}$ alkoxy group or aryloxy group (e.g., methoxy, ethoxy, butoxy, isopropoxy, benzyloxy, phenoxy, octadecyloxy), $C_1$-$C_{20}$ sulfonamide group (e.g., methanesulfonamide, ethane sulfonamide, butanesulfonamide, benzene sulfonamide, octane sulfonamide), $C_0$-$C_{20}$ sulfamoyl group (e.g., unsubstituted sulfamoyl, methylsulfamoyl, butyl sulfamoyl, decylsulfamoyl), 5- or 6-membered heterocyclic group (e.g., pyridyl, pyrazolyl, morpholino, piperidino, pyrrolino, benzoxazolyl)].

The aromatic group represented by $R^1$ to $R^{11}$ represents a $C_6$-$C_{10}$ aryl group (e.g., phenyl, naphthyl) which may have substituents [e.g., those exemplified as the substituents for the aliphatic group and a $C_1$-$C_{20}$ alkyl group such (e.g., methyl, ethyl, butyl, t-butyl, octyl)].

The heterocyclic group represented by $R^1$ to $R^{11}$ represents a 5- or 6-membered heterocyclic group (e.g., pyridine, piperidine, morpholine, pyrrolidine, pyrazole, pyrazolidine, pyrazoline, pyrazolone, benzoxazole) which may have substituents (e.g., groups exemplified as substituents which may be possessed by the aforementioned aromatic group).

Examples of the 5- or 6-membered ring formed by the connection of $R^9$ to $R^{10}$ include morpholine ring, piperidine ring, and pyrrolidine ring. The ring formed by the connection of $R^1$ to $R^2$ or $R^2$ to $R^3$ is preferably a 5- or 6-membered ring (e.g., benzene ring, phthalimide ring).

The various groups in the formula (II) will be further described hereinafter. The aliphatic groups represented by $R^{21}$ to $R^{24}$ each have the same meaning as those represented by $R^1$ to $R^{11}$ in the formula (I). The aromatic groups represented by $R^{21}$ to $R^{24}$ each have the same meaning as those represented by $R^1$ to $R^{11}$ in the formula (I).

These additives may be added at any time during the process of preparing the dope. The step of adding these additives may be conducted at the final step in the process of preparing the dope. Further, the amount of these materials to be added is not specifically limited so far as their functions can be exhibited. In the case where the cellulose acylate film is formed in a multi-layer form, the kind and added amount of additives in the various layers may be different. As disclosed in JP-A-2001-151902 for example, these techniques have heretofore been known. The glass transition point Tg of the cellulose acylate film of the cellulose acylate measured by a tensile testing machine (Vibron: DVA-225, produced by IT Keisoku K.K.) is preferably predetermined to a range of from 70° C. to 150° C., more preferably from 80° C. to 135° C. by properly selecting the kind and added amount of these additives. In other words, the glass transition point Tg of the cellulose acylate film according to the invention preferably falls within the above defined range from the standpoint of process adaptability such as working of polarizing plate and assembly of liquid crystal display device.

As these additives there may be preferably used those disclosed in detail in Kokai Giho No. 2001-1745, Mar. 15, 2001, pp. 16 and after, Japan Institute of Invention and Innovation.

(Retardation Developer)

In the invention, a retardation developer is preferably used to realize a desired retardation value.

The retardation developer is added in an amount of 1 parts by mass based on 100 parts by mass of the polymer component containing a cellulose acylate or the like to raise Rth value by 0.11 or more, more preferably 0.2 or more, even more preferably 0.3 or more per μm of film thickness.

The retardation developer to be used in the invention may be one made of a rod-shaped or discotic compound.

As the aforementioned rod-shaped or discotic compound there may be used a compound having at least two aromatic rings.

The amount of the retardation developer made of a rod-shaped compound to be incorporated is preferably from 0.1 to 30 parts by mass, more preferably from 0.5 to 20 parts by mass based on 100 parts by mass of the polymer component containing cellulose acylate.

The discotic retardation developer is preferably used in an amount of from 0.05 to 30 parts by mass, more preferably from 0.1 to 20 parts by mass, even more preferably from 0.2 to 15 parts by mass, most preferably from 0.5 to 10 parts by mass based on 100 parts by mass of the polymer component containing cellulose acylate.

The discotic compound is superior to the rod-shaped compound in Rth retardation developability and thus is preferably used in the case where a remarkably great Rth retardation is required.

Two or more retardation developers may be used in combination.

The aforementioned retardation developer made of rod-shaped compound or discotic compound preferably has a maximum absorption at a wavelength of from 250 to 400 nm and substantially no absorption in the visible light range.

The discotic compound will be further described hereinafter. As the discotic compound there may be used a compound having at least two aromatic rings.

The term "aromatic ring" as used herein is meant to include aromatic heterocyclic groups in addition to aromatic hydrocarbon rings.

The aromatic hydrocarbon ring is preferably a 6-membered ring (i.e., benzene ring) in particular.

The aromatic heterocyclic group is normally an unsaturated heterocyclic group. The aromatic heterocyclic group is preferably a 5-membered ring, 6-membered ring or 7-membered ring, more preferably a 5-membered ring or 6-membered ring. The aromatic heterocyclic group normally has the most numerous double bonds. As hetero atoms there are preferably used nitrogen atom, oxygen atom and sulfur atom, particularly nitrogen atom. Examples of the aromatic heterocyclic group include furane ring, thiophene ring, pyrrole ring, oxazole ring, isooxazole ring, thiazole ring, isothiazole ring, imidazole ring, pyrazole ring, furazane ring, triazole ring, pyrane ring, pyridine ring, pyridazine ring, pyrimidine ring, pyrazine ring, and 1,3,5-triazine ring.

Preferred examples of the aromatic ring include benzene ring, furane ring, thiophene ring, pyrrole ring, oxazole ring, thiazole ring, imidazole ring, triazole ring, pyridine ring, pyrimidine ring, pyrazine ring, and 1,3,5-triazine ring. Particularly preferred among these aromatic rings is 1,3,5-triazine ring. In some detail, as the discotic compound there is preferably used one disclosed in JP-A-2001-166144.

The number of aromatic rings contained in the aforementioned discotic compound is preferably from 2 to 20, more preferably from 2 to 12, even more preferably from 2 to 8, most preferably from 2 to 6.

Referring to the connection of two aromatic rings, (a) they may form a condensed ring, (b) they may be connected directly to each other by a single bond or (c) they may be connected to each other via a connecting group (No spiro bond cannot be formed due to aromatic ring). Any of the connections (a) to (c) may be established.

Preferred examples of the condensed ring (a) (formed by the condensation of two or more aromatic rings) include indene ring, naphthalene ring, azlene ring, fluorene ring, phenathrene ring, anthracene ring, acenaphthylene ring, biphenylene ring, naphthacene ring, pyrene ring, indole ring, isoindole ring, benzofurane ring, benzothiophene ring, benzotriazole ring, purine ring, indazole ring, chromene ring, quinoline ring, isoquinoline ring, quinolidine ring, quinazoline ring, cinnoline ring, quinoxaline ring, phthaladine ring, puteridine ring, carbazole ring, acridine ring, phenathridine, xanthene ring, phenazine ring, phenothiazine ring, phenoxathine ring, phenoxazine ring, and thianthrene ring. Preferred among these condensed rings are naphthalene ring, azlene ring, indole ring, benzooxazole ring, benzothiazole ring, benzoimidazole ring, benzotriazole ring, and quinoline ring.

The single bond (b) is preferably a bond between the carbon atom of two aromatic rings. Two or more aromatic rings may be connected via two or more single bonds to form an aliphatic ring or nonaromatic heterocyclic group between the two aromatic rings.

The connecting group (c), too, is preferably connected to the carbon atom of two aromatic rings. The connecting group is preferably an alkylene group, alkenylene group, alkynylene group, —CO—, —O—, —NH—, —S— or combination thereof. Examples of the connecting group comprising these groups in combination will be given below. The order of the arrangement of components in the following connecting groups may be inverted.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and connecting group may have substituents.

Examples of the substituents include halogen atoms (F, Cl, Br, I), hydroxyl groups, carboxyl groups, cyano groups, amino groups, sulfo groups, carbamoyl groups, sulfamoyl groups, ureido groups, alkyl groups, alkenyl groups, alkynyl groups, aliphatic acyl groups, aliphatic acyloxy groups, alkoxy groups, alkoxycarbonyl groups, alkoxycarbonylamino groups, alkylthio groups, alkylsulfonyl groups, aliphatic amide groups, aliphatic sulfonamide groups, aliphatic substituted amino groups, aliphatic substituted carbamoyl groups, aliphatic substituted sulfamoyl groups, aliphatic substituted ureido groups, and nonaromatic heterocyclic groups.

The number of carbon atoms in the alkyl group is preferably from 1 to 8. A chain-like alkyl group is preferred to cyclic alkyl group. A straight-chain alkyl group is particularly preferred. The alkyl group preferably further has substituents (e.g., hydroxy group, carboxy group, alkoxy group, alkyl-substituted amino group). Examples of the alkyl group (including substituted alkyl group) include methyl group, ethyl group, n-butyl group, n-hexyl group, 2-hydroxyethyl group, 4-carboxybutyl group, 2-methoxyethyl group, and 2-diethylaminoethyl group.

The number of carbon atoms in the alkenyl group is preferably from 2 to 8. A chain-like alkynyl group is preferred to cyclic alkenyl group. A straight-chain alkenyl group is particularly preferred. The alkenyl group may further have substituents. Examples of the alkenyl group include vinyl group, allyl group, and 1-hexenyl group.

The number of carbon atoms in the alkynyl group is preferably from 2 to 8. A chain-like alkynyl group is preferred to cyclic alkynyl group. A straight-chain alkynyl group is particularly preferred. The alkynyl group may further have substituents. Examples of the alkynyl group include ethinyl group, 1-butinyl group, and 1-hexinyl group.

The number of carbon atoms in the aliphatic acyl group is preferably from 1 to 10. Examples of the aliphatic acyl group include acetyl group, propanoyl group, and butanoyl group.

The number of carbon atoms in the aliphatic acyloxy group is preferably from 1 to 10. Examples of the aliphatic acyloxy group include acetoxy group.

The number of carbon atoms in the alkoxy group is preferably from 1 to 8. The alkoxy group may further has substituents (e.g., alkoxy group). Examples of the alkoxy group (including substituted alkoxy groups) include methoxy group, ethoxy group, butoxy group, and methoxyethoxy group.

The number of carbon atoms in the alkoxycarbonyl group is preferably from 2 to 10. Examples of the alkoxycarbonyl group include methoxycarbonyl group, and ethoxycarbonyl group.

The number of carbon atoms in the alkoxycarbonylamino group is preferably from 2 to 10. Examples of the alkoxycarbonylamino group include methoxycarbonylamino group, and ethoxycarbonylamino group.

The number of carbon atoms in the alkylthio group is preferably from 1 to 12. Examples of the alkylthio group include methylthio group, ethylthio group, and octylthio group.

The number of carbon atoms in the alkylsulfonyl group is preferably from 1 to 8. Examples of the alkylsulfonyl group include methanesulfonyl group, and ethanesulfonyl group.

The number of carbon atoms in the aliphatic amide group is preferably from 1 to 10. Examples of the aliphatic amide group include acetamide group.

The number of carbon atoms in the aliphatic sulfonamide group is preferably from 1 to 8. Examples of the aliphatic sulfonamide group include methanesulfonamide group, butanesulfonamide group, and n-octanesulfonamide group.

The number of carbon atoms in the aliphatic substituted amino group is preferably from 1 to 10. Examples of the aliphatic substituted amino group include dimethylamino group, diethylamino group, and 2-carboxyethylamino group.

The number of carbon atoms in the aliphatic substituted carbamoyl group is preferably from 2 to 10. Examples of the aliphatic substituted carbamoyl group include methylcarbamoyl group, and diethylcarbamoyl group.

The number of carbon atoms in the aliphatic substituted sulfamoyl group is preferably from 1 to 8. Examples of the aliphatic substituted sulfamoyl group include methylsulfamoyl group, and diethylsulfamoyl group.

The number of carbon atoms in the aliphatic substituted ureido group is preferably from 2 to 10. Examples of the aliphatic substituted ureido group include methylureido group.

Examples of the nonaromatic heterocyclic group include piperidino group, and morpholino group.

The molecular weight of the retardation developer made of discotic compound is preferably from 300 to 800.

In the invention, a rod-shaped compound having a linear molecular structure may be preferably used besides the aforementioned discotic compounds. The term "linear molecular structure" as used herein is meant to indicate that the molecular structure of the rod-shaped compound which is most thermodynamically stable is linear. The most thermodynamically stable structure can be determined by crystallographic structure analysis or molecular orbital calculation. For example, a molecular orbital calculation software (e.g., WinMOPAC2000, produced by Fujitsu Co., Ltd.) may be used to effect molecular orbital calculation, making it possible to determine a molecular structure allowing the minimization of heat formation of compound. The term "linear molecular structure" as used herein also means that the most thermodynamically stable molecular structure thus calculated forms a main chain at an angle of 140 degrees or more.

The rod-shaped compound is preferably one having at least two aromatic rings. As the rod-shaped compound having at least two aromatic rings there is preferably used a compound represented by the following formula (1):

$Ar^1$-$L^1$-$Ar^2$ (1)

wherein $Ar^1$ and $Ar^2$ each independently represent an aromatic ring.

Examples of the aromatic ring employable herein include aryl groups (aromatic hydrocarbon group), substituted aryl groups, and substituted aromatic heterocyclic groups.

The aryl group and substituted aryl group are preferred to the aromatic heterocyclic group and substituted aromatic heterocyclic group. The heterocyclic group in the aromatic heterocyclic group is normally unsaturated. The aromatic heterocyclic group is preferably a 5-membered ring, 6-membered ring or 7-membered ring, more preferably a 5-membered ring or 6-membered ring. The aromatic heterocyclic group normally has the most numerous double bonds. The hetero atom is preferably nitrogen atom, oxygen atom or sulfur atom, more preferably nitrogen atom or sulfur atom.

Preferred examples of the aromatic ring in the aromatic group include benzene ring, furane ring, thiophene ring, pyrrole ring, oxazole ring, thiazole ring, imidazole ring, triazole ring, pyridine ring, pyrimidine ring, and pyrazine ring. Particularly preferred among these aromatic rings is benzene ring.

Examples of the substituents on the substituted aryl group and substituted aromatic heterocyclic group include halogen atoms (F, Cl, Br, I), hydroxyl groups, carboxyl groups, cyano groups, amino groups, alkylamino groups (e.g., methylamino group, ethylamino group, butylamino group, dimethylamino group), nitro groups, sulfo groups, carbamoyl groups, alkylcarbamoyl groups (e.g., N-methylcarbamoyl group, N-ethylcarbamoyl group, N,N-dimethylcarbamoyl group), sulfamoyl groups, alkylsulfamoyl groups (e.g., N-methylsulfamoyl group, N-ethylsulfamoyl group, N,N-dimethylsulfamoyl group), ureido groups, alkylureido groups (e.g., N-methylureido group, N,N-dimethylureido group, N,N,N'-trimethyl ureido group), alkyl groups (e.g., methyl group, ethyl group, propyl group, butyl group, pentyl group, heptyl group, octyl group, isopropyl group, s-butyl group, t-amyl group, cyclohexyl group, cyclopentyl group), alkenyl groups (e.g., vinyl group, allyl group, hexenyl group), alkynyl groups (e.g., ethinyl group, butinyl group), acyl groups (e.g., formyl group, acetyl group, butyryl group, hexanoyl group, lauryl group), acyloxy groups (e.g., acetoxy group, butyryloxy group, hexanoyloxy group, lauryloxy group), alkoxy groups (e.g., methoxy group, ethoxy group, propoxy group, butoxy group, pentyloxy group, heptyloxy group, octyloxy group), aryloxy groups (e.g., phenoxy group), alkoxycarbonyl groups (e.g., methoxycarbonyl group, ethoxycarbonyl group, propoxycarbonyl group, butoxycarbonyl group, pentyloxycarbonyl group, heptyloxycarbonyl group), aryloxycarbonyl groups (e.g., phenoxycarbonyl group), alkoxycarbonylamino groups (e.g., butoxycarbonylamino group, hexyloxycarbonylamino group), alkylthio groups (e.g., methylthio group, ethylthio group, propylthio group, butylthio group, pentylthio group, heptylthio group, octylthio group), arylthio groups (e.g., phenylthio group), alkylsulfonyl groups (e.g., methyl sulfonyl group, ethylsulfonyl group, propylsulfonyl group, butylsulfonyl group, pentylsulfonyl group, heptylsulfonyl group, octylsulfonyl group), amide groups (e.g., acetamide group, butylamide group, hexylamide group, laurylamide group), and nonaromatic heterocyclic groups (e.g., morpholyl group, pyradinyl group).

Examples of the substituents on the substituted aryl group and substituted aromatic heterocyclic group include halogen atoms, cyano groups, carboxyl groups, hydroxyl groups, amino groups, alkyl-substituted amino groups, acyl groups, acyloxy groups, amide groups, alkoxycarbonyl groups, alkoxy groups, alkylthio groups, and alkyl groups.

The alkyl moiety and alkyl group in the alkylamino group, alkoxycarbonyl group, alkoxy group and alkylthio group may further have substituents. Examples of the substituents on the alkyl moiety and alkyl group include halogen atoms, hydroxyl groups, carboxyl groups, cyano groups, amino groups, alkylamino groups, nitro groups, sulfo groups, carbamoyl groups, alkylcarbamoyl groups, sulfamoyl groups, alkylsulfamoyl groups, ureido groups, alkylureido groups, alkenyl groups, alkynyl groups, acyl groups, acyloxy groups, acylamino groups, alkoxy groups, aryloxy groups, alkoxycarbonyl groups, aryloxycarbonyl groups, alkylthio groups, arylthio groups, alkylsulfonyl groups, amide groups, and nonaromatic heterocyclic groups. Preferred among these substituents on the alkyl moiety and alkyl group are halogen atoms, hydroxyl groups, amino groups, alkylamino groups, acyl groups, acyloxy groups, acylamino groups, and alkoxy groups.

In the formula (1), L1 represents a divalent connecting group selected from the group consisting of groups composed of alkylene group, alkenylene group, alkynylene group, —O—, —CO— and combination thereof.

The alkylene group may have a cyclic structure. The cyclic alkylene group is preferably cyclohexylene, particularly 1,4-cyclohexylene. As the chain-like alkylene group, a straight-chain alkylene is preferred to a branched alkylene.

The number of carbon atoms in the alkylene group is preferably from 1 to 20, more preferably from 1 to 15, even more preferably from 1 to 10, even more preferably from 1 to 8, most preferably from 1 to 6.

The alkenylene group and alkynylene group preferably has a chain-like structure rather than cyclic structure, more preferably a straight-chain structure than branched chain-like structure.

The number of carbon atoms in the alkenylene group and alkynylene group is preferably from 2 to 10, more preferably from 2 to 8, even more preferably from 2 to 6, even more preferably from 2 to 4, most preferably 2 (vinylene or ethinylene).

The number of carbon atoms in the arylene group is preferably from 6 to 20, more preferably from 6 to 16, even more preferably from 6 to 12.

In the molecular structure of the formula (1), the angle formed by $Ar^1$ and $Ar^2$ with $L^1$ interposed therebetween is preferably 140 degrees or more.

The rod-shaped compound can be synthesized by any method disclosed in literatures. Examples of these literatures include "Mol. Cryst. Liq. Cryst.", vol. 53, page 229, 1979, "Mol. Cryst. Liq. Cryst.", vol. 89, page 93, 1982, "Mol. Cryst. Liq. Cryst.", vol. 145, page 11, 1987, "Mol. Cryst. Liq. Cryst.", vol. 170, page 43, 1989, "J. Am. Chem. Soc.", vol. 113, page 1,349, 1991, "J. Am. Chem. Soc.", vol. 118, page 5,346, 1996, "J. Am. Chem. Soc.", vol. 92, page 1,582, 1970, "J. Org. Chem.", vol. 40, page 420, 1975, and "Tetrahedron", vol. 48, No. 16, page 3,437, 1992.

In the invention, it is more desirable that a rod-shaped compound represented by the following formula (A) be used. The compound represented by the formula (A) will be further described hereinafter.

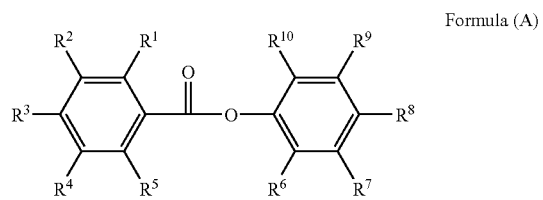

Formula (A)

wherein $R^1$, $R^2$, $R^3$, $R^4$, $R^5$, $R^6$, $R^7$, $R^9$ and $R^{10}$ each independently represent a hydrogen atom or substituent, with the proviso that at least one of $R^1$, $R^2$, $R^3$, $R^4$ and $R^5$ represents an electron-donating group; and $R^8$ represents a hydrogen atom, $C_1$-$C_4$ alkyl group, $C_2$-$C_6$ alkynyl group, $C_6$-$C_{12}$ aryl group, $C_1$-$C_{12}$ alkoxy group, $C_6$-$C_{12}$ aryloxy group, $C_2$-$C_{12}$ alkoxycarbonyl group, $C_2$-$C_{12}$ acylamino group, cyano group or halogen atom.

In the formula (A), $R^1$, $R^2$, $R^3$, $R^4$, $R^5$, $R^6$, $R^7$, $R^9$ and $R^{10}$ each independently represent a hydrogen atom or substituent. As the substituent there may be used a substituent T described later.

At least one of $R^1$, $R^2$, $R^3$, $R^4$ and $R^5$ represents an electron-donating group. Preferably, one of $R^1$, $R^3$ and $R^5$ represents an electron-donating group. More preferably, $R^3$ is an electron-donating group.

The term "electron-donating group" as used herein is meant to indicate a group having a Hammett's σp value of 0 or less. Those having a Hammett's σp value of 0 or less disclosed in "Chem. Rev.", 91, 165 (1991) are preferably used. More desirable among these groups are those having a Hammett's σp value of from −0.85 to 0. Examples of these groups include alkyl group, alkoxy group, amino group, and hydroxyl group.

As the electron-donating group there is preferably used alkyl group or alkoxy group, more preferably alkoxy group (preferably having from 1 to 12 carbon atoms, more preferably from 1 to 8 carbon atoms, even more preferably from 1 to 6 carbon atoms, particularly preferably from 1 to 4 carbon atoms).

$R^1$ in the formula (A) is preferably a hydrogen atom or electron-donating group, more preferably an alkyl group, alkoxy group, amino group or hydroxyl group, even more preferably a $C_1$-$C_4$ alkyl group or $C_1$-$C_{12}$ alkoxy group, particularly preferably an alkoxy group (preferably having from 1 to 12 carbon atoms, more preferably from 1 to 8 carbon atoms, even more preferably from 1 to 6 carbon atoms, particularly preferably from 1 to 4 carbon atoms), most preferably a methoxy group.

$R^2$ in the formula (A) is preferably a hydrogen atom, alkyl group, alkoxy group, amino group or hydroxyl group, more preferably a hydrogen atom, alkyl group or alkoxy group, even more preferably a hydrogen atom, alkyl group (preferably $C_1$-$C_4$ alkyl group, more preferably methyl group) or alkoxy group (preferably having from 1 to 12 carbon atoms, more preferably from 1 to 8 carbon atoms, even more preferably from 1 to 6 carbon atoms, particularly preferably from 1 to 4 carbon atoms), particularly a hydrogen atom, methyl group or methoxy group.

$R^3$ in the formula (A) is preferably a hydrogen atom or electron-donating group, more preferably a hydrogen atom, alkyl group, amino group or hydroxyl group, even more preferably an alkyl group or alkoxy group, particularly preferably an alkoxy group (preferably having from 1 to 12 carbon atoms, more preferably from 1 to 8 carbon atoms, further preferably from 1 to 6 carbon atoms, particularly preferably from 1 to 4 carbon atoms), most preferably n-propoxy group, ethoxy group, ethoxy group or methoxy group.

$R^4$ in the formula (A) is preferably a hydrogen atom or electron-donating group, more preferably a hydrogen atom, alkyl group, alkoxy group, amino group or hydroxyl group, even more preferably a hydrogen atom, $C_1$-$C_4$ alkyl group or $C_1$-$C_{12}$ alkyl group (preferably having from 1 to 12 carbon atoms, more preferably from 1 to 8 carbon atoms, further preferably from 1 to 6 carbon atoms, particularly preferably from 1 to 4 carbon atoms), particularly preferably a hydrogen atom, $C_1$-$C_4$ alkyl group or $C_1$-$C_4$ alkoxy group, most preferably a hydrogen atom, methyl group or methoxy group.

$R^5$ in the formula (A) is preferably a hydrogen atom, alkyl group, alkoxy group, amino group or hydroxyl group, more preferably a hydrogen atom, alkyl group or alkoxy group, even more preferably a hydrogen atom, alkyl group (preferably a $C_1$-$C_4$ alkyl group, more preferably methyl group) or alkoxy group (preferably having from 1 to 12 carbon atoms, more preferably from 1 to 8 carbon atoms, further preferably 1 to 6 carbon atoms, particularly preferably from 1 to 4 carbon atoms), particularly preferably a hydrogen atom, methyl group or methoxy group.

$R^6$, $R^7$, $R^9$ and $R^{10}$ in the formula (A) each are preferably a hydrogen atom, $C_1$-$C_{12}$ alkyl group, $C_1$-$C_{12}$ alkoxy group or halogen atom, more preferably a hydrogen atom or halogen atom, even more preferably a hydrogen atom.

$R^8$ in the formula (A) represents a hydrogen atom, $C_1$-$C_4$ alkyl group, $C_2$-$C_6$ alkynyl group, $C_6$-$C_{12}$ aryl group, $C_1$-$C_{12}$ alkoxy group, $C_6$-$C_{12}$ aryloxy group, $C_2$-$C_{12}$ alkoxycarbonyl group, $C_2$-$C_{12}$ acylamino group, cyano group or halogen atom. $R^8$ may have substituents if possible. As the substituents there may be used substituents T described later.

$R^8$ in the formula (A) is preferably a $C_1$-$C_4$ alkyl group, $C_2$-$C_6$ alkynyl group, $C_6$-$C_{12}$ aryl group, $C_1$-$C_{12}$ alkoxy group or $C_2$-$C_{12}$ aryloxy group, more preferably a $C_6$-$C_{12}$ aryl group, a $C_1$-$C_{12}$ alkoxy group, a $C_6$-$C_{12}$ aryloxy group, and further preferably a $C_1$-$C_{12}$ alkoxy group (preferably having from 1 to 12 carbon atoms, more preferably from 1 to 8 carbon atoms, further preferably from 1 to 6 carbon atoms, particularly preferably from 1 to 4 carbon atoms), particularly preferably a methoxy group, ethoxy group, n-propoxy group, iso-propoxy group or n-butoxy group.

The formula (A) is more preferably the following formula (I-A).

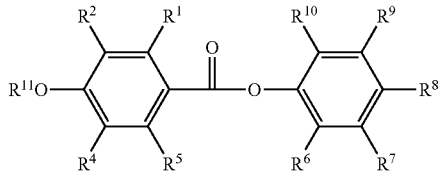

Formula (I-A)

wherein $R^{11}$ represents an alkyl group; $R^1$, $R^2$, $R^4$, $R^5$, $R^6$, $R^7$, $R^9$ and $R^{10}$ each independently represent a hydrogen atom or substituent; $R^8$ represents a hydrogen atom, $C_1$-$C_4$ alkyl group, $C_2$-$C_6$ alkynyl group, $C_6$-$C_{12}$ aryl group, $C_1$-$C_{12}$ alkoxy group, $C_6$-$C_{12}$ aryloxy group, $C_2$-$C_{12}$ alkoxycarbonyl group, $C_2$-$C_{12}$ acylamino group, cyano group or halogen atom.

In the formula (I-A), $R^1$, $R^2$, $R^4$, $R^5$, $R^6$, $R^7$, $R^8$, $R^9$ and $R^{10}$ are as defined in the formula (A), including their preferred range.

In the formula (I-A), $R^{11}$ represents a $C_1$-$C_{12}$ alkyl group. The alkyl group represented by $R^{11}$ may be straight-chain or branched or may further have substituents. $R^{11}$ is preferably a $C_1$-$C_{12}$ alkyl group, more preferably a $C_1$-$C_8$ alkyl group, even more preferably a $C_1$-$C_6$ alkyl group, particularly preferably a $C_1$-$C_4$ alkyl group (e.g., methyl, ethyl, n-propyl, iso-propyl, n-butyl, iso-butyl, tert-butyl).

The formula (A) is even more preferably the following formula (I-B).

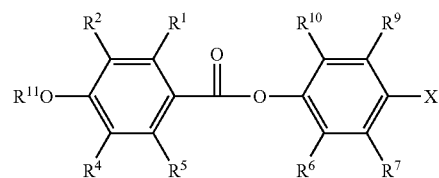

Formula (I-B)

wherein $R^1$, $R^2$, $R^4$, $R^5$, $R^6$, $R^7$, $R^9$ and $R^{10}$ each independently represent a hydrogen atom or substituent; $R^{11}$ represents a $C_1$-$C_{12}$ alkyl group; and X represents a $C_1$-$C_4$ alkyl group, $C_2$-$C_6$ alkynyl group, $C_6$-$C_{12}$ aryl group, $C_1$-$C_{12}$ alkoxy group, $C_6$-$C_{12}$ aryloxy group, $C_2$-$C_{12}$ alkoxycarbonyl group, $C_2$-$C_{12}$ acylamino group, cyano group or halogen atom.

In the formula (I-B), $R^1$, $R^2$, $R^4$, $R^5$, $R^6$, $R^7$, $R^9$ and $R^{10}$ are as defined in the formula (A), including their preferred range.

In the formula (I-B), $R^{11}$ is as defined in the formula (I-A), including their preferred range.

In the formula (I-B), X represents a $C_1$-$C_4$ alkyl group, $C_2$-$C_6$ alkynyl group, $C_6$-$C_{12}$ aryl group, $C_1$-$C_{12}$ alkoxy group, $C_6$-$C_{12}$ aryloxy group, $C_2$-$C_{12}$ alkoxycarbonyl group, $C_2$-$C_{12}$ acylamino group, cyano group or halogen atom.

When $R^1$, $R^2$, $R^4$ and $R^5$ each are a hydrogen atom, X is preferably an alkyl group, alkynyl group, aryl group, alkoxy group or aryloxy group, more preferably an aryl group, alkoxy group or aryloxy group, even more preferably an alkoxy group (preferably having from 1 to 12 carbon atoms, more preferably from 1 to 8 carbon atoms, further preferably from 1 to 6 carbon atoms, particularly preferably from 1 to 4 carbon atoms), particularly preferably a methoxy group, ethoxy group, n-propoxy group, iso-propoxy group or n-butoxy group.

When at least one of $R^1$, $R^2$, $R^4$ and $R^5$ is a substituent, X is preferably an alkynyl group, aryl group, alkoxycarbonyl group or cyano group, more preferably an aryl group (preferably having from 6 to 12 carbon atoms), cyano group, alkoxycarbonyl group (preferably having from 2 to 12 carbon atoms), even more preferably an aryl group (preferably a $C_6$-$C_{12}$ aryl group, more preferably phenyl group, p-cyanophenyl group or p-methoxyphenyl group), alkoxycarbonyl group (preferably a $C_2$-$C_{12}$ alkoxycarbonyl group, more preferably a $C_2$-$C_6$ alkoxycarbonyl group, even more preferably a $C_2$-$C_4$ alkoxycarbonyl group, particularly preferably methoxy carbonyl, ethoxycarbonyl or n-propoxycarbonyl) or cyano group, particularly preferably a phenyl group, methoxycarbonyl group, ethoxycarbonyl group, n-propoxycarbonyl group or cyano group.

The formula (A) is even more preferably the following formula (I-C).

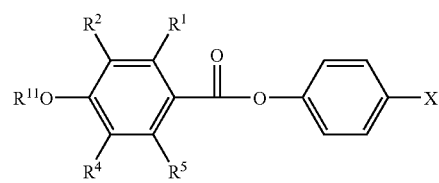

Formula (I-C)

wherein $R^1$, $R^2$, $R^4$, $R^5$, $R^{11}$ and X are as defined in the formula (I-B), including their preferred range.

More desirable among the compounds represented by the formula (A) is one represented by the following formula (I-D).

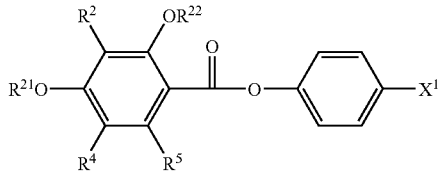

Formula (I-D)

wherein $R^2$, $R^4$ and $R^5$ are as defined in the formula (I-C), including their preferred range; $R^{21}$ and $R^{22}$ each independently represent a $C_1$-$C_4$ alkyl group; and $X^1$ represents a $C_6$-$C_{12}$ aryl group, $C_2$-$C_{12}$ alkoxycarbonyl group or cyano group.

$R^{21}$ represents a $C_1$-$C_4$ alkyl group, preferably a $C_1$-$C_3$ alkyl group, more preferably an ethyl group or methyl group.

$R^{22}$ represents a $C_1$-$C_4$ alkyl group, preferably a $C_1$-$C_3$ alkyl group, more preferably an ethyl group or methyl group, even more preferably a methyl group.

$X^1$ represents a $C_6$-$C_{12}$ aryl group, $C_2$-$C_{12}$ alkoxycarbonyl group or cyano group, preferably a $C_6$-$C_{10}$ aryl group, $C_2$-$C_6$ alkoxycarbonyl group or cyano group, more preferably a phenyl group, p-cyanophenyl group, p-methoxyphenyl group, methoxycarbonyl group, ethoxycarbonyl group, n-propoxycarbonyl group or cyano group, even more preferably a phenyl group, methoxycarbonyl group, ethoxycarbonyl group, n-propoxycarbonyl group or cyano group.

The formula (A) is most preferably the following formula (I-E).

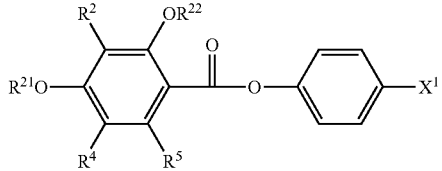

Formula (I-E)

wherein $R^2$, $R^4$ and $R^5$ are as defined in the formula (I-D), including their preferred range, with the proviso that any one of $R^2$, $R^4$ and $R^5$ is a group represented by —$OR^{13}$ (in which $R^{13}$ is a $C_1$-$C_4$ alkyl group); and $R^{21}$, $R^{22}$ and $X^1$ are as defined in the formula (I-D), including their preferred range.

In the formula (I-E), $R^2$, $R^4$ and $R^5$ are as defined in the formula (I-D), including their preferred range. However, any one of $R^2$, $R^4$ and $R^5$ is a group represented by —$OR^{13}$ (in which $R^{13}$ is a $C_1$-$C_4$ alkyl group). Preferably, $R^4$ or $R^5$ is a group represented by —$OR^{13}$. More preferably, $R^4$ is a group represented by —$OR^{13}$.

$R^{13}$ represents a $C_1$-$C_4$ alkyl group, preferably a $C_1$-$C_3$ alkyl group, more preferably an ethyl group or methyl group, even more preferably a methyl group.

The aforementioned substituent T will be further described hereinafter.

Examples of the substituent T include alkyl groups (preferably $C_1$-$C_{20}$, more preferably $C_1$-$C_{12}$, particularly preferably $C_1$-$C_8$ alkyl group, e.g., methyl, ethyl, iso-propyl, tert-butyl, n-octyl, n-decyl, n-hexadecyl, cyclopropyl, cyclopentyl, cyclohexyl), alkenyl groups (preferably $C_2$-$C_{20}$, more preferably $C_2$-$C_{12}$, particularly preferably $C_2$-$C_8$ alkenyl group, e.g., vinyl, allyl, 2-butenyl, 3-pentenyl), alkynyl groups (preferably $C_2$-$C_{20}$, more preferably $C_2$-$C_{12}$, particularly preferably $C_2$-$C_8$ alkynyl group, e.g., propargyl, 3-pentinyl), aryl groups (preferably $C_6$-$C_{30}$, more preferably $C_6$-$C_{20}$, particularly preferably $C_6$-$C_{12}$ aryl group, e.g., phenyl, p-methylphenyl, naphthyl), substituted or unsubstituted amino groups (preferably $C_0$-$C_{20}$, more preferably $C_0$-$C_{10}$, particularly $C_0$-$C_6$ amino group, e.g., amino, methylamino, dimethylamino, diethylamino, dibenzylamino), alkoxy groups (preferably $C_1$-$C_{20}$, more preferably $C_1$-$C_{12}$, particularly preferably $C_1$-$C_8$ alkoxy group, e.g., methoxy, ethoxy, butoxy), aryloxy groups (preferably $C_6$-$C_{20}$, more preferably $C_6$-$C_{16}$, particularly preferably $C_6$-$C_{12}$ aryloxy group, e.g., phenyloxy, 2-naphthyloxy), acyl groups (preferably $C_1$-$C_{20}$, more preferably $C_1$-$C_{16}$, particularly preferably $C_1$-$C_{12}$ acyl group, e.g., acetyl, benzoyl, formyl, pivaloyl), alkoxycarbonyl groups (preferably $C_2$-$C_{20}$, more preferably $C_2$-$C_{16}$, particularly preferably $C_2$-$C_{12}$ alkoxycarbonyl group, e.g., methoxycarbonyl, ethoxycarbonyl), aryloxycarbonyl groups (preferably $C_7$-$C_{20}$, more preferably $C_7$-$C_{16}$, particularly preferably $C_7$-$C_{10}$ aryloxycarbonyl group, e.g., phenyloxycarbonyl), acyloxy groups (preferably $C_2$-$C_{20}$, more preferably $C_2$-$C_{16}$, particularly preferably $C_2$-$C_{10}$ acyloxy group, e.g., acetoxy, benzoyloxy), acylamino groups (preferably $C_2$-$C_{20}$, more preferably $C_2$-$C_{16}$, particularly preferably $C_2$-$C_{10}$ acylamino group, e.g., acetylamino, benzoylamino), alkoxycarbonylamino groups (preferably $C_2$-$C_{20}$, more preferably $C_2$-$C_{16}$, particularly preferably $C_2$-$C_{12}$ alkoxycarbonylamino group, e.g., methoxycarbonylamino), aryloxycarbonylamino groups (preferably $C_7$-$C_{20}$, more preferably $C_7$-$C_{16}$, particularly preferably $C_7$-$C_{12}$ aryloxycarbonylamino group, e.g., phenyloxycarbonylamino), sulfonylamino groups (preferably $C_1$-$C_{20}$, more preferably $C_1$-$C_{16}$, particularly preferably $C_1$-$C_{12}$ sulfonylamino group, e.g., methanesulfonylamino, benzenesulfonylamino), sulfamoyl groups (preferably $C_0$-$C_{20}$, more preferably $C_0$-$C_{16}$, particularly preferably $C_0$-$C_{12}$ sulfamoyl group, e.g., sulfamoyl, methyl sulfamoyl, dimethyl sulfamoyl, phenyl sulfamoyl), carbamoyl groups (preferably $C_1$-$C_{20}$, more preferably $C_1$-$C_{16}$, particularly preferably $C_1$-$C_{12}$ carbamoyl group, e.g., carbamoyl, methyl carbamoyl, diethyl carbamoyl, phenyl carbamoyl), alkylthio groups (preferably $C_1$-$C_{20}$, more preferably $C_1$-$C_{16}$, particularly preferably $C_1$-$C_{12}$ alkylthio group, e.g., methylthio, ethylthio), arylthio groups (preferably $C_6$-$C_{20}$, more preferably $C_6$-$C_{16}$, particularly preferably $C_6$-$C_{12}$ arylthio group, e.g., phenylthio), sulfonyl groups (preferably $C_1$-$C_{20}$, more preferably $C_1$-$C_{16}$, particularly preferably $C_1$-$C_{12}$ sulfonyl group, e.g., mesyl, tosyl), sulfinyl groups (preferably $C_1$-$C_{20}$, more preferably $C_1$-$C_{16}$, particularly preferably $C_1$-$C_{12}$ sulfinyl group, e.g., methane sulfinyl, benzene sulfinyl), ureido groups (preferably $C_1$-$C_{20}$, more preferably $C_1$-$C_{16}$, particularly preferably $C_1$-$C_{12}$ ureido group, e.g., ureido, methyl ureido, phenyl ureido), phosphoric acid amide groups (preferably $C_1$-$C_{20}$, more preferably $C_1$-$C_{16}$, particularly preferably $C_1$-$C_{12}$ phosphoric acid amide group, e.g., diethylphosphoric acid amide, phenylphosphoric acid amide), hydroxy groups, mercapto groups, halogen atoms (e.g., fluorine, chlorine, bromine, iodine), cyano groups, sulfo groups, carboxyl groups, nitro groups, hydroxamic acids, sulfino groups, imino groups, heterocyclic groups (preferably $C_1$-$C_{30}$, more preferably $C_1$-$C_{12}$ heterocyclic group comprising as hetero atoms nitrogen atom, oxygen atom or sulfur atom, e.g., imidazolyl, pyridyl, quinolyl, furyl, piperidyl, morpholino, benzoxazoyl, benzimidazolyl, benzthiazolyl), and silyl groups (preferably $C_3$-$C_{40}$, more preferably $C_3$-$C_{30}$, particularly preferably $C_3$-$C_{24}$ silyl group, e.g., trimethylsilyl, triphenylsilyl). These substituents may be further substituted.

Two or more substituents, if any, may be the same or different. If possible, these substituents may be connected to each other to form a ring.

The compound represented by the formula (A) will be further described hereinafter with reference to their specific examples, but the invention is not limited thereto.

A-1
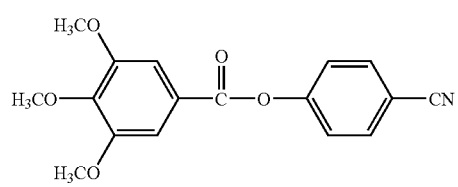

A-2
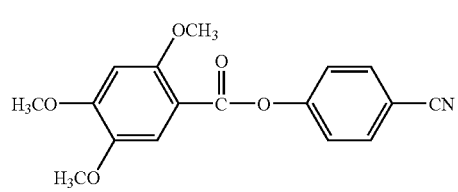

A-3
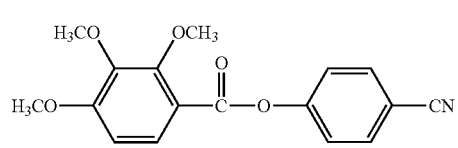

A-4
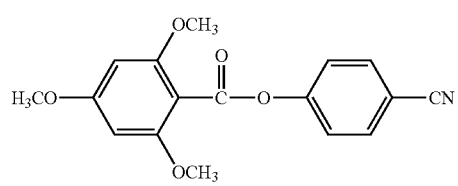

A-5
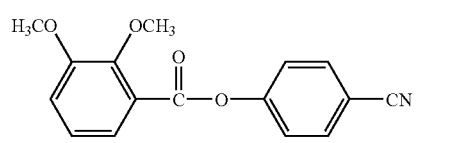

A-6
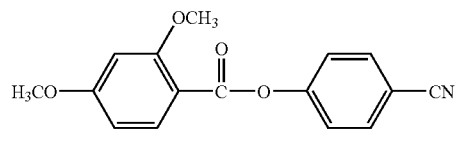

A-7
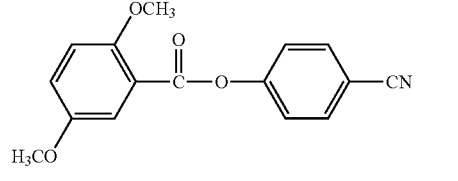

A-8
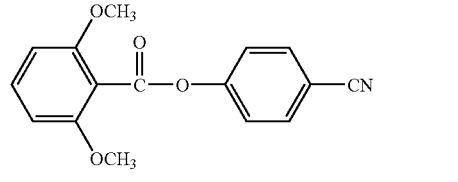

-continued

A-9
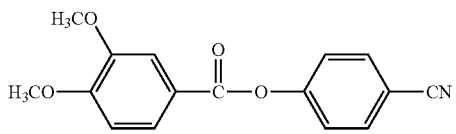

A-10
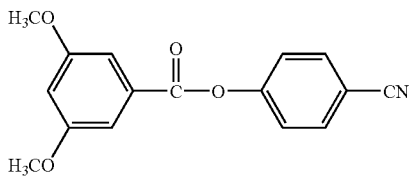

A-11
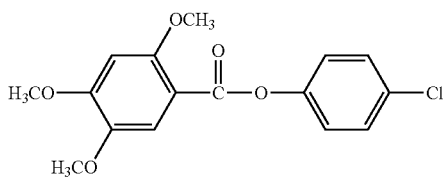

A-12
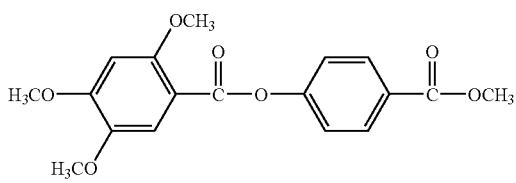

A-13
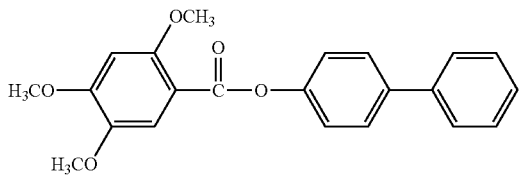

A-14
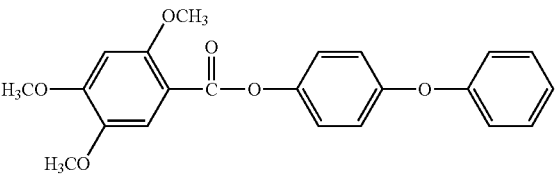

A-15
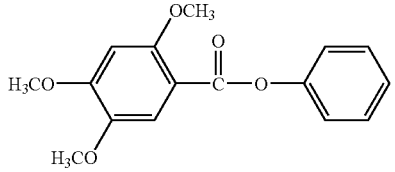

A-16
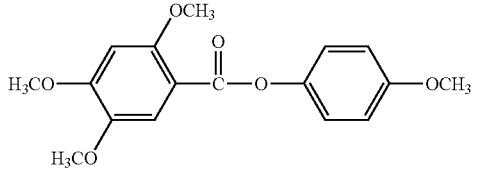

-continued

A-17: 2,4,5-trimethoxybenzoic acid 4-ethylphenyl ester

A-18: 2,4,5-trimethoxybenzoic acid 4-methylphenyl ester

A-19: 4-methoxybenzoic acid 4-methylphenyl ester

A-20: 4-methoxybenzoic acid 4-methoxyphenyl ester

A-21: 4-methoxybenzoic acid 4-ethoxyphenyl ester

A-22: 4-methoxybenzoic acid 4-propoxyphenyl ester

A-23: 4-ethoxybenzoic acid 4-methoxyphenyl ester

A-24: 4-ethoxybenzoic acid 4-ethoxyphenyl ester

A-25: 4-ethoxybenzoic acid 4-propoxyphenyl ester

A-26: 4-propoxybenzoic acid 4-methoxyphenyl ester

A-27: 4-propoxybenzoic acid 4-ethoxyphenyl ester

A-28: 4-propoxybenzoic acid 4-propoxyphenyl ester

A-29: 4-methoxybenzoic acid 4-hexyloxyphenyl ester

A-30: 4-hexyloxybenzoic acid 4-methoxyphenyl ester

A-31: 4-propoxybenzoic acid 4-butoxyphenyl ester

A-32: 4-propoxybenzoic acid 4-isopropoxyphenyl ester

A-33: 2,4,5-trimethoxybenzoic acid 4-ethynylphenyl ester

A-34: 2,4,5-trimethoxybenzoic acid 3-cyanophenyl ester

A-35: 2-methoxy-4-ethoxy-5-methoxybenzoic acid 4-cyanophenyl ester

A-36: 2-methoxy-4-propoxy-5-methoxybenzoic acid 4-cyanophenyl ester

A-37: 2-methoxy-4-methoxy-5-methylbenzoic acid 4-cyanophenyl ester

A-38: 2,4-dimethoxybenzoic acid 4-(propanoyloxy)phenyl ester

-continued

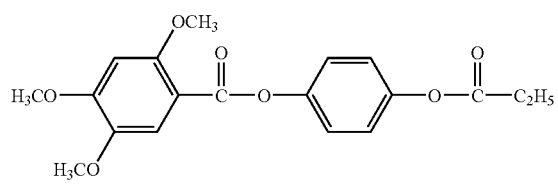
A-39

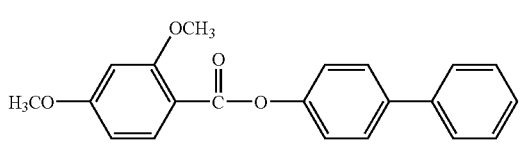
A-40

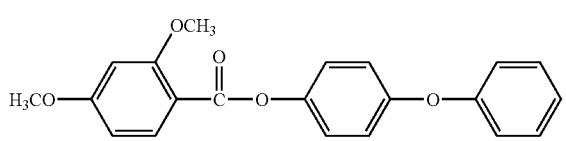
A-41

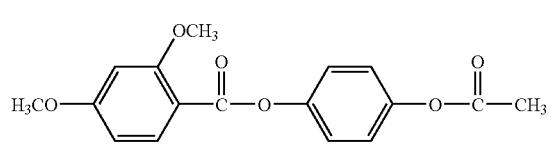
A-42

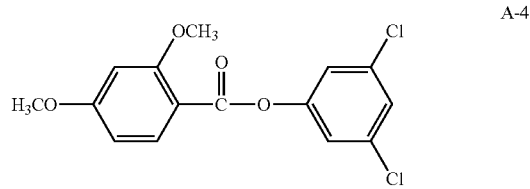
A-43

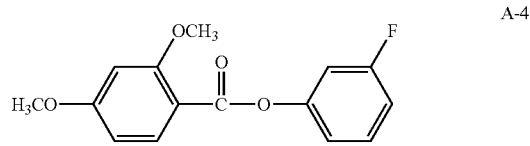
A-45

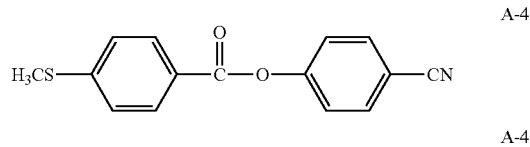
A-46

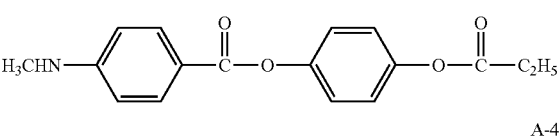
A-47

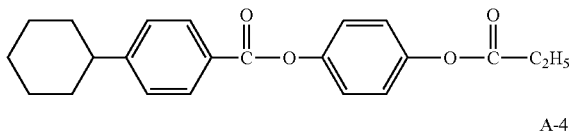
A-48

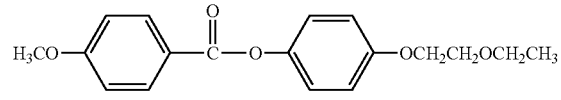
A-49

-continued

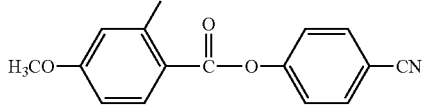
A-50

The compound represented by the formula (A) of the invention can be synthesized by any ordinary esterification reaction of a substituted benzoic acid with a phenol derivative so far as an ester bond can be formed. Examples of such an esterification reaction include a method involving the conversion of a substituted benzoic acid to an acid halide as functional group followed by condensation with phenol and a method involving the dehydration condensation of a substituted benzoic acid with a phenol derivative in the presence of a condensing agent or catalyst.

Taking into account the production process, the method involving the conversion of a substituted benzoic acid to an acid halide as functional group followed by condensation with phenol is preferred.

As the reaction solvent there may be used a hydrocarbon-based solvent (preferably toluene or xylene), ether-based solvent (preferably dimethyl ether, tetrahydrofurane, dioxane or the like), ketone-based solvent, ester-based solvent, acetonitrile, dimethyl formamide, dimethyl acetamide or the like. These solvents may be used singly or in admixture of two or more thereof. As the reaction solvent there is preferably toluene, acetonitrile, dimethylformamide or dimethylacetamide.

The reaction temperature preferably ranges from 0° C. to 150° C., more preferably from 0° C. to 100° C., even more preferably from 0° C. to 90° C., particularly preferably from 20° C. to 90° C.

The present reaction is preferably effected in the absence of a base. The base, if used, may be either an organic base or inorganic base, preferably an organic base such as pyridine and tertiary alkylamine (preferably triethylamine, ethyl diisopropylamine or the like).

Two or more rod-shaped compounds having a maximum absorption wavelength (λmax) of shorter than 250 nm in solution ultraviolet absorption spectrum may be used in combination.

[Particulate Matting Agent]

The optical resin film such as cellulose acylate film according to the invention preferably has a particulate material incorporated therein as a matting agent. Examples of the particulate material employable herein include silicon dioxide, titanium dioxide, aluminum oxide, zirconium oxide, calcium carbonate, talc, clay, calcined kaolin, calcined calcium silicate, hydrous calcium silicate, aluminum silicate, magnesium silicate, and calcium phosphate. The particulate material preferably contains silicon to reduce turbidity. In particular, silicon dioxide is preferred. The particulate silicon dioxide preferably has a primary average particle diameter of 20 nm or less and an apparent specific gravity of 70 g/l or more. The primary average particle diameter of the particulate silicon dioxide is more preferably as small as from 5 to 16 nm to reduce the haze of the film. The apparent specific gravity of the particulate silicon dioxide is preferably not smaller than from 90 to 200 g/l, more preferably not smaller than from 100 to 200 g/l. As the apparent specific gravity of the silicon dioxide rises, a high concentration dispersion can be prepared more easily to reduce haze and agglomeration.

The amount of the aforementioned particulate silicon dioxide, if used, is preferably from 0.01 to 0.3 parts by mass based on 100 parts by mass of the polymer component containing cellulose acylate.

These particles normally form secondary particles having an average particle diameter of from 0.1 to 3.0 μm. These particles are present in the film in the form of agglomerates of primary particles to form an unevenness having a height of from 0.1 to 3.0 μm on the surface of the film. The secondary average particle diameter is preferably from not smaller than 0.2 μm to not greater than 1.5 μm, more preferably from not smaller than 0.4 μm to not greater than 1.2 μm, most preferably from not smaller than 0.6 μm to not greater than 1.1 μm, When the secondary average particle diameter exceeds 1.5 μm, the resulting film exhibits a raised haze. On the contrary, when the secondary average particle diameter falls below 0.2 μm, the effect of preventing squeak is reduced.

For the determination of primary and secondary particle diameter, particles in the film are observed under scanning electron microphotograph. The particle diameter is defined by the diameter of the circle circumscribing the particle. 200 particles which are located in dispersed positions are observed. The measurements are averaged to determine the average particle diameter.

As the particulate silicon dioxide there may be used a commercially available product such as Aerosil R972, R972V, R974, R812, 200, 200V, 300, R202, OX50 and TT600 (produced by Nippon Aerosil Co., Ltd.). The particulate zirconium oxide is commercially available as Aerosil R976 and R811 (produced by Nippon Aerosil Co., Ltd.). These products can be used in the invention.

Particularly preferred among these products are Aerosil 200V and Aerosil R972V because they are a particulate silicon dioxide having a primary average particle diameter of 20 nm or less and an apparent specific gravity of 70 g/l or more that exerts a great effect of reducing friction coefficient while keeping the turbidity of the optical film low.

In the invention, in order to obtain a cellulose acylate film containing particles having a small secondary average particle diameter, various methods may be proposed to prepare a dispersion of particles. For example, a method may be employed which comprises previously preparing a particulate dispersion of particles in a solvent, stirring the particulate dispersion with a small amount of a cellulose acylate solution which has been separately prepared to make a solution, and then mixing the solution with a main cellulose acylate dope solution. This preparation method is desirable because the particulate silicon dioxide can be fairly dispersed and thus can be difficultly re-agglomerated. Besides this method, a method may be employed which comprises stirring a solution with a small amount of cellulose ester to make a solution, dispersing the solution with a particulate material using a dispersing machine to make a solution having particles incorporated therein, and then thoroughly mixing the solution having particles incorporated therein with a dope solution using an in-line mixer. The invention is not limited to these methods. The concentration of silicon dioxide during the mixing and dispersion of the particulate silicon dioxide with a solvent or the like is preferably from 5 to 30% by mass, more preferably from 10 to 25% by mass, most preferably from 15 to 20% by mass. As the concentration of dispersion rises, the turbidity of the solution with respect to the added amount decreases to further reduce haze and agglomeration to advantage. The content of the matting agent in the final cellulose acylate dope solution is preferably from 0.01 to 1.0 g, more preferably from 0.03 to 0.3 g, most preferably from 0.08 to 0.16 g per m$^2$.

Preferred examples of the solvent which is a lower alcohol include methyl alcohol, ethyl alcohol, propyl alcohol, isopropyl alcohol, and butyl alcohol. The solvent other than lower alcohol is not specifically limited, but solvents which are used during the preparation of cellulose ester are preferably used.

[Solvent]

The aforementioned organic solvent in which the cellulose acylate as an example of the resin to be used in the invention is dissolved will be described hereinafter.

The term "good solvent" as used herein is meant to indicate a solvent capable of dissolving cellulose acylate therein in an amount of 5 g or more per 100 g at 25° C. On the contrary, the term "poor solvent" as used herein is meant to indicate a solvent capable of dissolving cellulose acylate in an amount of less than 5 g per 100 g at 25° C.

In the invention, as the organic solvent there may be used either a chlorine-based solvent mainly composed of chlorine-based organic solvent or a nonchlorine-based solvent free of chlorine-based organic solvent.

(Chlorine-Based Solvent)

In order to prepare the cellulose acylate solution of the invention, as the main solvent there is preferably used a chlorine-based organic solvent. In the invention, the kind of the chlorine-based organic solvent is not specifically limited so far as the cellulose acylate can be dissolved and flow-casted to form a film, thereby attaining its aim. The chlorine-based organic solvent is preferably dichloromethane or chloroform. In particular, dichloromethane is preferred. The chlorine-based organic solvent may be used in admixture with organic solvents other than chlorine-based organic solvent. In this case, it is necessary that dichloromethane be used in an amount of at least 50% by mass based on the total amount of the organic solvents. Other organic solvents to be used in combination with the chlorine-based organic solvent in the invention will be described hereinafter. In some detail, other organic solvents employable herein are preferably selected from the group consisting of ester, ketone, ether, alcohol and hydrocarbon having from 3 to 12 carbon atoms. The ester, ketone, ether and alcohol may have a cyclic structure. A compound having two or more of functional groups (i.e., —O—, —CO—, and —COO—) of ester, ketone and ether, too, may be used as a solvent. The solvent may have other functional groups such as alcohol-based hydroxyl group at the same time. The number of carbon atoms in the solvent having two or more functional groups, if used, may fall within the range defined for the compound having any of these functional groups. Examples of $C_3$-$C_{12}$ esters include ethyl formate, propyl formate, pentyl formate, methyl acetate, ethyl acetate, and pentyl acetate. Examples of $C_3$-$C_{12}$ ketones include acetone, methyl ethyl ketone, diethyl ketone, diisobutyl ketone, cyclopentanone, cyclohexanone, and methyl cyclohexanone. Examples of $C_3$-$C_{12}$ ethers include diisopropyl ether, dimethoxymethane, dimethoxyethane, 1,4-dioxane, 1,3-dioxolane, tetrahydrofurane, anisole, and phenethol. Examples of the organic solvent having two or more functional groups include 2-ethoxyethyl acetate, 2-methoxyethanol, and 2-butoxyethanol.

The alcohol to be used in combination with the chlorine-based organic solvent may be preferably straight-chain, branched or cyclic. Preferred among these organic solvents is saturated aliphatic hydrocarbon. The hydroxyl group in the alcohol may be primary to tertiary. Examples of the alcohol employable herein include methanol, ethanol, 1-propanol, 2-propanol, 1-butanol, 2-butanol, t-butanol, 1-pentanol, 2-methyl-2-butanol, and cyclohexanol. As the alcohol there may be used also a fluorine-based alcohol. Examples of the fluorine-based alcohol include 2-fluoroethanol, 2,2,2-trifluoroethanol, and 2,2,3,3-tetrafluoro-1-propanol. Further, the hydrocarbon may be straight-chain, branched or cyclic. Either an aromatic hydrocarbon or aliphatic hydrocarbon may be used. The aliphatic hydrocarbon may be saturated or unsaturated. Examples of the hydrocarbon include cyclohexane, hexane, benzene, toluene, and xylene.

Examples of the combination of chlorine-based organic solvent and other organic solvents include the following formulations, but the invention is not limited thereto.

Dichloromethane/methanol/ethanol/butanol (80/10/5/5, parts by mass)

Dichloromethane/acetone/methanol/propanol (80/10/5/5, parts by mass)

Dichloromethane/methanol/butanol/cyclohexane (80/10/5/5, parts by mass)

Dichloromethane/methyl ethyl ketone/methanol/butanol (80/10/5/5, parts by mass)

Dichloromethane/acetone/methyl ethyl ketone/ethanol/isopropanol (75/8/5/5/7, parts by mass)

Dichloromethane/cyclopentanone/methanol/isopropanol (80/7/5/8, parts by mass)

Dichloromethane/methyl acetate/butanol (80/10/10, parts by mass)

Dichloromethane/cyclohexanone/methanol/hexane (70/20/5/5, parts by mass)

Dichloromethane/methyl ethyl ketone/acetone/methanol/ethanol (50/20/20/5/5, parts by mass)

Dichloromethane/1,3-dioxolane/methanol/ethanol (70/20/5/5, parts by mass)

Dichloromethane/dioxane/acetone/methanol/ethanol (60/20/10/5/5, parts by mass)

Dichloromethane/acetone/cyclopentanone/ethanol/isobutanol/cyclohexane (65/10/10/5/5/5, parts by mass)

Dichloromethane/methyl ethyl ketone/acetone/methanol/ethanol (70/10/10/5/5, parts by mass)

Dichloromethane/acetone/ethyl acetate/ethanol/butanol/hexane (65/10/10/5/5/5, parts by mass)

Dichloromethane/methyl acetoacetate/methanol/ethanol (65/20/10/5, parts by mass)

Dichloromethane/cyclopentanone/ethanol/butanol (65/20/10/5, parts by mass)

(Nonchlorine-Based Solvent)

The nonchlorine-based solvent which can be preferably used to prepare the cellulose acylate solution of the invention will be described hereinafter. The nonchlorine-based organic solvent to be used in the invention is not specifically limited so far as the cellulose acylate can be dissolved and flow-casted to form a film, thereby attaining its aim. The nonchlorine-based organic solvent employable herein is preferably selected from the group consisting of ester, ketone, ether and having from 3 to 12 carbon atoms. The ester, ketone and ether may have a cyclic structure. A compound having two or more of functional groups (i.e., —O—, —CO—, and —COO—) of ester, ketone and ether, too, may be used as a solvent. The solvent may have other functional groups such as alcohol-based hydroxyl group. The number of carbon atoms in the solvent having two or more functional groups, if used, may fall within the range defined for the compound having any of these functional groups. Examples of $C_3$-$C_{12}$ esters include ethyl formate, propyl formate, pentyl formate, methyl acetate, ethyl acetate, and pentyl acetate. Examples of $C_3$-$C_{12}$ ketones include acetone, methyl ethyl ketone, diethyl ketone, diisobutyl ketone, cyclopentanone, cyclohexanone, and methyl cyclohexanone. Examples of $C_3$-$C_{12}$ ethers include diisopropyl ether, dimethoxymethane, dimethoxyethane, 1,4-dioxane, 1,3-dioxolane, tetrahydrofurane, anisole, and phenethol. Examples of the organic solvent having two or more functional groups include 2-ethoxyethyl acetate, 2-methoxyethanol, and 2-butoxyethanol.

The nonchlorine-based organic solvent to be used for cellulose acylate may be selected from the aforementioned various standpoints of view but is preferably as follows. In some detail, the nonchlorine-based solvent is preferably a mixed solvent mainly composed of the aforementioned nonchlorine-based organic solvent. This is a mixture of three or more different solvents wherein the first solvent is at least one or a mixture of methyl acetate, ethyl acetate, methyl formate, ethyl formate, acetone, dioxolane and dioxane, the second solvent is selected from the group consisting of ketones or acetoacetic acid esters having from 4 to 7 carbon atoms and the third solvent is selected from the group consisting of alcohols or hydrocarbons having from 1 to 10 carbon atoms, preferably alcohols having from 1 to 8 carbon atoms. In the case where the first solvent is a mixture of two or more solvents, the second solvent may be omitted. The first solvent is more preferably methyl acetate, acetone, methyl formate, ethyl formate or mixture thereof. The second solvent is preferably methyl ethyl ketone, cyclopentanone, cyclohexanone, methyl acetylacetate or mixture thereof.

The third solvent which is an alcohol may be straight-chain, branched or cyclic. Preferred among these alcohols are unsaturated aliphatic hydrocarbons. The hydroxyl group in the alcohol may be primary to tertiary. Examples of the alcohol include methanol, ethanol, 1-propanol, 2-propanol, 1-butanol, 2-butanol, t-butanol, 1-pentanol, 2-methyl-2-butanol, and cyclohexanol. As the alcohol there may be used also a fluorine-based alcohol. Examples of the fluorine-based alcohol include 2-fluoroethanol, 2,2,2-trifluoroethanol, and 2,2,3,3-tetrafluoro-1-propanol. Further, the hydrocarbon may be straight-chain, branched or cyclic. Either an aromatic hydrocarbon or aliphatic hydrocarbon may be used. The aliphatic hydrocarbon may be saturated or unsaturated. Examples of the hydrocarbon include cyclohexane, hexane, benzene, toluene, and xylene. The alcohols and hydrocarbons which are third solvents may be used singly or in admixture of two or more thereof without any limitation. Specific examples of the alcohol which is a third solvent include methanol, ethanol, 1-propanol, 2-propanol, 1-butanol, 2-butanol, cyclohexanol, cyclohexane, and hexane. Particularly preferred among these alcohols are methanol, ethanol, 1-propanol, 2-propanol, and 1-butanol.

Referring to the mixing ratio of the aforementioned three solvents, the mixing ratio of the first solvent, the second solvent and the third solvent are preferably from 20 to 95% by mass, from 2 to 60% by mass and from 2 to 30% by mass, more preferably from 30 to 90% by mass, from 3 to 50% by mass and from 3 to 25% by mass, particularly from 30 to 90% by mass, from 3 to 30% by mass and from 3 to 15% by mass, respectively, based on the total mass of the mixture. For the details of the nonchlorine-based organic solvents to be used in the invention, reference can be made to Kokai Giho No. 2001-1745, Mar. 15, 2001, pp. 12-16, Japan Institute of Invention and Innovation. Examples of the combination of nonchlorine-based organic solvents include the following formulations, but the invention is not limited thereto.

Methyl acetate/acetone/methanol/ethanol/butanol (75/10/5/5/5, parts by mass)

Methyl acetate/acetone/methanol/ethanol/propanol (75/10/5/5/5, parts by mass)

Methyl acetate/acetone/methanol/butanol/cyclohexane (75/10/5/5/5, parts by mass)

Methyl acetate/acetone/ethanol/butanol (81/8/7/4, parts by mass)
Methyl acetate/acetone/ethanol/butanol (82/10/4/4, parts by mass)
Methyl acetate/acetone/ethanol/butanol (80/10/4/6, parts by mass)
Methyl acetate/methyl ethyl ketone/methanol/butanol (80/10/5/5, parts by mass)
Methyl acetate/acetone/methyl ethyl ketone/ethanol/isopropanol (75/8/5/5/7, parts by mass)
Methyl acetate/cyclopentanone/methanol/isopropanol (80/7/5/8, parts by mass)
Methyl acetate/acetone/butanol (85/10/5, parts by mass)
Methyl acetate/cyclopentanone/acetone/methanol/butanol (60/15/14/5/6, parts by mass)
Methyl acetate/cyclohexanone/methanol/hexane (70/20/5/5, parts by mass)
Methyl acetate/methyl ethyl ketone/acetone/methanol/ethanol (50/20/20/5/5, parts by mass)
Methyl acetate/1,3-dioxolane/methanol/ethanol (70/20/5/5, parts by mass)
Methyl acetate/dioxane/acetone/methanol/ethanol (60/20/10/5/5, parts by mass)
Methyl acetate/acetone/cyclopentanone/ethanol/isobutanol/cyclohexane (65/10/10/5/5/5, parts by mass)
Methyl formate/methyl ethyl ketone/acetone/methanol/ethanol (50/20/20/5/5, parts by mass)
Methyl formate/acetone/ethyl acetate/ethanol/butanol/hexane (65/10/10/5/5/5, parts by mass)
Acetone/methyl acetoacetate/methanol/ethanol (65/20/10/5, parts by mass)
Acetone/cyclopentanone/methanol/butanol (65/20/10/5, parts by mass)
Acetone/1,3-dioxolane/ethanol/butanol (65/20/10/5, parts by mass)
1,3-Dioxolane/cyclohexanone/methyl ethyl ketone/methanol/butanol (55/20/10/5/5, parts by mass)

Further, cellulose acylate solutions prepared by the following methods may be used.

Method which comprises preparing a cellulose acylate solution with methyl acetate/acetone/ethanol/butanol (81/8/7/4, parts by mass), filtering and concentrating the solution, and then adding 2 parts by mass of butanol to the solution Method which comprises preparing a cellulose acylate solution with methyl acetate/acetone/ethanol/butanol (84/10/4/2, parts by mass), filtering and concentrating the solution, and then adding 4 parts by mass of butanol to the solution Method which comprises preparing a cellulose acylate solution with methyl acetate/acetone/ethanol (84/10/6, parts by mass), filtering and concentrating the solution, and then adding 5 parts by mass of butanol to the solution The dope to be used in the invention comprises dichloromethane incorporated therein in an amount of 10% by mass or less based on the total mass of the organic solvents of the invention besides the aforementioned nonchlorine-based organic solvent of the invention.

(Properties of Cellulose Acylate Solution)

The cellulose acylate solution of the invention preferably comprises cellulose acylate incorporated in the aforementioned organic solvent in an amount of from 10 to 30% by mass, more preferably from 13 to 27% by mass, particularly from 15 to 25% by mass from the standpoint of adaptability to film flow casting. The adjustment of the concentration of the cellulose acylate solution to the predetermined range may be effected at the dissolution step. Alternatively, a cellulose acylate solution which has been previously prepared in a low concentration (e.g., 9 to 14% by mass) may be adjusted to the predetermined concentration range at a concentrating step described later. Alternatively, a cellulose acylate solution which has been previously prepared in a high concentration may be adjusted to the predetermined lower concentration range by adding various additives thereto. Any of these methods may be used so far as the predetermined concentration range can be attained.

In the invention, the molecular weight of the associated cellulose acylate in the cellulose acylate solution which has been diluted with an organic solvent having the same formulation to a concentration of from 0.1 to 5% by mass is preferably from 150,000 to 15,000,000, more preferably from 180,000 to 9,000,000 from the standpoint of solubility in solvent. For the determination of the molecular weight of associated product, a static light scattering method may be used. The dissolution is preferably effected such that the concurrently determined square radius of inertia ranges from 10 to 200 nm, more preferably from 20 to 200 nm. Further, the dissolution is preferably effected such that the second virial coefficient ranges from $-2 \times 10^{-4}$ to $+4 \times 10^{-4}$, more preferably from $-2 \times 10^{-4}$ to $+2 \times 10^{-4}$.

The definition of the molecular weight of the associated product, the square radius of inertia and the second virial coefficient will be described hereinafter. These properties are measured by static light scattering method in the following manner. The measurement is made within a dilute range for the convenience of device, but these measurements reflect the behavior of the dope within the high concentration range of the invention.

Firstly, the cellulose acylate is dissolved in the same solvent as used for dope to prepare solutions having a concentration of 0.1% by mass, 0.2% by mass, 0.3% by mass and 0.4% by mass, respectively. The cellulose acylate to be weighed is dried at 120° C. for 2 hours before use to prevent moistening. The cellulose acylate thus dried is then weighed at 25° C. and 10% RH. The dissolution of the cellulose acylate is effected according to the same method as used in the dope dissolution (ordinary temperature dissolution method, cooled dissolution method, high temperature dissolution method). Subsequently, these solutions with solvent are filtered through a Teflon filter having a pore diameter of 0.2 μm. The solutions thus filtered are each then measured for static light scattering every 10 degrees from 30 degrees to 140 degrees at 25° C. using a Type DLS-700 light scattering device (produced by Otsuka Electronics Co., Ltd.). The data thus obtained are then analyzed by Berry plotting method. For the determination of refractive index required for this analysis, the refractive index of the solvent is measured by an Abbe refractometer. For the determination of concentration gradient of refractive index (dn/dc), the same solvent and solution as used in the measurement of light scattering are measured using a type DRM-1021 different refractometer (produced by Otsuka Electronics Co., Ltd.).

(Preparation of Dope)

The preparation of the cellulose acylate solution (dope) as an example of the resin solution according to the invention will be described hereinafter. The method of dissolving the cellulose acylate is not specifically limited. The dissolution of the cellulose acylate may be effected at room temperature. Alternatively, a cooled dissolution method or a high temperature dissolution method may be used. Alternatively, these dissolution methods may be in combination. For the details of the method of preparing a cellulose acylate solution, reference can be made to JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017, and JP-A-11-302388. The aforementioned method of dissolving cellulose acylate in an organic solvent may be applied also to the invention so far as it falls within the scope of the invention. For the details of these methods, reference can be made to Kokai Giho No. 2001-1745, Mar. 15, 2001, pp. 22-25, Japan Institute of Invention and Innovation. The cellulose acylate dope solution of the invention is then subjected to concentration and filtration. For the details of these methods, reference can be made similarly to Kokai Giho No. 2001-1745, Mar. 15, 2001, page 25, Japan Institute of Invention and Innovation. In the case where dissolution is effected at high temperatures, the temperature is higher than the boiling point of the organic solvent used in most cases. In this case, dissolution is effected under pressure.

The viscosity and dynamic storage elastic modulus of the cellulose acylate solution preferably fall within the following range from the standpoint of flow-castability. 1 mL of the sample solution is measured using a Type CLS 500 rheometer (produced by TA Instruments) with a steel cone having a diameter of 4 cm/2° (produced by TA Instruments). Referring to the measurement conditions, measurement is effected every 2° C. per minute within a range of from −10° C. to 40° C. at an oscillation step with temperature ramp to determine 40° C. static non-Newton viscosity n*(Pa·s) and −5° C. storage elastic modulus G'(Pa). The sample solution is previously kept at the measurement starting temperature before measurement. In the invention, the sample solution preferably has a 40° C. viscosity of from 1 to 400 Pa·s, more preferably from 10 to 200 Pa·s, and a 15° C. dynamic storage elastic modulus of 500 Pa or more, more preferably from 100 to 1,000,000 Pa. The low temperature dynamic storage elastic modulus of the sample solution is preferably as great as possible. For example, if the flow casting support has a temperature of −5° C., the dynamic storage elastic modulus of the sample solution is preferably from 10,000 to 1,000,000 Pa at −5° C. If the flow casting support has a temperature of −50° C., the dynamic storage elastic modulus of the sample solution is preferably from 10,000 to 5,000,000 Pa at −50° C.

In the invention, in the case where the aforementioned specific cellulose acylate is used, a high concentration dope is obtained. Thus, a high concentration cellulose acylate solution having an excellent stability can be obtained without relying on the concentrating method. In order to further facilitate dissolution, the cellulose acylate may be dissolved in a low concentration. The solution thus prepared is then concentrated by a concentrating method. The concentrating method is not specifically limited. For example, a method may be used which comprises introducing a low concentration solution into the gap between a case body and the rotary orbit of the periphery of a rotary blade that rotates circumferentially inside the case body while giving a temperature difference between the solution and the case body to vaporize the solution, thereby obtaining a high concentration solution (see, e.g., JP-A-4-259511). Alternatively, a method may be used which comprises blowing a heated low concentration solution into a vessel through a nozzle so that the solvent is flash-evaporated over the distance from the nozzle to the inner wall of the vessel while withdrawing the solvent thus evaporated from the vessel and the resulting high concentration solution from the bottom of the vessel (see, e.g., U.S. Pat. Nos. 2,541,012, 2,858,229, 4,414,341, 4,504,355).

Prior to flow casting, the solution is preferably freed of foreign matters such as undissolved matter, dust and impurities by filtration through a proper filtering material such as metal gauze and flannel. For the filtration of the cellulose acylate solution, a filter having an absolute filtration precision of from 0.1 to 100 μm is preferably used. More preferably, a filter having an absolute filtration precision of from 0.5 to 25 μm is used. The thickness of the filter is preferably from 0.1 to 10 mm, more preferably from 0.2 to 2 mm. In this case, filtration is preferably effected under a pressure of 1.6 MPa or less, more preferably 1.2 MPa or less, even more preferably 1.0 MPa or less, particularly 0.2 MPa or less. As the filtering material there is preferably used any known material such as glass fiber, cellulose fiber, filter paper and fluororesin, e.g., ethylene tetrafluoride resin. In particular, ceramics, metal, etc. are preferably used. The viscosity of the cellulose acylate solution shortly before filming may be arbitrary so far as the cellulose acylate solution can be flow-casted during filming and normally is preferably from 10 Pa·s to 2,000 Pa·s, more preferably from 30 Pa·s to 1,000 Pa·s, even more preferably from 40 Pa·s to 500 Pa·s. The temperature of the cellulose acylate solution shortly before filming is not specifically limited so far as it is the flow casting temperature but is preferably from −5° C. to +70° C., more preferably from −5° C. to +55° C.

<Filming>

The optical resin film according to the invention, e.g., cellulose acylate film can be obtained by filming the aforementioned cellulose acylate solution. As the filming method and the filming device there may be used any solution flow casting/filming method and solution flow casting/filming device for use in the related art method of producing cellulose acylate film, respectively. The dope (cellulose acylate solution) prepared in the dissolving machine (kiln) is stored in a storage kiln so that bubbles contained in the dope are removed to make final adjustment. The dope thus adjusted is then delivered from the dope discharge port to a pressure die through a pressure constant rate gear pump capable of delivering a liquid at a constant rate with a high precision depending on the rotary speed. The dope is then uniformly flow-casted through the slit of the pressure die over a metallic support in the flow casting portion which is being running endlessly. When the metallic support has made substantially one turn, the half-dried dope film (also referred to as "web") is then peeled off the metallic support. The web thus obtained is then dried while being conveyed by a tenter with the both ends thereof being clamped by a clip to keep its width. Subsequently, the web is conveyed by a group of rolls in the drying apparatus to finish drying. The web is then wound to a predetermined length by a winding machine. The combination of tenter and a group of rolls varies with the purpose. In a solution flow casting/filming method for use in functional protective layer for electronic display, a coating device is often added to the solution flow casting/filming device for the purpose of surface working of film such as subbing layer, antistatic layer, anti-halation layer and protective layer. The various producing steps will be briefly described hereinafter, but the invention is not limited thereto.

Firstly, in order to prepare a cellulose acylate film by a solvent flow casting method, the cellulose acylate solution (dope) thus prepared is flow-casted over a drum or band so that the solvent is evaporated to form a film. The dope to be flow-casted is preferably adjusted in its concentration such that the solid content is from 5 to 40% by mass. It is preferred that the surface of the drum or band be previously mirror-like finished. The dope is preferably flow-casted over a drum or band having a surface temperature of 30° C. or less, particularly over a metallic support having a temperature of from −10 to 20° C. Further, methods disclosed in JP-A-2000-301555, JP-A-2000-301558, JP-A-07-032391, JP-A-03-193316, JP-A-05-086212, JP-A-62-037113, JP-A-02-276607, JP-A-55-014201, JP-A-02-111511, and JP-A-02-208650 may be used in the invention.

(Multi-Layer Flow Casting)

The cellulose acylate solution may be flow-casted over a smooth band or drum as a metallic support in the form of a single layer. Alternatively, two or more cellulose acylate solutions may be flow-casted over the metallic support. In the case where a plurality of cellulose acylate solutions are flow-casted, a cellulose acylate-containing solution may be flow-casted over the metallic support through a plurality of flow casting ports disposed at an interval along the direction of running of the metallic support to make lamination. For example, any method as disclosed in JP-A-61-158414, JP-A-1-122419, and JP-A-11-198285 may be employed. Alternatively, a cellulose acylate solution may be flow-casted through two flow casting ports to make filming. For example, any method as disclosed in JP-B-60-27562, JP-A-61-94724, JP-A-61-947245, JP-A-61-104813, JP-A-61-158413, and JP-A-6-134933 may be employed. As disclosed in JP-A-56-162617, a cellulose acylate film flow casting method may be used which comprises simultaneously flow-casting a high viscosity cellulose acylate solution and a low viscosity cellulose acylate solution with a flow of the high viscosity cellulose acylate solution surrounded by the low viscosity cellulose acylate solution. Further, as disclosed in JP-A-61-94724 and JP-A-61-94725, it is a preferred embodiment that the outer solution contains a greater content of an alcohol component as a poor solvent than the inner solution. Alternatively, two flow casting ports may be used so that the film formed on the metallic support by the first flow casting port is peeled off the metallic support and the second flow casting is then made on the side of the film which has come in contact with the metallic support. For example, a method disclosed in JP-B-44-20235 may be used. The cellulose acylate solutions to be flow-casted may be the same or different and thus are not specifically limited. In order to render a plurality of cellulose acylate layers functional, cellulose acylate solutions having a formulation according to the function may be extruded through the respective flow casting port. The flow casting of the cellulose acylate solution may be accompanied by the flow casting of other functional layers (e.g., adhesive layer, dye layer, antistatic layer, anti-halation layer, ultraviolet-absorbing layer, polarizing layer).

In order to form a film having a desired thickness from the related art single layer solution, it is necessary that a cellulose acylate solution having a high concentration and a high viscosity be extruded. In this case, a problem often arises that the cellulose acylate solution exhibits a poor stability and thus forms a solid material that causes the generation of granular structure or poor planarity. In order to solve these problems, a plurality of cellulose acylate solutions can be flow-casted through flow casting ports, making it possible to extrude high viscosity solutions onto the metallic support at the same time. In this manner, a film having an improved planarity and hence excellent surface conditions can be prepared. Further, the use of a highly concentrated cellulose acylate solution makes it possible to attain the reduction of the drying load that can enhance the production speed of film. In the case of co-casting method, the thickness of the inner solution and the outer solution are not specifically limited, but the thickness of the outer solution is preferably from 1 to 50%, more preferably from 2 to 30% of the total thickness. In the case of co-casting of three of more layers, the sum of the thickness of the layer in contact with the metallic support and the layer in contact with air is defined as the thickness of the outer layer.

In the case of co-casting, cellulose acylate solutions having different concentrations of the aforementioned additives such as plasticizer, ultraviolet absorber and matting agent can be co-casted to a cellulose acylate film having a laminated structure. For example, a cellulose acylate film having a skin layer/core layer/skin layer structure can be prepared. For example, the matting agent can be incorporated much or only in the skin layer. The plasticizer and ultraviolet absorber may be incorporated more in the core layer than in the skin layer or only in the core layer. The kind of the plasticizer and the ultraviolet absorber may differ from the core layer to the skin layer. For example, at least either of low volatility plasticizer and ultraviolet absorber may be incorporated in the skin layer while a plasticizer having an excellent plasticity or an ultraviolet absorber having excellent ultraviolet absorbing properties may be incorporated in the core layer. In another preferred embodiment, a peel accelerator may be incorporated in only the skin layer on the metallic support side. It is also preferred that the skin layer contain an alcohol as a poor solvent more than the core layer in order that the solution might be gelled by cooling the metallic support by a cooled drum method. The skin layer and the core layer may have different Tg values. It is preferred that Tg of the core layer be lower than that of the skin layer. Further, the viscosity of the solution containing cellulose acylate may differ from the skin layer to the core layer during flow casting. It is preferred that the viscosity of the skin layer be lower than that of the core layer. However, the viscosity of the core layer may be lower than that of the skin layer.

(Flow Casting)

Examples of the solution flow casting method include a method which comprises uniformly extruding a dope prepared onto a metallic support through a pressure die, a doctor blade method which comprises adjusting the thickness of a dope flow-casted over a metallic support using a blade, and a reverse roll coater method which comprises adjusting the thickness of the dope flow-casted using a roll that rotates in the reverse direction. Preferred among these flow casting methods is the pressure die method. Examples of the pressure die include coat hunger type pressure die, and T-die type pressure die. Any of these pressure dies may be preferably used. Besides the aforementioned methods, various conventional methods for flow casting/filming a cellulose triacetate solution may be effected. By predetermining the various conditions taking into account the difference in boiling point between solvents used, the same effects as the contents disclosed in the above cited references can be exerted. As the endless running metallic support to be used in the production of the cellulose acylate film of the invention there may be used a drum which has been mirror-like finished by chromium plating or a stainless steel belt (also referred to as "band") which has been mirror-like finished by polishing. One or more pressure dies for producing the cellulose acylate film of the invention may be disposed above the metallic support. Preferably, the number of pressure dies is 1 or 2. In the case where two or more pressure dies are provided, the dope to be flow-casted may be allotted to these dies at various ratios. A plurality of precision constant rate gear pumps may be used to deliver the dope to these dies at the respect ratio. The temperature of the cellulose acylate solution to be flow-casted is preferably from −10 to 55° C., more preferably from 25 to 50° C. In this case, the temperature of the cellulose acylate solution may be the same at all the steps or may differ from step to step. In the latter case, it suffices if the temperature of the cellulose acylate solution is the desired temperature shortly before being flow-casted.

(Drying Step D1)

General examples of the method of drying the dope on the metallic support in the production of the cellulose acylate film include a method which comprises blowing a hot air against the web on the front surface of the metallic support (drum or band), that is, the front surface of the web on the metallic support or on the back surface of the drum or band, and a liquid heat conduction method which comprises allowing a temperature-controlled liquid to come in contact with the back surface of the belt or drum, which is the side thereof opposite the dope flow-casting surface, so that heat is conducted to the drum or belt to control the surface temperature. Preferred among these drying methods is the back surface liquid heat conduction method. The surface temperature of the metallic support before flow casting may be arbitrary so far as it is not higher than the boiling point of the solvent used in the dope. However, in order to accelerate drying or eliminate fluidity on the metallic support, it is preferred that the surface temperature of the metallic support be predetermined to be from 1 to 10° C. lower than the boiling point of the solvent having the lowest boiling point among the solvents used. However, this limitation is not necessarily applied in the case where the flow-casted dope is cooled and peeled off the metallic support without being dried.

In the invention, the step D0 indicates a step of peeling the film thus flow-casted and then conveying the film to the tenter portion. At the step D0, the temperature is preferably controlled for the purpose of controlling the amount of solvent remaining in the film during stretching.

The film conveying tension at the step D0 is affected by the physical properties of the dope and the amount of residual solvent and temperature at the step D0 but is preferably from 30 N/m² to 300 N/m². When the film conveying tension exceeds the above defined range, the uniformity of the film is affected, remotely causing unevenness in display.

The ratio of good solvent to poor solvent at the end of the step D0 is preferably defined within a preferred range to prevent the elongation of the film due to conveyance. The ratio of mass of poor solvent/(mass of good solvent+mass of poor solvent)×100 (%) at the end of the step D0 is preferably from 15% to 95% by mass, more preferably from 25% to 95% by mass, particularly preferably from 30% to 95% by mass.

(Preferred Production Method 1 in the Invention)

A stretching step according to the aforementioned preferred production method 1 in the invention will be described in connection with FIGS. 11 and 12.

Figure 11:
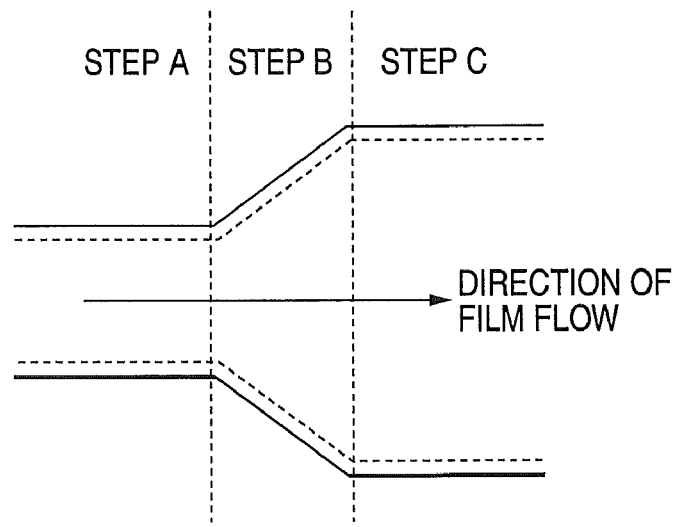
FIG. 11 is a diagram illustrating the relationship of the gripping step A, the crosswise stretching step B and the crosswise relaxing step C of the invention.
Figure 12:
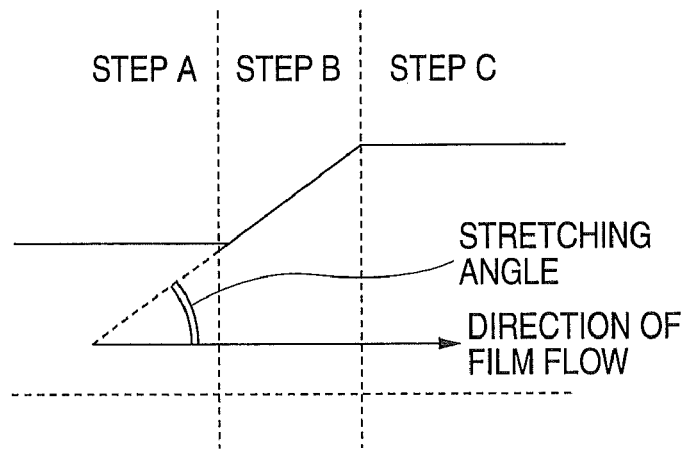
FIG. 12 is a diagram illustrating an embodiment of the stretching step B.

In FIG. 11, the step A involves gripping of the film conveyed from the film conveying step D0 (not shown). The subsequent step B involves the stretching of the film at a stretching angle shown in FIG. 12 in the crosswise direction (direction perpendicular to the direction of flow of film). At the step C, the stretching of the film is terminated, followed by the conveyance of the film while being gripped. In some cases, the film may be relaxed.

(Amount of Residual Solvent at the Beginning of Stretching at the Step B)

The amount of residual solvent at the beginning of the step B is preferably adjusted to a range of from 5% to 90% by mass, more preferably from 10% to 90% by mass, most preferably from 10% to 40% by mass.

It is known that the distribution of optical slow axes in the film crosswise direction (distribution of angle of alignment) worsens at the step of stretching the film in the direction perpendicular to the conveying direction. In order to stretch the film in such a manner that the distribution of angle of alignment is in a good state, supposing that the concentration of good solvent at the steps A, B and C are Ma, Mb and Mc, respectively, Ma is preferably more than 2,000 ppm, more preferably more than 3,000 ppm, most preferably more than 60% of saturated concentration of good solvent vapor, Mb is preferably more than 2,000 ppm, more preferably more than 3,000 ppm, most preferably more than 60% of saturated concentration of good solvent vapor, and Mc is preferably less than 60% of saturated concentration of good solvent vapor, more preferably less than 3,000 ppm, most preferably less than 2,500 ppm.

(Content (%) of Poor Solvent in Solvent Remaining in the Film)

The stretching step has a desired ratio of good solvent to poor solvent. The ratio of mass of residual poor solvent/(mass of residual good solvent+mass of residual poor solvent)× 100% at the end of the steps A, B and C each are preferably from 15% to 95% by mass, more preferably from 25% to 95% by mass, most preferably from 30% to 95% by mass. Further, the ratio of mass of residual poor solvent+mass of residual poor solvent)×100% at the end of the steps A, B and C may be the same or different.

(Predetermination of Film Temperature at the Steps A, B and C and Amount of Residual Solvent)

During the stretching of film, the film is stretched while it is still soft at the step B. At the steps A and C, the base of the film is preferably harder than at the step B. The desired vapor conditions can be attained by properly controlling the film temperature and the amount of solvent remaining in the film.

The ambient temperature at the various steps is affected by the amount of solvent remaining in the film but is preferably from 30° C. to 40° C. at the step A or from 30° C. to 140° C. at the steps B and C. In some detail, when the amount of solvent remaining in the film at the end of the step B is from 0.4 to 0.8 of the amount of solvent remaining in the film at the beginning of the step B, the ambient temperature at the step B is preferably from 110° C. to 140° C. When the amount of solvent remaining in the film at the end of the step B is from 0.4 to 0.8 of the amount of solvent remaining in the film at the beginning of the step B, the film temperature at the beginning of the step B is preferably from 30° C. to 140° C. and the film temperature at the end of the step B is preferably from 70° C. to 140° C.

The stretching time at the step B has a preferred range to enhance the uniformity of the film. In some detail, the stretching time is preferably from 1 to 10 seconds, more preferably from 4 to 10 seconds.

Further, the stretching of the film may be effected at a constant or varying rate but at a rate of from 50%/min to 500%/min, preferably from 100%/min to 400%/min, most preferably from 200%/min to 300%/min.

In the invention, as previously mentioned, supposing that the average drying speed at the gripping step and stretching speed is A %/sec and the average drying speed at the relaxing step is B %/sec, when the film is dried at A/B of from 1.9 to 4.2, the film having a small retardation distribution of the invention can be realized.

The cellulose acylate film according to the invention may be subjected to stretching to adjust the retardation thereof. Further, the cellulose acylate film may be positively subjected to crosswise stretching. For the details of these stretching methods, reference can be made to JP-A-62-115035, JP-A-4-152125, JP-A-4-284211, JP-A-4-298310, and JP-A-11-

48271. In accordance with these methods, the cellulose acylate film produced is stretched to raise the in-plane retardation value thereof.

The stretching of the film may be effected monoaxially in only longitudinal or crosswise direction or biaxially at the same time or successively in the two directions. Referring to the birefringence of the optical film, the crosswise refractive index of the optical film is preferably greater than the longitudinal refractive index of the optical film. Accordingly, the optical film is preferably stretched more in the crosswise direction than in the longitudinal direction. The stretching of the optical film may be effected in the course of film forming step. Alternatively, the raw fabric which has been wound may be subjected to stretching.

As a method for controlling Re of the optical resin film of the invention there is preferably used a method which comprises stretching the optical resin film at a temperature of from 25° C. to 100° C. higher than the glass transition point thereof, that is, stretching the film at a temperature of from (Tg+25° C.) to (Tg+100° C.) supposing that the glass transition point of the film is Tg.

On the other hand, the transmittance of the optical film is preferably 85% or more, more preferably 90% or more. The application of the stretching method of the invention makes it possible to obtain an optical film having a higher transmittance even when the same material is used. The inventors presume that when the optical film is stretched at a very high temperature, impurities in the polymer material is evaporated to reduce scattering factors in the film.

The mechanism of stretching at high temperature to attain desired Re value at various wavelength ranges will be described hereinafter with reference to cellulose acylate as best embodiment.

A cellulose acylate is formed by a main chain composed of glucopyranose ring and side chains composed of acyl group. When the film made of cellulose acylate is stretched, the main chain extends in the stretching direction to exhibit Re. As a result of extensive studies, the inventors found that when a cellulose acylate film having Tg of 140° C. is stretched at a temperature as high as 165° C. to 240° C., Re at 450 nm is reduced while Re at 650 nm is raised.

Further, the cellulose acylate film which has thus been stretched at the same high temperature shows an X-ray diffraction peak derived from crystallization. It is thus presumed that crystallization causes the change of alignment of main chain and side chains and hence the wavelength dependence of Re.

On the other hand, in order to eliminate color shift of the liquid crystal display device, it is also important to control Rth. As a method for controlling Rth there is preferably used a method involving the spreading of a liquid crystal layer described later or a method involving the use of additives.

(Preferred Production Method 2 in the Invention)

As previously mentioned, as a result of extensive studies, the inventors found that the use of the production method involving a stretching step of stretching the film and a shrinking step of shrinking the film makes it possible to obtain an optical film having the aforementioned optical physical properties.

In the invention, there is particularly preferably used a method for the production of an optical film involving a stretching step of stretching the film in the film conveying direction and a shrinking step of shrinking the film while being gripped in the crosswise direction or a method for the production of an optical film involving a stretching step of stretching the film in the crosswise direction and a shrinking step of shrinking the film in the film conveying direction.

Firstly, the method for the production of an optical film involving a stretching step of stretching the film in the film conveying direction and a shrinking step of shrinking the film while being gripped in the crosswise direction will be described.

In this case, the film is stretched in the film conveying direction. As the method for stretching the film in the film conveying direction there is preferably used a method which comprise adjusting the speed of the film conveying rollers such that the winding speed of the film is higher than the peeling speed of the film.

In this case, by conveying the film while being crosswise retained by the tenter the width of which is gradually reduced, the film can be shrunk substantially perpendicularly to the stretching direction.

In some detail, by conveying the film while being retained by a chain type, screw type, pantograph type or linear motor type tenter and stretched in the conveying direction with the width of the tenter being gradually reduced, the film can be shrunk in the direction perpendicular to the conveying direction while being stretched.

On the other hand, in accordance with the method for the production of an optical film involving a stretching step of stretching the film in the crosswise direction and a shrinking step of shrinking the film in the film conveying direction, the film can be stretched while being retained by a chain type, screw type, pantograph type or linear motor type tenter the distance of clips of which is being gradually reduced as the film flows in the conveying direction.

In accordance with the aforementioned method, at least a part of the stretching step and shrinking step can be effected at the same time.

As a stretching device for specifically effecting the aforementioned stretching step of stretching the film either in longitudinal direction or crosswise direction while shrinking the film in the other direction and raising the thickness of the film there is preferably used a Type FITZ stretching device (produced by Ichikin Industry Co., Ltd.). For the details of this stretching device, reference can be made to JP-A-2001-38802.

Proper values of the stretching factor at the stretching step and the shrinking factor at the shrinking step can be arbitrarily selected by in-plane retardation Re and thickness-direction retardation Rth. However, the stretching factor at the stretching step and the shrinking factor at the shrinking step are preferably 10% or more and 5% or more, respectively.

The term "stretching factor" as used herein is meant to indicate the ratio of the elongation of the film after stretching to the length of the film before stretching in the stretching direction. The term "shrinking factor" as used herein is meant to indicate the ratio of the shrinkage of the film after shrinking to the length of the film before shrinkage in the shrinking direction.

The stretching factor is preferably from 10% to 60%, particularly preferably from 20% to 50%. On the other hand, the shrinking factor is preferably from 5% to 40%, particularly preferably from 15% to 35%.

In order to attain desired optical physical properties, the stretching and shrinking steps are preferably effected at a temperature of (glass transition temperature of the film at the time of treatment+(5 to 100)° C.), more preferably (glass transition temperature of the film at the time of treatment+(10 to 80)° C.).

The term "glass transition point (Tg)" as used herein is meant to indicate the value determined from the point of crossing of two lines tangent to the curve present at the temperature of point of inflection at low temperature side on the endothermic (exothermic) curve produced by the measurement using a differential scanning calorimeter (DSC) under the following conditions.

Vessel: Hermetically sealable vessel made of stainless steel (70 µl)

Measurement mode: Modulated DSC

Scanning temperature range: −50° C. to 200° C.

Temperature rising rate: 2° C./min

Temperature falling rate: 20° C./min

Amplitude during temperature rise: ±1° C.

Period of amplitude: 80 seconds

The term "treatment temperature" as used herein is meant to indicate the temperature of the surface of the film measured by a non-contact infrared thermometer.

The stretching and shrinkage may be effected with the solvent left in the film thus flow-casted or may be effected after drying and winding. The stretching may be effected in one stage or in a multiple of stages. In the case where the stretching is effected in a multiple of stages, it may suffice if the product of stretching factor at the various stretching steps falls within the above defined range. The shrinking step, too, may be effected in one stage or in a multiple of stages.

The stretching speed is preferably from 5%/min to 1,000%/min, more preferably from 10%/min to 500%/min. Stretching is preferably effected over a heated roller and/or by a heat from a radiation heat source (e.g., IR heater) or with hot air. Further, in order to enhance the temperature uniformity, a constant temperature tank may be provided. In the case where monoaxial stretching involves roll stretching, the ratio L/W of distance (L) between rollers to width (W) of retarder plate is preferably from 2.0 to 5.0. The shrinking speed is preferably from 5%/min to 1,000%/min, more preferably from 10%/min to 500%/min. Further, both the stretching speed and the shrinking speed may be kept constant. Alternatively, stretching and shrinkage may be effected at varying speeds.

A preheating step is preferably provided prior to the stretching step. The stretching step may be properly followed by a heat treatment step.

The heat treatment is preferably effected at a temperature of from 20° C. lower than the glass transition temperature of cellulose acylate film to 10° C. higher than the glass transition temperature of cellulose acylate film. The heat treatment is preferably effected for 1 second to 300 hours. The heating method may involve zone heating or partial heating using an infrared heater. The film may be slit at the both edges thereof during or at the end of the heat treatment step. Slit tailing is preferably recovered for recycling.

(Example of Production Technique Employable in the Invention)

In the production of the film of the invention, the following techniques can be appropriately employed.

Referring to tenter, JP-A-11-077718 proposes that the drying of the web with its width retained by a tenter be effected by properly controlling the drying gas blowing method, the blowing angle, the wind velocity distribution, the wind velocity, the air flow rate, the temperature difference, the upper to lower air flow rate ratio, the use of high specific heat drying gas, etc. so that the speed of solution flow casting method can be raised or the prevention of deterioration of quality such as planarity during the expansion of web width can be assured.

Further, JP-A-11-077822 discloses an invention involving heat treatment with heat gradient in the crosswise direction of film at a step of heat relaxation of a thermoplastic resin stretched at a stretching step for the purpose of preventing the occurrence of unevenness.

Moreover, JP-A-4-204503 discloses an invention involving the stretching of a film with its solvent content kept at a range of from 2% to 10% as calculated in terms of solid content for the purpose of preventing the occurrence of unevenness.

Further, JP-A-2002-248680 discloses an invention which comprises stretching a film at a tenter clipping width D kept to or below (33/(log (draw ratio)×log (volatile content)) so that curling due to limitation of clipping width can be suppressed to facilitate the conveyance of the film after stretching step.

Moreover, JP-A-2002-337224 discloses an invention involving tenter conveyance with pin in the former half stage and with clip in the latter half stage for the purpose of attaining both high speed soft film conveyance and stretching.

Further, JP-A-2002-187960 discloses an invention which comprises flow-casting a cellulose ester dope solution over a flow casting support, and then stretching the web (film) peeled off the flow casting support at a draw ratio of from 1.0 to 4.0 in at least one direction while the residual solvent content in the web is 100% by mass or less, particularly from 10 to 100% by mass so that the resulting film has an optical biaxiality for the purpose of simply improving the viewing angle properties and the viewing angle. In a preferred embodiment disclosed, the web is stretched at a draw ratio of from 1.0 to 4.0 in at least one direction while the residual solvent content in the web is 100% by mass or less, particularly from 10 to 100% by mass. Other examples of stretching method include a method which comprises making the peripheral speed of a plurality of rollers different so that the film is longitudinally stretched by the use of difference in peripheral speed between rollers, a method which comprises stretching the web fixed at both edges with clips or pins the interval of which expands in the moving direction so that the web is longitudinally stretched, a method which comprises stretching the web fixed at both edges which move outward crosswise so that the web is crosswise stretched, a method which comprises stretching the web fixed at both edges which move outward crosswise and longitudinally so that the web is crosswise and longitudinally stretched, and combination thereof. It is also disclosed that in the case of tenter method, when the clipping portion is driven by a linear driving process, smooth stretching can be effected, making it possible to eliminate risk such as break to advantage.

Moreover, JP-A-2003-014933 discloses an invention which comprises preparing a dope A containing a resin, additives and an organic solvent and a dope B containing a resin and additives free of or having less amount of additives than the dope A, cocasting the dope A and the dope B over a support in such a manner that the dope A forms a core layer and the dope B forms a surface layer, vaporizing the organic solvent until the web can be peeled off the support, peeling the web off the support, and then stretching the web at a draw ratio of from 1.1 to 1.3 in at least one direction while the residual solvent content in the resin film during stretching is from 3 to 50% by mass to prepare a retarder film having little additive bleed-out, no interlayer exfoliation, good slipperiness and excellent transparency. In a preferred embodiment, the web is peeled off the support, and then stretched at a draw ratio of from 1.1 to 3.0 and a temperature of from 140° C. to 200° C. in at least one axial direction. In a further preferred embodiment, a dope A containing a resin and an organic solvent and a dope B containing a resin, a particulate material and an organic solvent are prepared. The dope A and the dope B are then cocasted over a support in such a manner that the dope A forms a core layer and the dope B forms a surface layer. The organic solvent is then vaporized until the web can be peeled off the support. The web is peeled off the support, and then stretched at a draw ratio of from 1.1 to 3.0 in at least one axial direction while the residual solvent content in the resin film during stretching is from 3 to 50% by mass. In a further preferred embodiment, the web is stretched at a draw ratio of from 1.1 to 3.0 and a temperature of from 140° C. to 200° C. in at least one axial direction. In a further preferred embodiment, a dope A containing a resin, an organic solvent and additives, a dope B containing a resin and additives free of or having less amount of additives than the dope A and a dope C containing a resin, a particulate material and an organic solvent are prepared. The dope A, the dope B and the dope C are then cocasted over a support in such a manner that the dope A forms a core layer, the dope B forms a surface layer and the dope C forms the other side surface layer. The organic solvent is then vaporized until the web can be peeled off the support. The web is then peeled of the support, and then stretched at a draw ratio of from 1.1 to 3.0 in at least one axial direction while the residual solvent content in the resin film during stretching is from 3 to 50% by mass. In a further preferred embodiment, the web is stretched at a draw ratio of from 1.1 to 3.0 and a temperature of from 140° C. to 200° C. in at least one axial direction. In a further preferred embodiment, the content of the additives to be incorporated in the dope A and the dope B are from 1 to 30% by mass and from 0 to 5% by mass based on the mass of the resin, respectively, the additives are plasticizers, ultraviolet absorbers or retardation controllers and methylene chloride or methyl acetate is incorporated as an organic solvent in the dope A and the dope B in an amount of 50% by mass or more.

Moreover, JP-A-2003-014933 discloses that as the stretching method there is preferably used a method involving the use of a crosswise stretching machine called tenter adapted to crosswise stretch the web fixed at both edges thereof with a clip or pin the distance of which expands crosswise. It is also disclosed that the longitudinal stretching or shrinkage is carried out by using a simultaneous biaxial stretching machine comprising pins or clips the interval of which increases or decreases in the conveying direction (longitudinal direction). It is further disclosed that when the clipping portion is driven by a linear driving process, stretching can be smoothly effected, making it possible to eliminate risk such as break to advantage. It is further disclosed that as the longitudinal stretching method there may be also used a method which makes the peripheral speed of a plurality of rollers different so that the film is longitudinally stretched by the use of difference in peripheral speed between rollers. It is further disclosed that these stretching methods may be used in composite. It is further disclosed that the stretching step may be effected batchwise in two or more stages as in longitudinal stretching-crosswise stretching-longitudinal stretching or longitudinal stretching-longitudinal stretching.

Moreover, JP-A-2003-004374 discloses an invention involving the use of a drying apparatus comprising a dryer the width of which is shorter than that of the web so that the hot air from the dryer doesn't hit the both edges of the web to prevent the foaming of the web during tenter drying, improve the releasability of the web and prevent the production of dust.

Further, JP-A-2003-019757 discloses an invention involving the provision of a windshield inside the both edges of the web such that drying air doesn't hit the tenter retaining portion to prevent the foaming of the web during tenter drying, improve the releasability of the web and prevent the production of dust.

Moreover, JP-A-2003-053749 discloses an invention that satisfies the relationships (1) $40 \leq X \leq 200$ when T is 60 or less, (2) $40+(T-60)\times 0.2 \leq X \leq 300$ when T is from more than 60 to not more than 120 and (3) $52+(T-120)\times 0.2 \leq X \leq 400$ when T is less than 120, supposing that the dried thickness of the both edges of the film retained by the pin tenter is X μm and the average dried thickness of the product portion of the film is T μm to perform stable conveyance and drying.

Further, JP-A-2-182654 discloses an invention involving the provision of a heating chamber and a cooling chamber in the dryer of a multi-stage tenter in the tenter device such that the right and left clip chains are separately cooled to prevent the multi-stage tenter from causing wrinkle.

Moreover, JP-A-9-077315 discloses an invention involving the use of a pin tenter having inner pins having a great density and outer pins having a small density such that break, wrinkle and malconveyance of the web can be prevented.

Further, JP-A-9-085846 discloses an invention involving the use of a tenter drying apparatus arranged such that the pin for retaining the both edges of the web is cooled to a temperature of less than the foaming temperature of the web by a blowing cooler and the pin is cooled to a temperature of the gelation temperature of the dope in the duct type cooler plus 15° C. shortly before engaging the web to prevent the web from foaming or attaching to the retaining unit in the tenter.

Moreover, JP-A-2003-103542 discloses an invention concerning a solution film-forming method which comprises cooling an insert structure in a pin tenter so that the surface temperature of the web doesn't exceed the gelation temperature of the web to prevent pin tenter slip and eliminate foreign matters.

Further, JP-A-11-077718 discloses an invention involving the use of a tenter web drying method performing at a wind velocity of from 0.5 to 20 (40) m/s, a crosswise temperature distribution of 10% or less, an upper to lower web air flow ratio of from 0.2 to 1 and a drying gas ratio of from 30 to 250 J/Kmol to raise the speed of solution flow casting method and prevent the deterioration of quality such as planarity during the expansion of web width by tenter. Preferred tenter drying conditions are disclosed depending on the residual solvent content. In some detail, the angle of blowing from the blowing nozzle is predetermined to be from 30° to 150° between the time at which the web is peeled off the support and the time at which the residual solvent content in the web reaches 4% by mass. When the wind velocity distribution on the surface of the film positioned in the extending direction of blowing of drying gas is based on the upper limit of wind velocity, the difference between the upper limit and the lower limit is predetermined to be 20% or less during the blowing of drying gas. When the residual solvent content in the web is from not smaller than 130% by mass to not greater than 70% by mass, the wind velocity of drying gas blown from the blowing drying machine on the surface of the web is predetermined to be not smaller than 0.5 m/sec to not greater than 20 m/sec. When the residual solvent content is from not smaller than 4% by mass to less than 70% by mass, the web is dried with a drying gas wind blown at a rate of from not smaller than 0.5 m/sec to not greater than 40 m/sec. When the temperature distribution of drying gas in the crosswise direction of web is based on the upper limit of the gas temperature, the difference between the upper limit and the lower limit is predetermined to be 10% or less. When the residual solvent content in the web is not smaller than 4% by mass to not greater than 200% by mass, the flow rate ratio q of drying gas blown from the blowing nozzle of the blowing drying machines positioned above and under the web which is being conveyed is predetermined to be from not smaller than 0.2 to not greater than 1.

In a further embodiment, as a drying gas there is used at least one gas the average specific heat of which is from not smaller than 31.0 J/K·mol to not greater than 250 J/K·mol. A drying gas containing an organic compound which normally stays liquid in a concentration of 50% or less may be used at saturated vapor pressure.

Moreover, JP-A-11-077719 discloses an invention involving the use of a TAC producing apparatus comprising a tenter clip having a heating portion incorporated therein such that the planarity or spreadability cannot be impaired by the production of contaminants. In a preferred embodiment, a device for removing foreign matters generated on the portion of contact of clip with web is provided between the site at which the clip of the tenter releases the web and the site at which the clip carries the web again. The foreign matters are removed by the use of spraying gas or liquid or a brush. The residual amount of the web during the contact of the clip or pin with the web is from not smaller than 12% by mass to not greater than 50% by mass. The surface temperature of the portion of contact of the clip or pin with the web is preferably not smaller than 60° to not greater than 200° (more preferably not smaller than 80° to not greater than 120°).

Further, JP-A-11-090943 discloses an invention involving the use of a tenter clip having Lr of from not smaller than 1.0 to not greater than 1.99 supposing that Lr is the ratio Ltt/Lt of the arbitrary length Lt (m) of the tenter to the sum Ltt (m) of the conveying length of the portions at which the tenter clip having the same length as Lt retains the web to improve planarity, eliminate quality deterioration due to tear in the tenter and raise the productivity. In a preferred embodiment, the portions at which the web is retained are disposed without any gap as viewed crosswise.

Moreover, JP-A-11-090944 discloses an invention a plastic film producing apparatus comprising a web crosswise slack inhibiting device provided before the inlet of tenter to eliminate the deterioration of planarity and the instability of introduction due to slacking of web during the introduction of web into the tenter. In a preferred embodiment, the slack inhibiting device is a rotary roller which rotates at a crosswise expanding angle of from 2° to 60°. An air sucking device is provided above the web. There is also provided an air blower capable of blowing from the web.

JP-A-11-090945 discloses an invention concerning a TAC producing method which comprises introducing a web which has been peeled off the support at an angle with respect to the horizontal direction for the purpose of preventing the occurrence of slacking that deteriorates quality and impairs productivity.

Further, JP-A-2000-289903 discloses an invention concerning a conveying apparatus arranged to convey the web while tensing the web in the crosswise direction at the time when the web is peeled off and has a solvent content of from 12 wt-% to 50 wt-% wherein there are provided a web width detecting unit, a web retaining unit and two or more variable flexing points and a web width is calculated from signal produced by the web width detecting unit to change the position of the flexing points, thereby preparing a film having stabilized physical properties.

JP-A-2003-033933 proposes that a guide plate for preventing the occurrence of curling of web at the edge thereof is provided at least above and under the right and left edges of the web at both right and left sides of the portion close to the inlet of the tenter and the surface of the guide plate opposed to the web is composed of a resin portion in contact with web and a metallic portion in contact with web arranged in the web conveying direction to enhance clipping properties and prevent web break over an extended period of time. In a preferred embodiment, the resin portion in contact with web on the guide plate opposed to the web is disposed upstream in the web conveying and the metallic portion in contact with web is disposed downstream in the web conveying direction. The step between the resin portion in contact with web and the metallic portion in contact with web of the guide plate (including slope) is 500 μm or less. The distance between the resin portion and the metallic portion of the guide plate in contact with web in the width direction are each from 2 mm to 150 mm. The distance between the resin portion and the metallic portion of the guide plate in contact with web in the web conveying direction are each from 5 mm to 120 mm. The resin portion in contact with web of the guide plate is provided by working the surface of a metallic guide substrate with a resin or spreading a resin over the metallic guide substrate. The resin portion in contact with web of the guide plate is composed of simple resin body. The distances between the opposing upper and lower guide plates at the right and left edges of the web are 3 mm to 30 mm. The distance between the opposing upper and lower guide plates at the right and left edges of the web increases crosswise and inward at a rate of 2 mm or more per 100 mm of width. Both the upper and lower guide plates at the right and left edges of the web each have a length of from 10 mm to 300 mm. The upper and lower guide plates are disposed shifted in the conveying direction. The shift between the upper and lower guide plates is from −200 to +200 mm. The surface of the upper guide plate opposed to the web is composed of resin or metal alone. The surface of the resin portion of the upper guide plate opposed to the web is made of Teflon®. The metallic portion in contact with web is made of stainless steel. The surface roughness of the guide plate opposed to the web or the resin portion and/or metallic portion in contact with web is 3 μm or less. It is preferred that the upper and lower guide plates for preventing the occurrence of curling of the web on the edges thereof be disposed in between the end of the support at which the web is peeled off and the site at which the web is introduced into the tenter, more preferably close to the inlet of the tenter.

JP-A-11-048271 discloses an invention which comprises stretching the web which has been peeled off using a stretching device at the time when the solvent content in the web is from 12% to 50% by mass, drying the web, and then pressing the web at a pressure of from 0.2 to 10 KPa on the both sides thereof using a press at the time when the solvent content in the web is 10% by mass or less to prevent the web from undergoing break or unevenness during drying in the tenter. In a preferred embodiment, the tensing of the web is terminated at the time when the solvent content in the web is 4% by mass or more. In the case where a nip roll is used to press the web (film) on the both sides thereof, one to eight pairs of nip rolls are preferably used. The temperature at which pressing is effected is preferably from 100° C. to 200° C.

Moreover, JP-A-2002-036266, which invention relates to the provision of a high quality thin TAC having a thickness of from 20 μm to 85 μm, discloses that the tension difference which acts on the web along the conveying direction is predetermined to be 8 N/mm² or less. It is also disclosed that the peeling step is followed by a preheating step for preheating the web which is followed by a stretching step for stretching the web using a tenter which is followed by a relaxing step for relaxing the web by the amount less than the stretching at the stretching step.

Moreover, JP-A-2002-225054, which is intended to reduce the dried thickness of the web to a range of from 10 μm to 60 μm, reduce the mass of the web and attain excellence in durability such as moisture permeability, discloses that the web which has been peeled off the support is gripped by a clip at the edges thereof by the time at which the residual solvent content in the web reaches 10% by mass so that the width of the web can be kept constant to suppress the drying shrinkage and/or crosswise stretched to form a film having a planar alignment (S) of from 0.0008 to 0.0020 as represented by the equation S={(Nx+Ny)/2}−Nz (in which Nx represents the refractive index of the film in the in-plane direction along which the highest refractive index is exhibited, Ny represents the refractive index in the in-plane direction perpendicular to Nx and Nz represents the refractive index of the film in the thickness direction). It is also disclosed that the time between flow casting and peeling is predetermined to be from 30 seconds to 90 seconds. It is further disclosed that the web which has been peeled off the support is stretched crosswise and/or longitudinally.

Moreover, JP-A-2002-341144 discloses a solution film-forming method involving a stretching step wherein the mass concentration of the retardation raising agent has a higher optical distribution toward the center of the width of the film to suppress optical unevenness.

Further, JP-A-2003-071863, which invention is intended to obtain a film which undergoes no clouding, discloses that the crosswise draw ratio is preferably from 0% to 100%, and more preferably from 5% to 20%, most preferably from 8% to 15% if the web is used as a polarizing plate protective film. It is also disclosed that if the web is used as a retarder film, the crosswise draw ratio is more preferably from 10% to 40%, most preferably from 20% to 30%. It is further disclosed that Ro can be controlled by draw ratio and the higher the draw ratio is, the more excellent is the planarity of the resulting film. It is further disclosed that the residual solvent content in the film to be processed by a tenter is preferably from 20% to 100% by mass at the beginning of tenter process. It is further disclosed that the film is preferably dried while being tensed until the residual solvent content in the film reaches 10% by mass or less, more preferably 5% by mass or less.

JP-A-2002-248639, which invention is intended to reduce the longitudinal and crosswise dimensional change during storage under high temperature and humidity conditions, discloses a film producing method which comprises flow-casting a cellulose ester solution over a support, and then continuously peeling and drying the film wherein drying is effected such that the present drying shrinkage satisfies the relationship 0≦% drying shrinkage≦0.1×% residual solvent content during peeling. In a preferred embodiment, while the residual solvent content in the cellulose ester film peeled is from 40% to 100% by mass, the cellulose ester film is tenter-conveyed with the both edges thereof gripped to reduce the residual solvent content by 30% by mass or more. The residual solvent content in the cellulose ester film peeled is from 40% to 100% by mass and from 4% to 20% by mass at the inlet and outlet of the tenter conveyor, respectively. The tension with which the cellulose ester film is tenter-conveyed increases from the inlet of the tenter conveyor to the outlet of the tenter conveyor. The tension with which the cellulose ester film is tenter-conveyed is substantially the same as the crosswise tension of the cellulose ester film.

Further, JP-A-2000-239403 proposes that film forming is effected such that the relationship between the residual solvent content X during peeling and the residual solvent content Y during introduction into tenter satisfies the expression 0.3X≦Y≦0.9X to obtain a film having a small thickness excellent in optical isotropy and planarity.

JP-A-2002-286933 exemplifies a method involving stretching under heating conditions and a method involving stretching with a solvent incorporated in the film as a method for stretching a film formed by flow-casting. It is also disclosed that the stretching under heating conditions is preferably effected at a -temperature of not higher than the value in the vicinity of the glass transition point of the resin while the stretching with the cast-formed film impregnated with a solvent may be effected by drying the film, bringing the film into contact with a solvent so that the film is impregnated with the solvent, and then stretching the film.

[Physical Properties of Optical Resin Film]

Preferred physical properties of the optical resin film of the invention will be described hereinafter with reference to cellulose acylate film by way of example.

(Film Thickness)

The thickness of the cellulose acylate film obtained after drying depends on the purpose but is normally from 5 μm to 500 μm, preferably from 20 μm to 300 μm, particularly preferably from 30 μm to 150 μm. The thickness of the cellulose acylate film is also preferably from 40 μm to 110 μm for optical display devices, particularly for VA mode liquid crystal display devices. In order to adjust the thickness of the film to the desired value, the concentration of solid content in the dope, the gap of slit of the die, the extrusion pressure of die, the speed of metallic support, etc. may be properly adjusted. The width of the cellulose acylate film thus obtained is preferably from 0.5 m to 3 m, more preferably from 0.6 m to 2.5 m, even more preferably from 0.8 m to 2.2 m. The winding length of the film per roll is preferably from 100 m to 10,000 m, more preferably 500 m to 7,000 m, even more preferably from 1,000 m to 6,000 m. During winding, the film is preferably knurled at least at one edge thereof. The width of the knurl is preferably from 3 mm to 50 mm, more preferably from 5 mm to 30 mm. The height of the knurl is preferably from 0.5 μm to 500 μm, more preferably from 1 μm to 200 μm. The edge of the film may be knurled on one or both surfaces thereof.

(Optical Properties of Cellulose Acylate Film)

The terms "Reλ" and "Rthλ" as used herein are meant to indicate in-plane retardation and thickness direction retardation at a wavelength λ, respectively. Re(λ) is measured by the incidence of light having a wavelength λ nm in the direction normal to the film in "KOBRA 21ADH" (produced by Ouji Scientific Instruments Co. Ltd.). Rthλ is calculated by "KOBRA 21ADH" on the basis of retardation values Re (λ) measured on 11 points by the incidence of light having a wavelength λ nm in the direction inclined at 10 angle steps ranging from −50° to 50° from the direction normal to the film with the in-plane slow axis (judged by "KOBRA 21ADH") as an inclined axis (rotary axis), hypothetical average refractive index and inputted film thickness. As the hypothetical average refractive index there may be used one disclosed in "Polymer Handbook", John Wiley & Sons, Inc. and various catalogues of optical films. For the cellulose acylate films having an unknown average refractive index, an Abbe refractometer may be used.

The average refractive index of main optical films are exemplified below. Cellulose acylate (1.48), cycloolefin polymer (1.52), polycarbonate (1.59), polymethylene methacrylate (1.49), polystyrene (1.59). By inputting the hypothetic average refractive indexes and film thicknesses, KOBRA 21ADH calculates $n_x$, $n_y$ and $n_z$. From $n_x$, $n_y$ and $n_z$ is then calculated $N_z=(n_x-n_z)/(n_x-n_y)$.

In the case where the cellulose acylate film according to the invention is used for VA mode, two embodiments are used, i.e., embodiment comprising one sheet of cellulose acylate film provided on the both sides of a cell (two sheet type) and embodiment comprising one sheet of cellulose acylate film provided on only one side of a cell (one sheet type).

The cellulose acylate film to be used in the two sheet type, preferably has Re of from 20 nm to 100 nm, more preferably from 30 nm to 70 nm and Rth of from 70 nm to 300 nm, more preferably from 100 nm to 200 nm.

The cellulose acylate film to be used in the one sheet type, preferably has Re of from 30 nm to 150 nm, more preferably from 40 nm to 100 nm and Rth of from 100 nm to 400 nm, more preferably from 150 nm to 250 nm.

The dispersion of the angle of in-plane slow axis of the cellulose acylate film according to the invention preferably falls within a range of from −2° to 2°, more preferably from −1° to 1°, most preferably from −0.5° to 0.5° with respect to the reference direction of the rolled film. The term "reference direction" as used herein is meant to indicate the longitudinal direction of the rolled film in the case where the cellulose acylate film is longitudinally stretched or the crosswise direction in the case where the cellulose acylate film is crosswise stretched.

The cellulose acylate film according to the invention preferably has ΔRe of from 0 nm to 10 nm (wherein ΔRe is the difference between Re value at 25° C.−10% RH and Re value at 25° C.80% RH (=Re10% RH−Re80% RH)) and ΔRth of from 0 nm to 30 nm (wherein ΔRth is the difference between Rth value at 25° C.−10% RH and Rth value at 25° C.80% RH (=Rth10% RH−Rth80% RH)) to reduce the tint change with time of the liquid crystal display device.

Further, the cellulose acylate film according to the invention preferably exhibits an equilibrium water content of 3.2% or less at 25° C. and 80% RH to reduce the tint change with time of the liquid crystal display device.

The water content is measured on a cellulose acylate film sample having a size of 7 mm×35 mm according to the invention by Karl Fischer method using a Type CA-03 water content meter and a type VA-05 sample dryer (produced by Mitsubishi Chemical Corporation). The water content is then determined by diving the amount of water (g) by the mass of the sample (g).

Further, the cellulose acylate film according to the invention preferably exhibits from not smaller than 400 g/m$^2$·24 hr to 1,800 g/m$^2$·24 hr (as calculated in terms of film thickness of 80 μm) after 24 hours of aging at 60° C. and 95% RH to reduce the tint change with time of the liquid crystal display device.

The greater the thickness of the cellulose acylate film is, the smaller is the moisture permeability thereof. The smaller the thickness of the cellulose acylate film is, the greater is the moisture permeability thereof. Regardless of the thickness of the film sample, the moisture permeability of the film sample needs to be calculated in terms of film thickness of 80 μm. The conversion is made by the equation (Moisture permeability as calculated in terms of 80 μm=Measured moisture permeability×Measured thickness (μm)/80 μm).

For the details of the method for the measurement of moisture permeability employable herein, reference can be made to "Kobunshi no Bussei II (Physical Properties of Polymers II", Institute of Polymer Experiment 4, Kyoritsu Shuppan, pp. 285-294: Measurement of vapor permeability (mass method, thermometer method, vapor pressure method, adsorption method).

The measurement of glass transition temperature is effected as follows. In some detail, a cellulose acylate film sample having a size of 5 mm×30 mm according to the invention (unstretched) is moisture-conditioned at 25 C. and 60% RH for 2 hours. Using a Type DVA-225 dynamic viscoelasticity meter (Vibron) (produced by IT Keisoku K.K.), the film sample thus moisture-conditioned is then measured with a distance of 20 mm between grips at a temperature rising rate of 2° C./min, a measuring temperature of from 30° C. to 200° C. and a frequency of 1 Hz. The measurements are plotted with storage modulus as logarithmic axis and temperature (° C.) as linear axis. The sudden reduction of storage modulus developed when the state of the film sample moves from solid region to glass transition region is represented by the straight line 1. The movement of storage modulus in glass transition region is represented by the straight line 2. The temperature at which the two straight lines 1 and 2 cross each other is the temperature at which the film sample shows a sudden drop of storage modulus to begin to soften when heated, i.e., temperature at which the state of the film sample begins to move to glass transition region. Thus, the glass transition temperature Tg (dynamic viscoelasticity) is determined.

The cellulose acylate film according to the invention preferably exhibits a haze of from 0.01% to 2%. The haze can be measured herein as follows.

The measurement of haze is made on a cellulose acylate film sample having a size of 40 mm×80 mm according to the invention at 25° C. and 60% RH according to JIS K-6714 using a Type HGM-2DP haze meter (produced by Suga Test Instruments Co., Ltd.).

Further, the cellulose acylate film according to the invention preferably exhibits a mass change of from 0% to 5% after 48 hours of aging at 80° C. and 90% RH.

Moreover, the cellulose acylate film according to the invention preferably exhibits a dimensional change of from 0% to 5% after 24 hours of aging at 60° C. and 95% RH or 90° C. and 5% RH.

The cellulose acylate film according to the invention preferably exhibits a photoelasticity coefficient of $50×10^{-13}$ cm$^2$/dyne or less to reduce the tint change with time of the liquid crystal display device.

Referring further to the method for the measurement of photoelasticity coefficient, a cellulose acylate film sample having a size of 10 mm×100 mm is subjected to longitudinal tensile stress. Under these conditions, the film sample is measured for retardation using a Type M150 ellipsometer (produced by JASCO Corporation). From the change of retardation with stress is then calculated photoelasticity coefficient.

(Optically Anisotropic Layer)

The optical resin film of the invention may have an optically anisotropic layer provided thereon to form a protective film for polarizing plate for example. Referring to the disposition of the optically anisotropic layer, an alignment layer and the optically anisotropic layer are preferably provided on the optical resin film in this order.

The alignment layer can be provided by some method such as rubbing of an organic compound (preferably a polymer), oblique deposition of inorganic compound and formation of a layer having a microgroove. Further, an alignment layer has been known which undergoes alignment when given an electric or magnetic field or irradiated with light. However, the alignment layer formed by rubbing a polymer is particularly preferred. Rubbing is preferably carried out by rubbing the surface of the polymer layer with paper or cloth in a predetermined direction several times. The absorption axis of the polarizer and the rubbing direction are preferably disposed substantially parallel to each other. As the polymer to be used in the alignment layer there is preferably used a polyimide, polyvinyl alcohol, polymer having a polymerizable group disclosed in JP-A-9-152509 or the like. The thickness of the alignment layer is preferably from 0.01 μm to 5 μm, more preferably from 0.05 μm to 2 μm.

The optically anisotropic layer preferably has a liquid crystal compound. The liquid crystal compound to be used in the invention preferably has a discotic compound (discotic liquid crystal). The discotic liquid crystal molecule has a discotic core portion from which side chains extend radially as in the following discotic liquid crystal molecule (I). In order to provide the discotic liquid crystal molecule with age stability, it is preferably practiced to further incorporate a group which reacts when heated or irradiated with light. Preferred examples of the aforementioned discotic liquid crystal are disclosed in JP-A-8-50206.

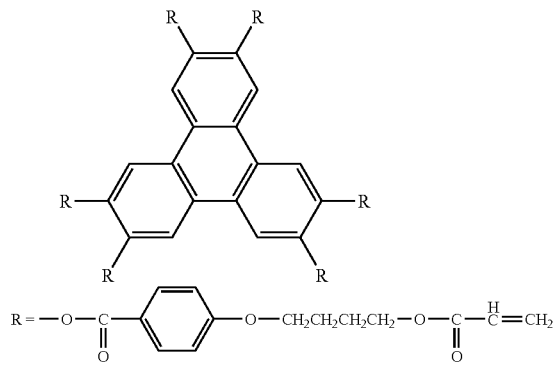

Discotic Liquid Crystal Molecule (I)

The discotic liquid crystal molecules are aligned substantially parallel to the plane of the film at a pretilt angle from the rubbing direction in the vicinity of the alignment layer. The discotic liquid crystal molecules are aligned substantially perpendicular to the plane of the film on the air surface side. The discotic liquid crystal layer undergoes hybrid alignment as a whole. With this layer configuration, the viewing angle of TN mode TFT-LCD can be raised.

The aforementioned optically anisotropic layer is normally obtained by spreading a solution of a discotic compound and other compounds (and optionally a polymerizable monomer and a photopolymerization initiator) in a solvent over the alignment layer, drying the coated alignment layer, heating the coated alignment layer to the discotic nematic phase-forming temperature, subjecting the coated alignment layer to polymerization by irradiation with ultraviolet rays, and then cooling the coated alignment layer. The discotic nematic liquid crystal phase-solid phase transition temperature of the discotic liquid crystal compound to be used in the invention is preferably from 70° C. to 300° C., particularly preferably from 70° C. to 170° C.

As the compound other than the discotic compound to be incorporated in the aforementioned optically anisotropic layer there may be used any compound compatible with the discotic compound which can provide the liquid crystal discotic compound with a desirable change of angle of tilt or doesn't impair alignment thereof. Examples of such a compound include polymerizable monomers (e.g., compound having vinyl group, vinyloxy group, acryloyl group and methacryloyl group), surface interface side alignment control additives such as fluorine-containing triazine compound, and polymers such as cellulose acetate, cellulose acetate propionate, hydroxypropyl cellulose and cellulose acetate butyrate. These compounds are normally used in an amount of from 0.1% to 50% by mass, preferably from 0.1% to 30% by mass based on the mass of the discotic compound.

The thickness of the optically anisotropic layer is preferably from 0.1 µm to 10 µm, more preferably from 0.5 µm to 5 µm.

Alternatively, the optically anisotropic layer may be a non-liquid crystal polymer layer prepared by dissolving a non-liquid crystal compound in a solvent, spreading the solution over a support, and drying the coat layer. As the non-liquid crystal compound to be used herein there may be used a polymer such as polyamide, polyimide, polyester, polyether ketone, polyaryl ether ketone, polyamide imide and polyester imide because it must be excellent in heat resistance, chemical resistance and transparency and rich in rigidity. These polymers may be used singly. Alternatively, two or more of these polymers having different functional groups, e.g., polyaryl ether ketone and polyamide may be used in admixture. Preferred among these polymers is polyimide because it exhibits a high transparency, a high alignability and a high stretchability. As the support there is preferably used TAC film.

It is also preferred that the laminate of a non-liquid crystal layer and a support be crosswise stretched by a factor of 1.05 using a tenter and then stuck to a polarizer on the support side thereof.

Further, the optically anisotropic layer may be a solidified alignment layer of a cholesteric liquid crystal having a selective reflection wavelength of 350 nm or less. As the cholesteric liquid crystal there may be used a proper compound having a selective reflection wavelength falling within the above defined range as disclosed in JP-A-3-67219, JP-A-3-140921, JP-A-5-61039, JP-A-6-186534 and JP-A-9-133810. Examples of the cholesteric liquid crystal which can be preferably used from the standpoint of stability of solidified alignment layer, etc. include cholesteric liquid crystal polymers, nematic liquid crystal polymers having a chiral agent incorporated therein, and compounds capable of forming a cholesteric liquid crystal layer made of a compound which undergoes photopolymerization or thermal polymerization to form such a liquid crystal polymer.

The optically anisotropic layer in this case can be formed, e.g., by a method involving the spreading of a cholesteric liquid crystal over a support. In this case, there may be employed a method involving the multi-layer spreading of the same or different cholesteric liquid crystals as necessary for the purpose of controlling phase difference. The spreading of the cholesteric liquid crystal can be carried out by any proper method such as gravure method, die method and dipping method. As the aforementioned support there may be used a proper material such as TAC film and other polymer films.

During the formation of the aforementioned optically anisotropic layer, a procedure of aligning the liquid crystal molecules is effected. The method for aligning the liquid crystal compound is not specifically limited. Any proper method for aligning the liquid crystal compound may be employed. Examples of such a method include a method which comprises spreading a liquid crystal over an alignment film, and then aligning the liquid crystal. Examples of the alignment film thus formed include rubbed film made of an organic compound such as alignment film, obliquely deposited film of inorganic compound, film having a microgroove, and accumulation of LB films formed of organic compound such as ω-tricosanic acid, dioctadecyl methyl ammonium chloride and methyl stearate by Langmuir-Blodgett method.

Further, there may be used an alignment film which undergoes alignment when irradiated with light. On the other hand, there may be employed a method which comprises spreading a liquid crystal over a stretched film, and then aligning the liquid crystal (JP-A-3-9325), and a method which comprises aligning a liquid crystal under the application of an electric field or magnetic field. The alignment of the liquid crystal molecules is preferably as uniform as possible. The aforementioned solidified layer preferably has liquid crystal molecules fixed so aligned.

In the case where the optical resin film according to the invention such as cellulose acylate film is used as a protective film for polarizing plate, the method for the preparation of the polarizing plate is not specifically limited. Any ordinary method may be employed. For example, the optical resin film of the invention may be subjected to alkaline treatment and then stuck with an aqueous solution of a fully-saponified polyvinyl alcohol to the both sides of a polarizer prepared by dipping a polyvinyl alcohol film in an iodine solution and then stretching the film. The aforementioned alkaline treatment may be replaced by an adhesion treatment as disclosed in JP-A-6-94915 and JP-A-6-118232. Examples of the adhesive with which the treated surface of the protective film and the polarizer are stuck to each other include polyvinyl alcohol-based adhesives such as polyvinyl alcohol and polyvinyl butyral, and vinyl-based latexes such as butyl acrylate. The polarizing plate comprises a polarizer and a protective film for protecting the both sides thereof. Further, a protect film may be stuck to one side of the polarizing plate while a separate film may be stuck to the other side thereof. The protective film and the separate film are used for the purpose of protecting the polarizing plate at the step of inspecting the product during the shipment of the polarizing plate. In this case, the protective film is stuck to the polarizing plate on the side thereof opposite the side at which the polarizing plate is stuck to the liquid crystal cell for the purpose of protecting the surface of the polarizing plate. The separate film is stuck to the polarizing plate on the side thereof at which the polarizing plate is stuck to the liquid crystal cell for the purpose of covering the adhesive layer stuck to the liquid crystal cell.

Referring to the sticking of the optical resin film according to the invention such as cellulose acylate film to the polarizer, arrangement is preferably made such that the transmission axis of the polarizer and the slow axis of the cellulose acylate film according to the invention coincide with each other.

When the accuracy of crossing of the slow axis of the cellulose acylate film according to the invention with the absorption axis of the polarizer (axis that crosses the transmission axis) is greater than 1°, the polarizing plate prepared under crossed nicols exhibits deteriorated polarization under crossed nicols to undergo light leakage, making it impossible to provide a sufficient black level or contrast when combined with a liquid crystal cell. Accordingly, the deviation of the direction of main refractive index nx of the cellulose acylate film according to the invention and the direction of the transmission axis of the polarizing plate from each other is 1° or less, preferably 0.5° or less.

(Surface Treatment)

The optical resin film according to the invention, e.g., cellulose acylate film of the invention may be optionally subjected to surface treatment to attain the enhancement of the adhesion of the cellulose acylate film to the various functional layers (e.g., undercoat layer and back layer). Examples of the surface treatment employable herein include glow discharge treatment, irradiation with ultraviolet rays, corona treatment, flame treatment, and acid or alkaline treatment. The glow discharge treatment employable herein may involve the use of low temperature plasma developed under a low gas pressure of from $10^{-3}$ to 20 Torr, even more preferably plasma under the atmospheric pressure. The plasma-excitable gas is a gas which can be excited by plasma under the aforementioned conditions. Examples of such a plasma-excitable gas include argon, helium, neon, krypton, xenon, nitrogen, carbon dioxide, fluorocarbon such as tetrafluoromethane, and mixture thereof. For the details of these plasma-excitable gases, reference can be made to Kokai Giho No. 2001-1745, Mar. 15, 2001, pp.30-32, Japan Institute of Invention and Innovation. In the plasma treatment under the atmospheric pressure, which has been recently noted, a radiation energy of from 20 to 500 Kgy is used under an electric field of from 10 to 1,000 Kev. Preferably, a radiation energy of from 20 to 300 Kgy is used under an electric field of from 30 to 500 Kev. Particularly preferred among these surface treatments is alkaline saponification, which is extremely effective for the surface treatment of the cellulose acylate film.

The alkaline saponification is preferably carried out by dipping the cellulose acylate film directly in a saponifying solution tank or by spreading a saponifying solution over the cellulose acylate film. Examples of the coating method employable herein include dip coating method, curtain coating method, extrusion coating method, bar coating method, and E type coating method. As the solvent for the alkaline saponification coating solution there is preferably selected a solvent which exhibits good wetting properties and can keep the surface conditions of the cellulose acylate film good without roughening the surface thereof because the saponifying solution is spread over the cellulose acylate film. In some detail, an alcohol-based solvent is preferably used. An isopropyl alcohol is particularly preferred. Further, an aqueous solution of a surface active agent may be used as a solvent. The alkali of the alkaline saponification coating solution is preferably an alkali soluble in the aforementioned solvent, more preferably KOH or NaOH. The pH value of the saponification coating solution is preferably 10 or more, more preferably 12 or more. During the alkaline saponification, the reaction is preferably effected at room temperature for 1 second to 5 minutes, more preferably 5 seconds to 5 minutes, particularly 20 seconds to 3 minutes. The cellulose acylate film thus alkaline-saponified is preferably washed with water or an acid and then with water on the saponifying solution-coated surface thereof.

Further, the polarizing plate of the invention preferably comprises at least one of hard coat layer, anti-glare layer and anti-reflection film provided on the surface of the protective film on one side of the polarizing plate. In some detail, during the use of the polarizing plate in the liquid crystal display device, the protective film disposed on the viewing side of the liquid crystal cell preferably comprises a functional film such as anti-reflection film provided thereon. As such a functional film there is preferably provided at least one of hard coat layer, anti-glare layer and anti-reflection layer.

Figure 7:
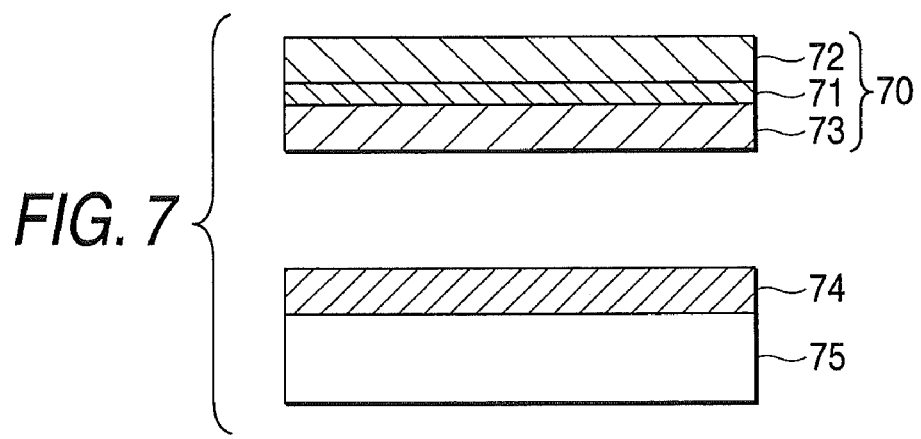
FIG. 7 is a view diagrammatically illustrating the sectional structure of an example of the polarizing plate of the invention.
Figure 8:
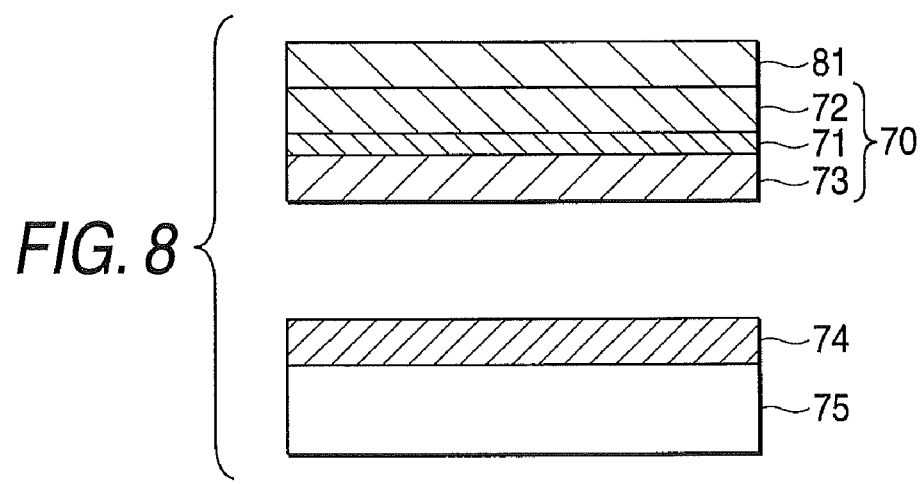
FIG. 8 is a view diagrammatically illustrating the sectional structure of another example of the polarizing plate of the invention.

FIG. 7 is a view diagrammatically illustrating the sectional configuration of an example of the polarizing plate of the invention (glass for liquid crystal cell also shown for the sake of explanation). In FIG. 7, protective films 72 and 73 are provided on the respective side of a polarizer 71. At least one of the protective films 72 and 73 has an optical resin film of the invention. The polarizing plate 70 is stuck to a glass for liquid crystal cell 75 with an adhesive layer 74. FIG. 8 is a view diagrammatically illustrating the sectional configuration of another example of the polarizing plate of the invention. The embodiment of FIG. 8 has a functional film 81 as mentioned above provided on the polarizing plate of FIG. 7.

It is not necessary that the various layers be provided as individual layer. For example, the anti-glare layer may be provided by providing the anti-reflection layer or hard coat layer with such a function so that the anti-reflection layer can act both as anti-reflection layer and anti-glare layer.

(Anti-Reflection Layer)

In the invention, an anti-reflection layer comprising a light-scattering layer and a low refractive index layer laminated on a protective layer in this order or an anti-reflection layer comprising a middle refractive index layer, a high refractive index layer and a low refractive index layer laminated on a protective layer in this order is preferably used. Preferred examples of such an anti-reflection layer will be given below.

A preferred example of the anti-reflection layer comprising a light-scattering layer and a low refractive index layer provided on a protective layer will be described below.

The light-scattering layer preferably has a particulate mat dispersed therein. The refractive index of the material of the light-scattering layer other than the particulate mat is preferably from 1.50 to 2.00. The refractive index of the low refractive index layer is preferably from 1.20 to 1.49. In the invention, the light-scattering layer has both anti-glare properties and hard coating properties. The light-scattering layer may be formed by a single layer or a plurality of layers such as two to four layers.

The anti-reflection layer is preferably designed in its surface roughness such that the central line average roughness Ra is from 0.08 to 0.40 μm, the ten point averaged roughness Rz is 10 times or less Ra, the average distance between mountain and valley Sm is from 1 to 100 μm, the standard deviation of the height of mountains from the deepest portion in roughness is 0.5 μm or less, the standard deviation of the average distance between mountain and valley Sm with central line as reference is 20 μm or less and the proportion of the surface having an inclination angle of from 0 to 5 degrees is 10% or more, making it possible to attain sufficient anti-glare properties and visually uniform matte finish. Further, when the tint of reflected light under C light source comprises a* value of −2 to 2 and b* value of −3 to 3 and the ratio of minimum reflectance to maximum reflectance at a wavelength of from 380 nm to 780 nm is from 0.5 to 0.99, the tint of reflected light is neutral to advantage. Moreover, when the b* value of transmitted light under C light source is predetermined to range from 0 to 3, the yellow tint of white display for use in display devices is reduced to advantage. Further, when a lattice of having a size of 120 μm×40 μm is disposed interposed between the planar light source and the anti-reflection film of the invention so that the standard deviation of brightness distribution measured over the film is 20 or less, glare developed when the film of the invention is applied to a high precision panel can be eliminated to advantage.

When the optical properties of the anti-reflection layer according to the invention are such that the specular reflectance is 2.5% or less, the transmission is 90% or more and the 60° gloss is 70% or less, the reflection of external light can be inhibited, making it possible to enhance the viewability to advantage. In particular, the specular reflectance is more preferably 1% or less, most preferably 0.5% or less. When the haze is from 20% to 50%, the ratio of inner haze to total haze is from 0.3 to 1, the reduction of haze from that up to the light-scattering layer to that developed after the formation of the low refractive index layer is 15% or less, the sharpness of transmitted image at an optical comb width of 0.5 mm is from 20% to 50% and the ratio of transmission of vertical transmitted light to transmission of transmitted light in the direction of 2 degrees from the vertical direction is from 1.5 to 5.0, the prevention of glare on a high precision LCD panel and the elimination of blurring of letters, etc. can be attained to advantage.

(Low Refractive Index Layer)

The refractive index of the low refractive index layer employable herein is preferably from 1.20 to 1.49, more preferably from 1.30 to 1.44. Further, the low refractive index layer preferably satisfies the following numerical formula to advantage from the standpoint of reduction of reflectance.

$$(m/4)\lambda \times 0.7 < n^1 d^1 < (m/4)\lambda \times 1.3$$

wherein m represents a positive odd number; $n^1$ represents the refractive index of the low refractive index layer; and $d^1$ represents the thickness (nm) of the low refractive index layer. λ is a wavelength ranging from 500 nm to 550 nm.

The materials constituting the low refractive index layer will be described hereinafter.

The low refractive index layer preferably comprises a fluorine-containing polymer incorporated therein as a low refractive binder. As such a fluorine-based polymer there is preferably used a thermally or ionized radiation-crosslinkable fluorine-containing polymer having a dynamic friction coefficient of from 0.03 to 0.20, a contact angle of from 90 to 120° with respect to water and a purified water slip angle of 70° or less. As the peel force of the polarizing plate of the invention with respect to a commercially available adhesive tape during the mounting on the image display device decreases, the polarizing plate can be more easily peeled after the sticking of seal or memo to advantage. The peel force of the polarizing plate is preferably 500 gf or less, more preferably 300 gf or less, most preferably 100 gf or less as measured by a tensile testing machine. The higher the surface hardness as measured by a microhardness meter is, the more difficultly can be damaged the low refractive index layer. The surface hardness of the low refractive index layer is preferably 0.3 GPa or more, more preferably 0.5 GPa or more.

Examples of the fluorine-containing polymer to be used in the low refractive index layer include hydrolyzates and dehydration condensates of perfluoroalkyl group-containing silane compounds (e.g., (heptadecafluoro-1,1,2,2-tetrahydrodecyl) triethoxysilane). Other examples of the fluorine-containing polymer include fluorine-containing copolymers comprising a fluorine-containing monomer unit and a constituent unit for providing crosslinking reactivity as constituent components.

Specific examples of the fluorine-containing monomers include fluoroolefins (e.g., fluoroethylene, vinylidene fluoride, tetrafluoroethylene, perfluorooctylethylene, hexafluoropropylene, perfluoro-2,2-dimethyl-1,3-dioxol), partly or fully fluorinated alkylester derivatives of (meth)acrylic acid (e.g., Biscoat 6FM (produced by OSAKA ORGANIC CHEMICAL INDUSTRY LTD.), M-2020 (produced by DAIKIN INDUSTRIES, Ltd.), and fully or partly fluorinated vinyl ethers. Preferred among these fluorine-containing monomers are perfluoroolefins. Particularly preferred among these fluorine-containing monomers is hexafluoropropylene from the standpoint of refractive index, solubility, transparency, availability, etc.

Examples of the constituent unit for providing crosslinking reactivity include constituent units obtained by the polymerization of monomers previously having a self-crosslinking functional group such as glycidyl (meth)acrylate and glycidyl vinyl ether, constituent units obtained by the polymerization of monomers having carboxyl group, hydroxyl group, amino group, sulfo group or the like (e.g., (meth)acrylic acid, methyl (meth)acrylate, hydroxylalkyl (meth)acrylate, allyl acrylate, hydroxyethyl vinyl ether, hydroxybutyl vinyl ether, maleic acid, crotonic acid), and constituent units obtained by introducing a crosslinking reactive group such as (meth)acryloyl group into these constituent units by a polymer reaction (e.g., by reacting acrylic acid chloride with hydroxyl group).

Besides the aforementioned fluorine-containing monomer units and constituent units for providing crosslinking reactivity, monomers free of fluorine atom may be properly copolymerized from the standpoint of solubility in the solvent, transparency of the film, etc. The monomer units which can be used in combination with the aforementioned monomer units are not specifically limited. Examples of these monomer units include olefins (e.g., ethylene, propylene, isoprene, vinyl chloride, vinylidene chloride), acrylic acid esters (e.g., methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinyl ether, vinyl toluene, α-methyl styrene), vinylethers (e.g., methyl vinyl ether, ethyl vinyl ether, cyclohexyl vinyl ether), vinylesters (e.g., vinyl acetate, vinyl propionate, vinyl cinnamate), acrylamides (e.g., N-tert-butyl acrylamide, N-cyclohexyl acrylamide), methacrylamides, and acrylonitrile derivatives.

The aforementioned polymers may be used properly in combination with a hardener as disclosed in JP-A-10-25388 and JP-A-10-147739.

(Light-Scattering Layer)

The light-scattering layer is formed for the purpose of providing the film with light-scattering properties developed by at least one of surface scattering and inner scattering and hard coating properties for the enhancement of scratch resistance of the film. Accordingly, the light-scattering layer comprises a binder for providing hard coating properties, a particulate mat for providing light diffusibility and optionally an inorganic filler for the enhancement of refractive index, the prevention of crosslink shrinkage and the enhancement of strength incorporated therein. Further, the light-scattering layer thus provided acts also as an anti-glare layer to provide the polarizing plate with an anti-glare layer.

The thickness of the light-scattering layer is from 1 to 10 μm, more preferably from 1.2 to 6 μm for the purpose of providing hard coating properties. When the thickness of the light-scattering layer is too small, the resulting polarizing plate exhibits lacks hard coating properties. On the contrary, when the thickness of the light-scattering layer is too great, the resulting polarizing plate exhibits deteriorated curling resistance or worsened brittleness leading to insufficient workability.

The binder to be incorporated in the light-scattering layer is preferably a polymer having a saturated hydrocarbon chain or polyether chain as a main chain, more preferably a polymer having a saturated hydrocarbon chain as a main chain. The binder polymer preferably has a crosslinked structure. As the binder polymer having a saturated hydrocarbon chain as a main chain there is preferably used a (co)polymer of monomers having two or more ethylenically unsaturated groups. In order to provide the binder polymer with a higher refractive index, those containing an aromatic ring or at least one atom selected from the group consisting of halogen atoms other than fluorine, sulfur atom, phosphorus atom and nitrogen atom may be selected.

Examples of the monomer having two or more ethylenically unsaturated groups include esters of polyvalent alcohol with (meth)acrylic acid (e.g., ethylene glycol di(meth)acrylate, butanediol di(meth)acrylate, hexanediol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri(meth)acrylate, dipentaerythritol penta(meth)acrylate, dipentaerythritol tetra(meth)acrylate, dipentaerythritol penta(meth)acrylate, dipentaerithritol hexa(meth)acrylate, pentaerythritol hexa(meth)acrylate, 1,2,3-cyclohexane tetramethacrylate, polyurethane polyacrylate, polyester polyacrylate), modification products of the aforementioned ethylene oxides, vinylbenzene and derivatives thereof (e.g., 1,4-divinylbenzene, 4-vinyl benzoic acid-2-acryloylethylester, 1,4-divinyl cyclohexanone), vinylsulfones (e.g., divinylsulfone), acrylamides (e.g., methylenebisacrylamide), and methacrylamides. The aforementioned monomers may be used in combination of two or more thereof.

Specific examples of the high refractive monomer include bis(4-methacryloylthiophenyl)sulfide, vinyl naphthalene, vinyl phenyl sulfide, and 4-methacryloxy phenyl-4'-methoxyphenylthioether. These monomers, too, may be used in combination of two or more thereof.

The polymerization of the monomers having these ethylenically unsaturated groups can be effected by irradiation with ionized radiation or heating in the presence of a photo-radical polymerization initiator or heat-radical polymerization initiator.

Accordingly, an anti-reflection layer can be formed by a process which comprises preparing a coating solution containing a monomer having an ethylenically unsaturated group, a photo-polymerization initiator or heat radical polymerization initiator, a particulate mat and an inorganic filler, spreading the coating solution over the protective layer, and then irradiating the coat with ionized radiation or applying heat to the coat to cause polymerization reaction and curing. As such a photo-polymerization initiator or the like there may be used any compound known as such.

As the polymer having a polyether as a main chain there is preferably used an open-ring polymerization product of polyfunctional epoxy compound. The open-ring polymerization of the polyfunctidnal epoxy compound can be carried out by the irradiation of the polyfunctional epoxy compound with ionized radiation or applying heat to the polyfunctional epoxy compound in the presence of a photo-acid generator or heat-acid generator. Accordingly, the anti-reflection layer can be formed by a process which comprises preparing a coating solution containing a polyfunctional epoxy compound, a photo-acid generator or heat-acid generator, a particulate mat and an inorganic filler, spreading the coating solution over the protective layer, and then irradiating the coat layer with ionized radiation or applying heat to the coat layer to cause polymerization reaction and curing.

Instead of or in addition to the monomer having two or more ethylenically unsaturated groups, a monomer having a crosslinkable functional group may be used to incorporate a crosslinkable functional group in the polymer so that the crosslinkable functional group is reacted to incorporate a crosslinked structure in the binder polymer.

Examples of the crosslinkable functional group include isocyanate group, epoxy group, aziridin group, oxazoline group, aldehyde group, carbonyl group, hydrazine group, carboxyl group, methylol group, and active methylene group. Vinylsulfonic acids, acid anhydrides, cyanoacrylate derivatives, melamines, etherified methylol, esters, urethane, and metal alkoxides such as tetramethoxysilane, too, may be used as monomers for introducing crosslinked structure. Functional groups which exhibit crosslinkability as a result of decomposition reaction such as block isocyanate group may be used. In other words, in the invention, the crosslinkable functional group may not be reactive as they are but may become reactive as a result of decomposition reaction.

These binder polymers having a crosslinkable functional group may be spread and heated to form a crosslinked structure.

The light-scattering layer comprises a particulate mat incorporated therein having an average particle diameter which is greater than that of filler particles and ranges from 1 to 10 μm, preferably from 1.5 to 7.0 μm, such as inorganic particulate compound and particulate resin for the purpose of providing itself with anti-glare properties.

Specific examples of the aforementioned particulate mat include inorganic particulate compounds such as particulate silica and particulate $TiO_2$, and particulate resins such as particulate acryl, particulate crosslinked acryl, particulate polystyrene, particulate crosslinked styrene, particulate melamine resin and particulate benzoguanamine resin. Preferred among these particulate resins are particulate crosslinked styrene, particulate crosslinked acryl, particulate crosslinked acryl styrene, and particulate silica. The particulate mat may be either spherical or amorphous.

Two or more particulate mats having different particle diameters may be used in combination. A particulate mat having a greater particle diameter may be used to provide the light-scattering layer with anti-glare properties. A particulate mat having a greater particle diameter may be used to provide the light-scattering layer with other optical properties.

Further, the distribution of the particle diameter of the mat particles is most preferably monodisperse. The particle diameter of the various particles are preferably as close to each other as possible. For example, in the case where a particle having a diameter of 20% or more greater than the average particle diameter is defined as coarse particle, the proportion of these coarse particles is preferably 1% or less, more preferably 0.1% or less, even more preferably 0.01% or less of the total number of particles. A particulate mat having a particle diameter distribution falling within the above defined range can be obtained by properly classifying the mat particles obtained by an ordinary synthesis method. By raising the number of classifying steps or intensifying the degree of classification, a matting agent having a better distribution can be obtained.

The aforementioned particulate mat is incorporated in the light-scattering layer in such a manner that the proportion of the particulate mat in the light-scattering layer is from 10 to 1,000 mg/m$^2$, more preferably from 100 to 700 mg/m$^2$.

For the measurement of the distribution of particle size of mat particles, a coulter counter method. The particle size distribution thus measured is then converted to distribution of number of particles.

The light-scattering layer preferably comprises an inorganic filler made of an oxide of at least one metal selected from the group consisting of titanium, zirconium, aluminum, indium, zinc, tin and antimony having an average particle diameter of 0.2 μm or less, preferably 0.1 μm or less, more preferably 0.06 μm or less incorporated therein in addition to the aforementioned particulate mat to enhance the refractive index thereof. In order to enhance the difference of refractive index from the particulate mat, the light-scattering layer comprising a high refractive particulate mat incorporated therein preferably comprises a silicon oxide incorporated therein for keeping the refractive index thereof somewhat low. The preferred particle diameter of the particulate silicon oxide is the same as that of the aforementioned inorganic filler.

Specific examples of the inorganic filler to be incorporated in the light-scattering layer include $TiO_2$, $ZrO_2$, $Al_2O_3$, $In_2O_3$, $ZnO$, $SnO_2$, $Sb_2O_3$, ITO, and $SiO_2$. Particularly preferred among these inorganic fillers are $TiO_2$ and $ZrO_2$ from the standpoint of enhancement of refractive index. The inorganic filler is preferably subjected to silane coupling treatment or titanium coupling treatment on the surface thereof. To this end, a surface treatment having a functional group reactive with the binder seed on the surface thereof is preferably used.

The amount of the inorganic filler to be incorporated is preferably from 10% to 90%, more preferably from 20% to 80%, particularly from 30% to 75% based on the total mass of the light-scattering layer.

Such a filler has a particle diameter which is sufficiently smaller than the wavelength of light and thus causes no scattering. Thus, a dispersion having such a filler dispersed in a binder polymer behaves as an optically uniform material.

The bulk refractive index of the mixture of binder and inorganic filler in the light-scattering layer is preferably from 1.50 to 2.00, more preferably from 1.51 to 1.80. In order to predetermine the bulk refractive index of the mixture within the above defined range, the kind and proportion of the binder and the inorganic filler may be properly selected. How to select these factors can be previously easily known experimentally.

In order to keep the light-scattering layer uniform in surface conditions such as uniformity in coating and drying and prevention of point defects, the coating solution for forming the light-scattering layer comprises either or both of fluorine-based surface active agent and silicone-based surface active agent incorporated therein. In particular, a fluorine-based surface active agent is preferably used because it can be used in a smaller amount to exert an effect of eliminating surface defects such as unevenness in coating and drying and point defects of the anti-reflection film of the invention. Such a fluorine-based surface active agent is intended to render the coating solution adaptable to high speed coating while enhancing the uniformity in surface conditions, thereby raising the productivity.

The anti-reflection layer comprising a middle refractive index layer, a high refractive index layer and a low refractive index layer laminated on a protective film in this order will be described hereinafter.

The anti-reflection layer comprising a layer structure having at least a middle refractive index layer, a high refractive index layer and a low refractive index layer (outermost layer) laminated on a protective film in this order is designed so as to have a refractive index satisfying the following relationship.

Refractive index of high refractive index layer>refractive index of middle refractive index layer>refractive index of protective film>refractive index of low refractive index layer Further, a hard coat layer may be provided interposed between the protective film and the middle refractive index layer. Moreover, the anti-reflection layer may comprise a middle refractive hard coat layer, a high refractive index layer and a low refractive index layer laminated on each other.

Examples of such an anti-reflection layer include those disclosed in JP-A-8-122504, JP-A-8-110401, JP-A-10-300902, JP-A-2002-243906, and JP-A-2000-111706.

Further, the various layers may be provided with other functions. Examples of these layers include stain-proof low refractive index layer, and antistatic high refractive index layer (as disclosed in JP-A-10-206603, JP-A-2002-243906).

The haze of the anti-reflection layer is preferably 5% or less, more preferably 3% or less. The strength of the anti-reflection layer is preferably not lower than H, more preferably not lower than 2H, most preferably not lower than 3H as determined by pencil hardness test method according to JIS K5400.

(High Refractive Index Layer and Middle Refractive Index Layer)

The layer having a high refractive index in the anti-reflection layer is formed by a hardened layer containing at least a high refractive inorganic particulate compound having an average particle diameter of 100 nm or less and a matrix binder.

As the high refractive inorganic particulate compound there may be used an inorganic compound having a refractive index of 1.65 or more, preferably 1.9 or more. Examples of such a high refractive inorganic particulate compound include oxides of Ti, Zn, Sb, Sn, Zr, Ce, Ta, La and In, and composite oxides of these metal atoms.

In order to provide such a particulate material, the following requirements need to be satisfied. For example, the surface of the particles must be treated with a surface treatment (e.g., silane coupling agent as disclosed in JP-A-11-295503, JP-A-11-153703, and JP-A-2000-9908, anionic compound or organic metal coupling agent as disclosed in JP-A-2001-310432). Further, the particles must have a core-shell structure comprising a high refractive particle as a core (as disclosed in JP-A-2001-166104). A specific dispersant must be used at the same time (as disclosed in JP-A-11-153703, U.S. Pat. No. 6,210,858B1, JP-A-2002-277609).

Examples of the matrix-forming materials include known thermoplastic resins, thermosetting resins, etc.

Preferred examples of the matrix-forming materials include polyfunctional compound-containing compositions having two or more of at least any of radically polymerizable group and cationically polymerizable group, compositions having an organic metal compound containing a hydrolyzable group, and at least one selected from the group consisting of compositions containing a partial condensate thereof.

Examples of these materials include compounds as disclosed in JP-A-2000-47004, JP-A-2001-315242, JP-A-2001-31871, and JP-A-2001-296401.

Further, a colloidal metal oxide obtained from a hydrolytic condensate of metal alkoxide and a curable layer obtained from a metal alkoxide composition are preferably used. For the details of these materials, reference can be made to JP-A-2001-293818.

The refractive index of the high refractive index layer is preferably from 1.70 to 2.20. The thickness of the high refractive index layer is preferably from 5 nm to 10 μm, more preferably from 10 nm to 1 μm.

The refractive index of the middle refractive index layer is adjusted so as to fall between the refractive index of the low refractive index layer and the high refractive index layer. The refractive index of the middle refractive index layer is preferably from 1.50 to 1.70. The thickness of the middle refractive index layer is preferably from 5 nm to 10 μm, more preferably from 10 nm to 1 μm.

(Low Refractive Index Layer)

The low refractive index layer is laminated on the high refractive index layer. The refractive index of the low refractive index layer is preferably from 1.20 to 1.55, more preferably from 1.30 to 1.50.

The low refractive index layer is preferably designed as an outermost layer having scratch resistance and stain resistance. In order to drastically raise the scratch resistance of the low refractive index layer, a thin layer which can effectively provide surface slipperiness may be formed on the low refractive index layer by introducing a known silicone or fluorine thereinto.

As the fluorine-containing compound there is preferably used a compound containing a crosslinkable or polymerizable functional group having fluorine atoms in an amount of from 35 to 80% by mass.

Examples of such a compound include those disclosed in JP-A-9-222503, paragraphs [0018]-[0026], JP-A-11-38202, paragraphs [0019]-[0030], JP-A-2001-40284, paragraphs [0027]-[0028], and JP-A-2000-284102.

The refractive index of the fluorine-containing compound is preferably from 1.35 to 1.50, more preferably from 1.36 to 1.47.

As the silicone compound there is preferably used a compound having a polysiloxane structure wherein a curable functional group or polymerizable functional group is incorporated in the polymer chain to form a bridged structure in the film. Examples of such a compound include reactive silicones (e.g., SILAPLANE, produced by CHISSO CORPORATION), and polysiloxanes having silanol group at both ends thereof (as disclosed in JP-A-11-258403).

In order to effect the crosslinking or polymerization reaction of at least any of fluorine-containing polymer and siloxane polymer having crosslinkable or polymerizable group, the coating composition for forming the outermost layer containing a polymerization initiator, a sensitizer, etc. is preferably irradiated with light or heated at the same time with or after spreading to form a low refractive index layer.

Further, a sol-gel cured film obtained by curing an organic metal compound such as silane coupling agent and a silane coupling agent containing a specific fluorine-containing hydrocarbon group in the presence of a catalyst is preferably used.

Examples of such a sol-gel cured film include polyfluoroalkyl group-containing silane compounds and partial hydrolytic condensates thereof (compounds as disclosed in JP-A-58-142958, JP-A-58-147483, JP-A-58-147484, JP-A-9-157582, and JP-A-11-106704), and silyl compounds having poly(perfluoroalkylether) group as a fluorine-containing long chain (compounds as disclosed in JP-A-2000-117902, JP-A-2001-48590, JP-A-2002-53804).

The low refractive index layer may comprise a filler (e.g., low refractive inorganic compound having a primary average particle diameter of from 1 to 150 nm such as particulate silicon dioxide (silica) and particulate fluorine-containing material (magnesium fluoride, calcium fluoride, barium fluoride), organic particulate material as disclosed in JP-A-11-3820, paragraphs [0020]-[0038]), a silane coupling agent, a lubricant, a surface active agent, etc. incorporated therein as additives other than the aforementioned additives.

In the case where the low refractive index layer is disposed under the outermost layer, the low refractive index layer may be formed by a gas phase method (vacuum metallizing method, sputtering method, ion plating method, plasma CVD method, etc.). A coating method is desirable because the low refractive index layer can be produced at reduced cost.

The thickness of the low refractive index layer is preferably from 30 nm to 200 nm, more preferably from 50 nm to 150 nm, most preferably from 60 nm to 120 nm.

(Hard Coat Layer)

The hard coat layer is normally provided on the surface of the protective film to give a physical strength to the protective film having an anti-reflection layer provided thereon. In particular, the hard coat layer is preferably provided interposed between the transparent support and the aforementioned high refractive index layer. The hard coat layer is preferably formed by the crosslinking reaction or polymerization reaction of a photosetting and/or thermosetting compound. The curable functional group in the curable compound is preferably a photopolymerizable functional group. Further, an organic metal compound or organic alkoxysilyl compound containing a hydrolyzable functional group is desirable.

Specific examples of these compounds include the same compounds as exemplified with reference to the high refractive index layer. Specific examples of the composition constituting the hard coat layer include those described in JP-A-2002-144913, JP-A-2000-9908, and pamphlet of WO00/46617.

The high refractive index layer may act also as a hard coat layer. In this case, particles may be finely dispersed in a hard coat layer in the same manner as described with reference to the high refractive index layer to form a high refractive index layer.

The hard coat layer may comprise particles having an average particle diameter of from 0.2 μm to 10 μm incorporated therein to act also as an anti-glare layer provided with anti-glare properties.

The thickness of the hard coat layer may be properly designed depending on the purpose. The thickness of the hard coat layer is preferably from 0.2 μm to 10 μm, more preferably from 0.5 μm to 7 μm.

The strength of the hard coat layer is preferably not lower than H, more preferably not lower than 2H, most preferably not lower than 3H as determined by pencil hardness test according to JIS K5400. The abrasion of the test specimen is preferably as little as possible when subjected to taper test according to JIS K5400.

(Other Layers in Anti-Reflection Layer)

Further, a forward scattering layer, a primer layer, an antistatic layer, an undercoating layer, a protective layer, etc, may be provided.

(Antistatic Layer)

The antistatic layer, if provided, is preferably given an electrical conductivity of $10^{-8}$ ($\Omega cm^{-3}$) or less as calculated in terms of volume resistivity. The use of a hygroscopic material, a water-soluble inorganic salt, a certain kind of a surface active agent, a cation polymer, an anion polymer, colloidal silica, etc. makes it possible to provide a volume resistivity of $10^{-8}$ ($\Omega cm^{-3}$). However, these materials have a great dependence on temperature and humidity and thus cannot provide a sufficient electrical conductivity at low humidity. Therefore, as the electrically conductive layer material there is preferably used a metal oxide. Some metal oxides have a color. The use of such a colored metal oxide as an electrically conductive layer material causes the entire film to be colored to disadvantage. Examples of metal that forms a colorless metal oxide include Zn, Ti, Sn, Al, In, Si, Mg, Ba, Mo, W, and V. Metal oxides mainly composed of these metals are preferably used. Specific examples of these metal oxides include $ZnO$, $TiO_2$, $SnO_2$, $Al_2O_3$, $In_2O_3$, $SiO_2$, $MgO$, $BaO$, $MoO_3$, $WO_3$, $V_2O_5$, and composites thereof. Particularly preferred among these metal oxides are $ZnO$, $TiO_2$, and $SnO_2$. Referring to the incorporation of different kinds of atoms, Al, In, etc. are effectively added to ZnO. Sb, Nb, halogen atoms, etc. are effectively added to $SnO_2$. Nb, Ta, etc. are effectively added to $TiO_2$. Further, as disclosed in JP-B-59-6235, materials comprising the aforementioned metal oxide attached to other crystalline metal particles or fibrous materials (e.g., titanium oxide) may be used. Volume resistivity and surface resistivity are different physical values and thus cannot be simply compared with each other. However, in order to provide an electrical conductivity of $10^{-8}$ ($\Omega cm^{-3}$) or less as calculated in terms of volume resistivity, it suffices if the electrically conductive layer has an electrical conductivity of $10^{-10}$ ($\Omega/\square$) or less, and preferably $10^{-8}$ ($\Omega/\square$) or less, as calculated in terms of surface resistivity. It is necessary that the surface resistivity of the electrically conductive layer be measured when the antistatic layer is provided as an outermost layer. The measurement of surface resistivity can be effected at a step in the course of the formation of laminated film described herein.

<Liquid Crystal Display Device>

The polarizing plate of the invention can be used in liquid crystal display devices to advantage. The polarizing plate of the invention can be used in liquid crystal cells of various display modes. Various display modes such as TN (Twisted Nematic), IPS (In-Plane Switching), FLC (Ferroelectric Liquid Crystal), AFLC (Anti-ferroelectric Liquid Crystal), OCB (Optically Compensatory Bend), STN (Super Twisted Nematic), VA (Vertically Aligned) and HAN (Hybrid Aligned Nematic) have been proposed. Preferred among these display modes is VA mode.

In a VA mode liquid crystal cell, rod-shaped liquid crystal molecules are vertically oriented when no voltage is applied.

VA mode liquid crystal cells include (1) liquid crystal cell in VA mode in a narrow sense in which rod-shaped liquid crystal molecules are oriented substantially vertically when no voltage is applied but substantially horizontally when a voltage is applied (as disclosed in JP-A-2-176625). In addition to the VA mode liquid crystal cell (1), there have been provided (2) liquid crystal cell of VA mode which is multi-domained to expand the viewing angle (MVA mode) (as disclosed in SID97, Digest of Tech. Papers (preprint) 28 (1997), 845), (3) liquid crystal cell of mode in which rod-shaped molecules are oriented substantially vertically when no voltage is applied but oriented in twisted multidomained mode when a voltage is applied (n-ASM mode, CPA mode) (as disclosed in Preprints of Symposium on Japanese Liquid Crystal Society Nos. 58 to 59, 1988 and (4) liquid crystal cell of SURVAIVAL mode (as reported in LCD International 98).

As a VA mode liquid crystal display device there may be used one comprising a liquid crystal cell (VA mode cell) and two sheets of polarizing plates disposed on the respective side thereof. The liquid crystal cell has a liquid crystal provided interposed between the two sheets of electrode substrates.

Figure 9:
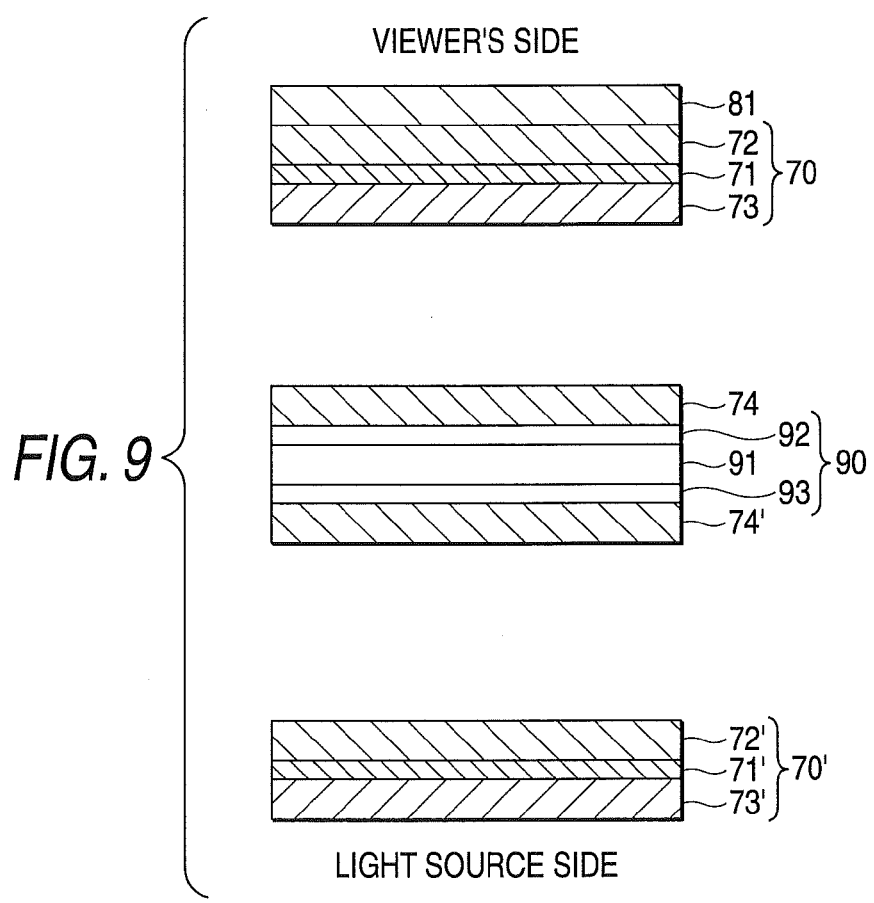
FIG. 9 is a diagram illustrating an example of the configuration of the liquid crystal display device of the invention.
Figure 10:
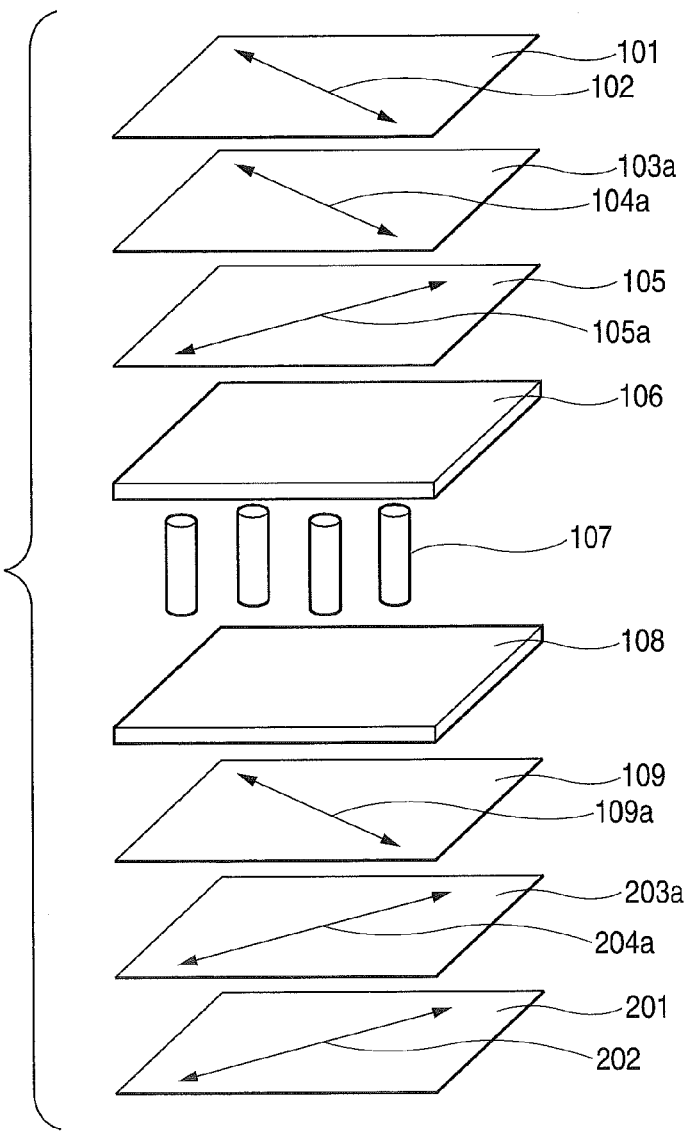
FIG. 10 is a diagram illustrating an example of the configuration of the liquid crystal display device of the invention.

FIGS. 9 and 10 each depict an example of the configuration of a liquid crystal display device of the invention.

In FIG. 9, protective films 72 and 73 are provided on the respective side of a polarizer 71. At least one of the protective films 72 and 73 has an optical resin film of the invention. The optical resin film of the invention is preferably provided on the liquid crystal cell side of the polarizer 71. A functional film 81 is provided on the protective film 72 (observer side). The polarizing plate 70 is stuck to a glass for liquid crystal cell 92 with an adhesive layer 74 interposed therebetween. A liquid crystal cell 90 comprises a liquid crystal layer 91 provided interposed between the glass sheets for liquid crystal cell 92 and 93. A polarizing plate 70' is stuck to the glass for liquid crystal 93 on the light source side with an adhesive layer 74' interposed therebetween. The polarizing plate 70' comprises protective films 72' and 73' provided on the respective side of a polarizer 71'. In the invention, either or both of the polarizing plates 70 and 70' may have an optical resin film of the invention.

FIG. 10 depicts a liquid crystal display device of the invention in more detail. In FIG. 10, the liquid crystal display device has a liquid crystal cell comprising a liquid crystal layer 107 and an upper substrate 106 and a lower substrate 108 with the liquid crystal layer 107 interposed therebetween. The upper substrate 106 and the lower substrate 108 are subjected to alignment treatment on the liquid crystal side thereof. Polarizing films 101 and 201 are provided with the liquid crystal cell interposed therebetween. The transmission axes 102 and 202 o the polarizing films 101 and 201, respectively, are disposed perpendicular to each other and at an angle of 45° from the direction of alignment of the liquid crystal layer 107 in the liquid crystal cell. Disposed interposed between the polarizing films 101 and 201 and the liquid crystal cell are optical resin films 103a and 203a of the invention and optically anisotropic layers 105 and 109, respectively.

The optical resin films 103a and 203a have its in-plane slow axes 104a and 204a disposed parallel to the direction of the transmission axes 102 and 202 of the polarizing films 101 and 201 disposed adjacent thereto, respectively.

In the case where a protective film other than the optical resin film of the invention is used, any ordinary cellulose acylate may be used. Examples of such a cellulose acylate film include commercially available products such as KC4UX2M (produced by Konica Minolta Opto Products Co., Ltd.; 40 μm), KC5UX (produced by Konica Minolta Opto Products Co., Ltd.; 60 μm), KC80UVSFD (produced by Konica Minolta Opto Products Co., Ltd.; 80 μm), TD80U (produced by Fuji Photo Film Co., Ltd.; 80 μm), and TF80U (produced by Fuji Photo Film Co., Ltd.; 80 μm). However, the invention is not limited to these products.

EXAMPLE

The invention will be further described in the following examples, but the invention is not limited thereto.

Example 1
(Preparation of Cellulose Acylate Film)

A mixture obtained by uniformly stirring 100 parts by mass of cellulose made from linter pulp and glacial acetic acid in an amount of 100 parts by mass based on the mass of cellulose was added to a chilled mixture of 245 parts by mass of acetic anhydride, 365 parts by mass of acetic acid and 15 parts by mass of sulfuric acid as a catalyst in a reaction vessel where they were then subjected to acetylation at 47° C. for 60 minutes. During the termination of acetylation reaction, 45.5 parts by mass of an aqueous solution of magnesium acetate (30 mass-%) for hydrolyzation and neutralization was added to the reaction mixture so that the excess acetic anhydride and sulfuric acid were subjected to hydrolyzation and neutralization, respectively. Thereafter, to the reaction solution was added about 12.8 parts by mass of an aqueous solution of magnesium acetate (30 mass-%) for ripening while being heated to 60° C. Thereafter, to the reaction solution was added water. The reaction solution was then subjected to ripening reaction at 70° C. for 40 minutes. After the termination of ripening reaction, to the reaction solution was added about 20 parts by mass of an aqueous solution of magnesium acetate (30 mass-%) to completely neutralize sulfuric acid and terminate the reaction. After the termination of the reaction, the reaction product was subjected to precipitation and washing with a large excess of water, and then dried.

The following components were charged in a mixing tank where they were then heated with stirring so that they were dissolved to prepare a cellulose triacetate (triacetyl cellulose: TAC) solution. At the same time, to 100 parts by mass of cellulose acylate were 0.05 parts by mass of a matting agent (AEROSIL R972, produced by NIPPON AEROSIL CO., LTD.) as particulate material, 0.3 parts by mass of the following ultraviolet absorber 1 and 0.7 parts by mass of the following ultraviolet absorber 2 to complete a dope.

| Material/solvent formulation | |
|---|---|
| Cellulose acetate (substitution degree: 2.81; acetylation degree: 60.2%) | 100 parts by mass |
| Triphenyl phosphate (plasticizer) | 6.5 parts by mass |
| Biphenyl diphenyl phosphate (plasticizer) | 5.2 parts by mass |
| Methylene chloride (1st solvent) | 500 parts by mass |
| Methanol (2nd solvent) | 80 parts by mass |
| Retardation raising agent shown below ($\lambda$max = 230 nm) | 1.0 parts by mass |

Retardation raising agent

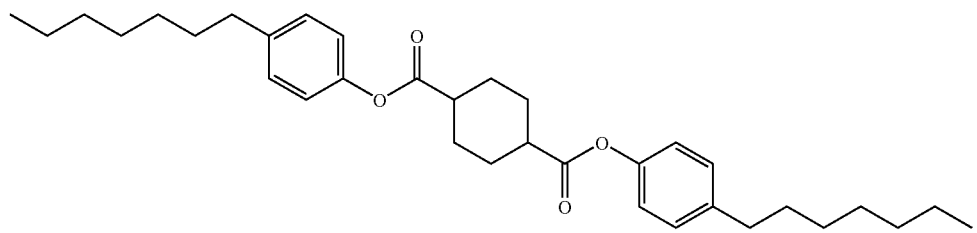

-continued

Material/solvent formulation

Ultraviolet absorber 1

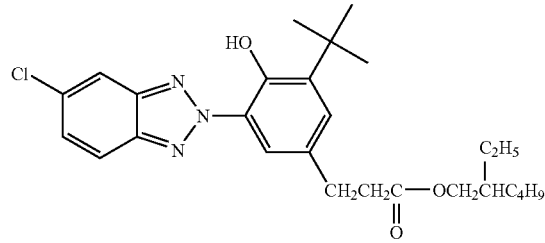

Ultraviolet absorber 2

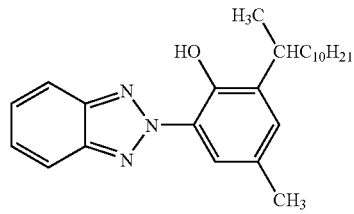

(Flow Casting)

The aforementioned dope was flow-casted over a stainless steel belt at a dope temperature of 30° C. with a width of 1.6 m. The dope thus flow-casted was dried for 1 minute over the stainless steel belt which had been temperature-controlled by bringing 25° C. tepid water into contact with the back surface thereof, retained for 15 seconds on the stainless steel belt into the back surface of which 15° C. chilled water had been brought into contact, and then peeled off the stainless steel belt.

Subsequently, using a monoaxial tenter, the web thus peeled was gripped by a clip at the both edges thereof (Step A). At Step B, the distance between the two clips was crosswise changed at a stretching rate of 250%/min. During this procedure, the film ambient temperature was 120° C. and the draw ratio was 1.3.

Subsequently, at Step C, the film was conveyed while being gripped by the clips. At Step C, the film was relaxed such that the width of the film was 98% of that at Step B. Subsequently, the film was dried at Step D1 where the ambient temperature had been predetermined to be 100° C. to obtain a cellulose acylate film 1.

At the aforementioned film forming procedure, the stretching temperature was predetermined to be (Tg+30° C.) wherein Tg is the glass transition point of the film.

Further, the drying conditions were adjusted such that the ratio of average drying rate at the gripping step and stretching step to average drying rate at the relaxing step was 3.1.

The cellulose acylate film thus obtained was then wound on a glass resin-reinforced resin core having a core diameter of 200 mm over a width of 1 m and a length of 100 m by a taper tension method to make a film roll. During this procedure, an emboss ring having a temperature of 250° C. was pressed against the edge of the film so that the film was thickened to prevent the adhesion of film to film.

The film which had been unwound from the film roll thus obtained was then measured for Re and Rth. The results are set forth in Table 1. All the films had a thickness of 80 μm.

(Preparation of Film Nos. 2 and 3)

Films having optical properties set forth in Table 1 were prepared in the same manner as Film No. 1 except that the stretching temperature and ultraviolet absorber were changed.

All the films obtained in the present example showed a haze of from 0.1 to 0.9, a matting agent secondary average particle diameter of 1.0 μm or less and a mass change of from 0% to 3% developed after 48 hours of standing at 80° C.–90% RH. Further, all the samples showed a photoelastic coefficient of $50 \times 10^{-13}$ cm$^2$/dyn or less.

[Preparation of Polarizing Plates 1 to 3]

A polyvinyl alcohol (PVA) film having a thickness of 75 μm and a polymerization degree of 2,400 was allowed to swell with 30° C. tepid water for 40 seconds, dipped in a 6 mass-% aqueous solution of potassium iodide at 30° C. for 60 seconds so that it was dyed, and then stretched longitudinally by a factor of 5.0 while being dipped in an aqueous solution having a boric acid concentration of 4% by mass and a potassium iodide concentration of 3% by mass at 40° C. for 60 seconds. Thereafter, the polyvinyl alcohol film was dried at 50° C. for 4 minutes to obtain a polarizer.

The cellulose acylate film Nos. 1 to 3 which had been already prepared was dipped in a 1.5 mol/l aqueous solution of sodium hydroxide having a temperature of 55° C., and then thoroughly washed with water to remove sodium hydroxide. Thereafter, the cellulose acylate films were dipped in a 0.005 mol/l diluted aqueous solution of sulfuric acid having a temperature of 35° C. for 1 minute, and then dipped in water so that the diluted aqueous solution of sulfuric acid was washed away. Finally, the samples were thoroughly dried at 120° C.

Each of the cellulose acylate films 1 to 3 thus saponified and "TD80U" (produced by Fuji Photo Film Co., Ltd.) were stuck to each other with a polyvinyl alcohol-based adhesive with the aforementioned polarizer film interposed therebetween. The laminate was then heated to 70° C. for 30 minutes. Thereafter, the film was crosswise trimmed by 3 cm at the both edges thereof to prepare rolled polarizers 1 to 3 having an effective width of 1,000 mm and a length of 50 m.

[Spreading of Adhesive Layer]

(Preparation of Acrylic Polymer Solution)

75 parts by mass of n-butyl acrylate (n-BA), 20 parts by mass of methyl acrylate (MA), 5 parts by mass of 2-hydroxy acrylate (2-HEA), 100 parts by mass of ethyl acetate and 0.2 parts by mass of azobisisobutylonitrile (AIBN) were charged in a reaction vessel in which the air within was then replaced by nitrogen gas. The reaction vessel was then heated to 60° C. with the reaction mixture being stirred in a nitrogen atmosphere so that the reaction mixture was reacted for 4 hours. After 4 hours, to the reaction mixture were then added 100 parts by mass of toluene, 5 parts by mass of α-methyl styrene and 2 parts by mass of AIBN. The reaction mixture was heated to 90° C. where it was then reacted for 4 hours. After reaction, the reaction product was diluted with ethyl acetate to obtain an acryl polymer solution having a solid content of 20%. To the polymer solution in an amount of solid content of 100 parts by mass were then added 1.0 parts by mass of an isocyanate-based crosslinking agent (trade name: Colonate L, produced by NIPPON POLYURETHANE INDUSTRY CO., LTD.). The mixture was then thoroughly stirred to obtain an adhesive composition.

(Preparation of Polarizing Plates with Adhesive 1 to 3)

The polarizing plates 1 to 3 prepared above were to be applied with an adhesive.

The aforementioned adhesive composition containing an acryl polymer solution was spread over a release-treated polyester film to form an adhesive layer thereon to a thickness of 25 μm. The adhesive layer thus formed was transferred to the polarizing plate (on the protective film on the cell side) which was then ripened at a temperature of 23° C. and a humidity of 65% for 7 days to prepare polarizing plates with adhesive 1 to 3. A separate film was then stuck to the adhesive layer. A protect film was stuck to the protective film on the side of the polarizing plate opposite the cell.

[Moisture Conditioning of Polarizing Plate]

The polarizing plate with adhesive 1 thus obtained was cut into a size of 41 cm×30 cm (in such an arrangement that the absorption axis of the polarizing plate was parallel to one of the sides). The protect film was then peeled off the polarizing plate. The polarizing plate was then moisture-conditioned in an atmosphere of 25° C. and 60% RH for 48 hours.

[Mounting on Panel]

(Mounting on VA Panel)

The polarizing plate and the retardation plate were peeled off a VA mode liquid crystal TV (LC-20C5, produced by SHARP CORPORATION) on the both sides thereof. The polarizing plates 1 to 3 which had been prepared and moisture-conditioned in the aforementioned examples were each stuck to the back side of the liquid crystal TV using a laminator roll. A commercially available polarizing plate free of viewing angle compensatory plate (HLC2-5618, produced by SANRITZ) was stuck to the front side of the liquid crystal TV using a laminator roll. Thus, a liquid crystal panel was prepared.

During this procedure, arrangement was made such that the absorption axis of the polarizing plate on the viewing side was disposed parallel to the panel, the absorption axis of the polarizing plate on the back light side was disposed perpendicular to the panel and the adhesive surface was disposed on the liquid crystal cell side.

The liquid crystal panel having a polarizing plate stuck thereto was then used to assemble a liquid crystal TV. The back light of the liquid crystal TV was then turned on. The color shift Δx at an azimuthal angle of 0°, a polar angle of 60° and front ways were then determined. The measurement was made at 10 points on the screen. The measurements were then averaged to give Δx. The results are set forth in Table 1 below.

Color shift: sum (u'v': chromaticity coordinate in CIELAB space) of ΔCu'v' at an azimuthal angle of 0°: u'v' (polar angle of 60°)−u'v' (polar angle of 0°) and ΔCu'v' at an azimuthal angle of 180°: u'v' (polar angle of 60°)−u'v' (polar angle of 0°)

TABLE 1

| Film No. | Re (450) | Re (550) | Re (650) | Rth (450) | Rth (550) | Rth (650) | (A) | (B) | (C) | (D) | Re variation coefficient | Rth variation coefficient | Color shift | Stretching temp | Ultraviolet absorber added ? | Remarks |
|---|---|---|---|---|---|---|---|---|---|---|---|---|---|---|---|---|
| 1 | 40 | 50 | 60 | 250 | 250 | 250 | 0.8 | 1.2 | 0.80 | 1.20 | 3.9 | 4.1 | 94 | Tg + 30° C. | Yes | Inventive |
| 2 | 40 | 50 | 60 | 225 | 250 | 275 | 0.8 | 1.2 | 0.89 | 1.09 | 4.5 | 4.1 | 100 | Tg + 30° C. | No | Inventive |
| 3 | 50 | 50 | 50 | 250 | 250 | 250 | 1 | 1 | 1.00 | 1.00 | 4.5 | 4.3 | 132 | Tg + 5° C. | Yes | Comparative |

Color shift is represented relative to the display property of Film No. 2 as 100. The smaller this figure is, the less is color shift.

As can be seen in Table 1, the liquid crystal display device comprising a film having the optical properties of the invention shows little color shift to advantage.

Example 2

A film was prepared in the same manner as in Example 1 except that the drying conditions were changed and the distribution of in-plane Re and Rth was changed as set forth in Table 2. The film thus prepared was then evaluated for color shift in the same manner as in Example 1. The results are set forth in Table 2.

TABLE 2

| Film No. | Re (450) | Re (550) | Re (650) | Rth (450) | Rth (550) | Rth (650) | (A) | (B) | (C) | (D) | A/B* | Re variation coefficient | Rth variation coefficient | Color shift | Remarks |
|---|---|---|---|---|---|---|---|---|---|---|---|---|---|---|---|
| 21 | 40 | 50 | 60 | 250 | 250 | 250 | 0.8 | 1.2 | 0.8 | 1.2 | 3.5 | 4.1 | 8 | 78 | Inventive |
| 22 | 40 | 50 | 60 | 250 | 250 | 250 | 0.8 | 1.2 | 0.8 | 1.2 | 2.2 | 4.3 | 8.6 | 81 | Inventive |
| 23 | 40 | 50 | 60 | 250 | 250 | 250 | 0.8 | 1.2 | 0.8 | 1.2 | 1.5 | 6.8 | 13.5 | 100 | Comparative |
| 24 | 40 | 50 | 60 | 250 | 250 | 250 | 0.8 | 1.2 | 0.8 | 1.2 | 4.5 | 7.3 | 12.1 | 105 | Comparative |

*A/B: A represents the average drying rate at the gripping step and stretching step. B represents the average drying rate at the relaxing step.
Color shift is represented relative to the display property of Film No. 23 as 100.

As can be seen in Table 2 above, the predetermination of the distribution of Re and Rth within the range defined in the invention makes it possible to obtain a display device having little color shift.

Example 3

A 1.0 N solution of potassium hydroxide (solvent: water/isopropyl alcohol/propylene glycol=69.2 parts by mass/15 parts by mass/15.8 parts by mass) was spread over the film prepared in Example 1 on the band side thereof at a rate of 10 cc/m$^2$. The coated film was then kept at about 40° C. for 30 seconds. The alkaline solution was scratched off the coat film. The coated film was washed with purified water. Water droplets were then blown off the coated film with air from an air knife. Thereafter, the coated film was dried at 100° C. for 15 seconds. The film thus processed was then measured for contact angle with respect to purified water. The result was 42°.

(Preparation of Alignment Film)
A alignment film coating solution having the following formulation was spread over each of Film Nos. 1 to 3 at a rate of 28 ml/m$^2$ using a #16 wire bar coater. The coated films were each dried with 60° C. hot air for 60 seconds and then with 90° C. hot air for 150 seconds to prepare an alignment film.

| Formulation of alignment film coating solution | |
|---|---|
| Modified polyvinyl alcohol shown below | 10 parts by mass |
| Water | 371 parts by mass |
| Methanol | 119 parts by mass |

| -continued | |
|---|---|
| Formulation of alignment film coating solution | |
| Glutaraldehyde (crosslinking agent) | 0.5 parts by mass |
| Citric acid ester (AS3, produced by Sankyo Chemical Industry Co., Ltd.) | 0.35 parts by mass |

Modified polyvinyl alcohol

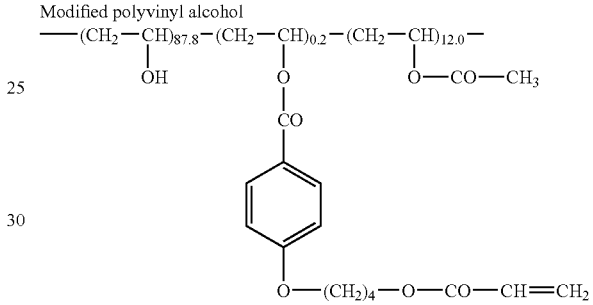

The alignment film thus dried has a thickness of 1.1 μm. The alignment film thus formed was then measured for surface roughness by means of an atomic force microscope (AFM: Atomic Force Microscope, SPI3800N, produced by Seiko Instruments Inc.). The result was 1.147 nm.

(Formation of Optically Anisotropic Layer)
A coating solution containing a discotic liquid crystal having the following formulation was continuously spread over the film which was being conveyed at a rate of 20 m/min on the alignment film side thereof using a #2.8 wire bar which was being rotated in the same direction as the conveying direction of the film at 391 rpm.

| Formulation of discotic liquid crystal layer coating solution | |
|---|---|
| Discotic liquid crystal compound shown below | 33.2% by mass |
| Compound shown below (additive for aligning the disc surface at 5 degrees or less) | 0.1% by mass |
| Ethylene oxide-modified trimethylol propane acrylate (V#360, produced by OSAKA ORGANIC CHEMICAL INDUSTRY LTD.) | 3.2% by mass |
| Sensitizer (Kayacure DETX, produced by NIPPON KAYAKU CO., LTD.) | 0.4% by mass |
| Photopolymerization initiator (Irgacure 907, produced by Ciba Geigy, Inc.) | 1.1% by mass |
| Methyl ethyl ketone | 62.0% by mass |

Discotic liquid crystal compound

-continued

Formulation of discotic liquid crystal layer coating solution

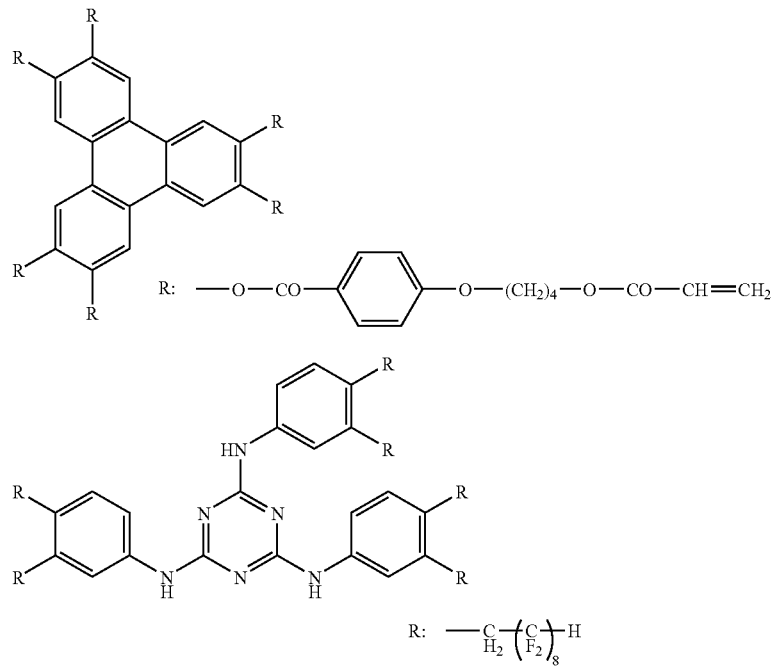

At a step of continuously heating from room temperature to 100° C., the film was dried to remove the solvent. Thereafter, the film was heated in a 130° C. drying zone for about 90 seconds in such a manner that the wind velocity on the surface of the discotic liquid crystal compound layer was 2.5 m/sec to align the discotic liquid crystal compound. Subsequently, the film was irradiated with ultraviolet rays for 4 seconds from an ultraviolet ray emitter (ultraviolet lamp: output: 120 W/cm) while the surface temperature was about 130° C. to allow crosslinking reaction to proceed so that the discotic liquid crystal compound was fixed aligned. Thereafter, the film was allowed to cool to room temperature, and then wound in cylindrical form to form a roll. Thus, a rolled optically compensatory film was prepared.

The angle of the disc surface of the discotic liquid crystal compound with respect to the surface of the transparent polymer film was 0 degree.

The films prepared from Film Nos. 1, 2 and 3 were then measured for optical properties as Film Nos. 33, 35 and 31, respectively. The results are set forth in Table 3 below.

The optically compensatory films thus obtained was observed for unevenness with the polarizing plate disposed in crossed Nicols. As a result, no unevenness was detected even when these optically compensatory films were observed at front ways and in the direction of 60° from the line normal to the surface thereof.

These films were each mounted on a liquid crystal display device in the same manner as in Example 1 to evaluate color shift. The results are set forth in Table 3 below.

The effect of the invention can be remarkably exerted on films having an optically anisotropic layer.

TABLE 3

| Film No. | Re (450) | Re (550) | Re (650) | Rth (450) | Rth (550) | Rth (650) | (A) | (B) | (C) | (D) | Re variation coefficient | Rth variation coefficient | Color shift | Remarks |
|---|---|---|---|---|---|---|---|---|---|---|---|---|---|---|
| 31 | 50 | 50 | 50 | 360 | 360 | 360 | 1.00 | 1.00 | 1.00 | 1.00 | 4.3 | 4.1 | 147 | Comparative |
| 33 | 40 | 50 | 60 | 360 | 360 | 360 | 0.80 | 1.20 | 0.80 | 1.20 | 3.8 | 3.9 | 100 | Inventive |
| 35 | 40 | 50 | 60 | 335 | 360 | 385 | 0.80 | 1.20 | 0.86 | 1.12 | 4.4 | 4 | 106 | Inventive |

Color shift is represented relative to the display property of Film No. 33 as 100. The smaller this figure is, the less is color shift.

Example 4

[Preparation of Protective Film with Anti-Reflection Properties (Film 25)]

(Preparation of Light-Scattering Layer Coating Solution)

50 g of a mixture of pentaerythritol triacrylate and pentaerythritol tetraacrylate (PETA, produced by NIPPON KAYAKU CO., LTD.) was diluted with 38.5 g of toluene. Further, to the solution was added 2 g of a polymerization initiator (Irgacure 184, produced by Ciba Specialty Chemicals Co., Ltd.). The mixture was then stirred. The solution thus obtained was spread, and then ultraviolet-cured to obtain a coat layer having a refractive index of 1.51.

To the solution were then added 1.7 g of a 30% toluene dispersion of a particulate crosslinked polystyrene having an average particle diameter of 3.5 μm (refractive index: 1.60; SX-350, produced by Soken Chemical & Engineering Co., Ltd.) which had been dispersed at 10,000 rpm using a polytron dispersing machine for 20 minutes and 13.3 g of a 30% toluene dispersion of a particulate crosslinked acryl-styrene having an average particle diameter of 3.5 μm (refractive index: 1.55, produced by Soken Chemical & Engineering Co., Ltd.). Finally, to the mixture were added 0.75 g of a fluorine-based surface modifier (FP-1) and 10 g of a silane coupling agent (KBM-5103, produced by Shin-Etsu Chemical Co., Ltd.) to obtain a completed solution.

The aforementioned mixture was then filtered through a polypropylene filter having a pore diameter of 30 μm to prepare a light-scattering layer coating solution.

(Preparation of Low Refractive Index Layer Coating Solution)

Firstly, a sol a was prepared in the following manner. In some detail, 120 parts of methyl ethyl ketone, 100 parts of an acryloyloxypropyl trimethoxysilane (KBM5103, produced by Shin-Etsu Chemical Co., Ltd.) and 3 parts of diisopropoxyaluminum ethyl acetoacetate were charged in a reaction vessel equipped with an agitator and a reflux condenser to make mixture. To the mixture were then added 30 parts of deionized water. The mixture was reacted at 60° C. for 4 hours, and then allowed to cool to room temperature to obtain a sol a. The mass-average molecular weight of the sol was 1,600. The proportion of components having a molecular weight of from 1,000 to 20,000 in the oligomer components was 100%. The gas chromatography of the sol showed that no acryloyloxypropyl trimethoxysilane which is a raw material had been left.

13 g of a thermally-crosslinkable fluorine-containing polymer (JN-7228; solid concentration: 6%; produced by JSR Co., Ltd.) having a refractive index of 1.42, 1.3 g of silica sol (silica having a particle size different from that MEK-ST; average particle size: 45 nm; solid concentration: 30%; produced by NISSAN CHEMICAL INDUSTRIES, LTD.), 0.6 g of the sol a thus prepared, 5 g of methyl ethyl ketone and 0.6 g of cyclohexanone were mixed with stirring. The solution was then filtered through a polypropylene filter having a pore diameter of 1 μm to prepare a low refractive index layer coating solution.

(Preparation of Transparent Protective Film with Anti-Reflection Layer)

The aforementioned coating solution for functional layer (light-scattering layer) was spread over a triacetyl cellulose film having a thickness of 80 μm (Fujitac TD80U, produced by Fuji Photo Film Co., Ltd.) which was being unwound from a roll at a gravure rotary speed of 30 rpm and a conveying speed of 30 m/min using a microgravure roll with a diameter of 50 mm having 180 lines/inch and a depth of 40 μm and a doctor blade. The coated film was dried at 60° C. for 150 seconds, irradiated with ultraviolet rays at an illuminance of 400 mW/cm$^2$ and a dose of 250 mJ/cm$^2$ from an air-cooled metal halide lamp having an output of 160 W/cm (produced by EYE GRAPHICS CO., LTD.) in an atmosphere in which the air within had been purged with nitrogen so that the coat layer was cured to form a functional layer to a thickness of 6 μm. The film was then wound.

The coating solution for low refractive layer thus prepared was spread over the triacetyl cellulose film having the functional layer (light-scattering layer) provided thereon was being unwound at a gravure rotary speed of 30 rpm and a conveying speed of 15 m/min using a microgravure roll with a diameter of 50 mm having 180 lines/inch and a depth of 40 μm and a doctor blade. The coated film was dried at 120° C. for 150 seconds and then at 140° C. for 8 minutes. The film was irradiated with ultraviolet rays at an illuminance of 400 mW/cm$^2$ and a dose of 900 mJ/cm$^2$ from an air-cooled metal halide lamp having an output of 240 W/cm (produced by EYE GRAPHICS CO., LTD.) in an atmosphere in which the air within had been purged with nitrogen to form a low refractive layer to a thickness of 100 nm. The film was then wound to prepare a protective film with anti-reflection properties (Film 25).

[Protective Film 26 with Anti-Reflection Properties]

(Preparation of Hard Coat Layer Coating Solution)

To 750.0 parts by mass of a trimethylolpropane triacrylate (TMPTA, produced by NIPPON KAYAKU CO., LTD.) were added 270.0 parts by mass of a poly(glycidyl methacrylate) having a mass-average molecular weight of 3,000, 730.0 g of methyl ethyl ketone, 500.0 g of cyclohexanone and 50.0 g of a photopolymerization initiator (Irgacure 184, produced by Ciba Geigy Japan Inc.). The mixture was then stirred. The mixture was then filtered through a polypropylene filter having a pore diameter of 0.4 μm to prepare a hard coat layer coating solution.

(Preparation of Dispersion of Particulate Titanium Dioxide)

As the particulate titanium dioxide there was used a particulate titanium dioxide containing cobalt surface-treated with aluminum hydroxide and zirconium hydroxide (MPT-129, produced by ISHIHARA SANGYO KAISHA, LTD.).

To 257.1 g of the particulate titanium dioxide were then added 38.6 g of the following dispersant and 704.3 g of cyclohexanone. The mixture was then dispersed using a dinomill to prepare a dispersion of titanium dioxide particles having a mass-average particle diameter of 70 nm.

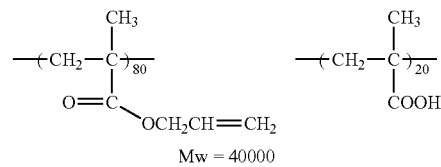

(Preparation of Middle Refractive Index Layer Coating Solution)

To 88.9 g of the aforementioned dispersion of titanium dioxide particles were added 58.4 g of a mixture of dipentaerytritol petaacrylate and dipentaerythritol hexaacrylate (DPHA), 3.1 g of a photopolymerization initiator (Irgacure 907), 1.1 g of a photosensitizer (Kayacure DETX, produced by NIPPON KAYAKU CO., LTD.), 482.4 g of methyl ethyl ketone and 1,869.8 g of cyclohexanone. The mixture was then stirred. The mixture was thoroughly stirred, and then filtered through a polypropylene filter having a pore diameter of 0.4 μm to prepare a middle refractive index layer coating solution.

(Preparation of High Refractive Index Layer Coating Solution)

To 586.8 g of the aforementioned dispersion of titanium dioxide particles were added 47.9 g of a mixture of dipentaerytritol petaacrylate and dipentaerythritol hexaacrylate (DPHA), 4.0 g of a photopolymerization initiator (Irgacure 907), 1.3 g of a photosensitizer (Kayacure DETX, produced by NIPPON KAYAKU CO., LTD.), 455.8 g of methyl ethyl ketone and 1,427.8 g of cyclohexanone. The mixture was then stirred. The mixture was thoroughly stirred, and then filtered through a polypropylene filter having a pore diameter of 0.4 μm to prepare a high refractive index layer coating solution.

(Preparation of Low Refractive Index Layer Coating Solution)

The copolymer (P-1) having the following structure was dissolved in methyl isobutyl ketone in such an amount that the concentration reached 7% by mass. To the solution were then added a methacrylate group-terminated silicone resin X-22-164C (produced by Shin-Etsu Chemical Co., Ltd.) and a photoradical generator Irgacure 907 (trade name) in an amount of 3% and 5% by mass based on the solid content, respectively, to prepare a low refractive index layer coating solution.

Copolymer (P-1)

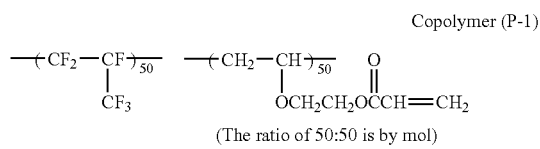

(The ratio of 50:50 is by mol)

(Preparation of Transparent Protective Film with Anti-Reflection Layer)

A hard coat layer coating solution was spread over a triacetyl cellulose film having a thickness of 80 μm (Fujitack TD80U, produced by Fuji Photo Film Co., Ltd.) using a gravure coater. The coated film was dried at 100° C., and then irradiated with ultraviolet rays at an illuminance of 400 mW/cm² and a dose of 300 mJ/cm² from an air-cooled metal halide lamp having an output of 160 W/cm (produced by EYE GRAPHICS CO., LTD.) in an atmosphere in which the air within had been purged with nitrogen to reach an oxygen concentration of 1.0 vol-% so that the coat layer was cured to form a hard coat layer to a thickness of 8 μm.

The middle refractive index layer coating solution, the high refractive index layer coating solution and the low refractive index layer coating solution were continuously spread over the hard coat layer using a gravure coater having three coating stations.

The drying conditions of the middle refractive index layer were 100° C. and 2 minutes. Referring to the ultraviolet curing conditions, the air in the atmosphere was purged with nitrogen so that the oxygen concentration reached 1.0 vol-%. In this atmosphere, ultraviolet rays were emitted at an illuminance of 400 mW/cm² and a dose of 400 mJ/cm² by an air-cooled metal halide lamp having an output of 180 W/cm² (produced by EYE GRAPHICS CO., LTD.). The middle refractive index layer thus cured had a refractive index of 1.630 and a thickness of 67 nm.

The drying conditions of the high refractive index layer and the low refractive index layer were 90° C. and 1 minute followed by 100° C. and 1 minute. Referring to the ultraviolet curing conditions, the air in the atmosphere was purged with nitrogen so that the oxygen concentration reached 1.0 vol-%. In this atmosphere, ultraviolet rays were emitted at an illuminance of 600 mW/cm² and a dose of 600 mJ/cm² by an air-cooled metal halide lamp having an output of 240 W/cm² (produced by EYE GRAPHICS CO., LTD.).

The high refractive layer thus cured had a refractive index of 1.905 and a thickness of 107 nm and the low refractive layer thus cured had a refractive index of 1.440 and a thickness of 85 nm. Thus, a transparent protective film (film 26) with anti-reflection layer was prepared.

The polarizing plate preparation process of Example 1 was followed except that TD80U was replaced by the aforementioned Films 25 and 26. These samples were each then evaluated for color shift in the same manner as in Example 1.

The effect of the invention can be remarkably exerted even on a protective film having a hard coat layer and an anti-reflection layer.

Example 5

(Formation of Cellulose Acylate Film)

(1) Cellulose Acylate

To a cellulose as a raw material was added sulfuric acid as a catalyst. To the mixture was then added carboxylic anhydride as a raw material of acyl substituent to cause acylation reaction. Thereafter, the reaction product was subjected to neutralization, saponification and ripening to prepare a cellulose acylate. During this procedure, the amount of the catalyst, the kind and amount of carboxylic anhydride, the added amount of neutralizing agent, the added amount of water, the reaction temperature and the ripening temperature were properly adjusted to prepare cellulose acylates having different kinds of acyl group, substitution degrees, bulk specific gravities and polymerization degrees. The low molecular components in these cellulose acylates were then washed away with acetone.

Among the cellulose acylates thus prepared, those having an acetyl substitution degree of 2.79 and DS6/(DS2+DS3+DS6) of 0.322 were used to prepare a dope having the following formulation.

(2) Preparation of Dope

<1-1> Cellulose Acylate Solution

The following components were charged in a mixing tank where they were then stirred to make a solution which was heated to 90° C. for about 10 minutes, and then filtered through a filter paper having an average pore diameter of 34 μm and a sintered metal filter having an average pore diameter of 10 μm.

| Cellulose acylate solution | |
|---|---|
| Cellulose acylate | 100.0 parts by mass |
| Triphenyl phosphate | 8.0 parts by mass |
| Biphenyl diphenyl phosphate | 4.0 parts by mass |
| Methylene chloride | 403.0 parts by mass |
| Methanol | 65.0 parts by mass |

<1-2> Matting Agent Dispersion

Subsequently, the following composition containing the cellulose acylate solution thus prepared was charged in a dispersing machine to prepare a matting agent dispersion.

| Matting agent dispersion | |
|---|---|
| Particulate silica having average particle diameter of 16 nm ("Aerosil R972", produced by Nippon Aerosil Co., Ltd.) | 2.0 parts by mass |
| Methylene chloride | 72.4 parts by mass |
| Methanol | 10.8 parts by mass |
| Cellulose acylate solution | 10.3 parts by mass |

<1-3> Retardation Developer Solution

Subsequently, the following composition containing the cellulose acylate solution prepared above was put in a mixing tank where it was then heated with stirring to make a solution as retardation developer solution A.

| Retardation developer solution | |
|---|---|
| Retardation developer A | 15.0 parts by mass |
| Methylene chloride | 58.3 parts by mass |
| Methanol | 8.7 parts by mass |
| Cellulose acylate solution | 12.8 parts by mass |

100 parts by mass of the aforementioned cellulose acylate solution, 1.35 parts by mass of the matting agent dispersion, and a retardation developer solution in an amount such that the amount of the retardation developer A in the cellulose acylate film was 4.5 parts by mass were mixed to prepare a film-forming dope.

Retardation developer A

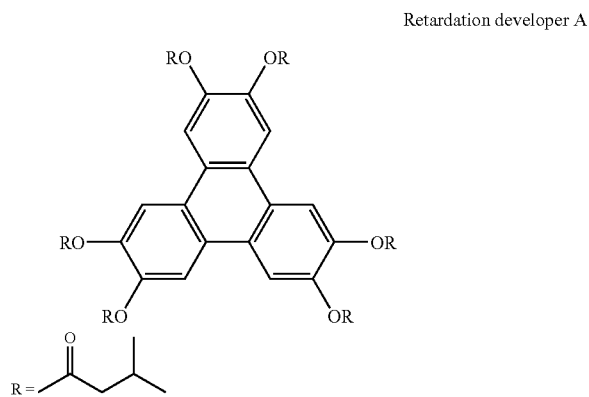

(Flow Casting)

The aforementioned dope was flow-casted using a glass sheet flow-casting device. The dope thus flow-casted was dried with hot air having a temperature of 70° C. for 6 minutes, and then peeled off the glass sheet. The film thus formed was then fixed to a frame. The film was dried with hot air having a temperature of 100° C. for 10 minutes and then with hot air having a temperature of 140° C. for 20 minutes to prepare a cellulose acylate film having a thickness of 100 μm.

The film thus obtained was then subjected to stretching and shrinkage under the conditions set forth in Table 5 while being gripped at the four sides thereof by a biaxial stretching device (produced by Toyo Seiki Seisaku-Sho, Ltd.). The stretching and shrinkage were effected under common conditions. In some detail, the film was preheated at a feed air temperature specified in the various examples for 2 minutes before these steps. Thereafter, the film was stretched in TD direction and relaxed in MD direction at the same feed air temperature. After the termination of these steps, the film was cooled with flowing air for 5 minutes while being kept gripped by the clip. MD in the table indicates the direction of flow casting during flow casting over glass sheet. TD indicates the crosswise direction perpendicular to MD. The films thus obtained were used as Films 51 to 55, respectively.

<Re and Rth of Film at Wavelength of 450 nm, 550 nm and 650 nm>

These films were each measured for Re and Rth at a wavelength of 450 nm, 550 nm and 650 nm by the method described previously using KOBRA 21ADH (produced by Ouji Scientific Instruments Co., Ltd.).

The results are set forth in Table 4. As can be seen in Table 4 below, the cellulose acylate film of the invention having an Re variation coefficient of 5% or less and an Rth variation coefficient of 10% or less can be realized by the preparation method involving both stretching and shrinking steps. It is also made obvious that the relationships (A) to (D), which are requirements of the invention, are satisfied.

TABLE 4

| Film No. | % Draw ratio | % Shrinkage factor | S/S temp. *1 | Acetyl subst. degree | Propionyl subst. degree | Butyryl subst. degree | Re (450) | Re (550) | Re (650) | Rth (450) | Rth (550) | Rth (650) |
|---|---|---|---|---|---|---|---|---|---|---|---|---|
| 51 | 33 | 10 | 175 | 2.83 | 0 | 0 | 29 | 45 | 61 | 177 | 165 | 158 |
| 52 | 33 | — | 175 | 2.83 | 0 | 0 | 40 | 44 | 50 | 168 | 160 | 157 |
| 53 | — | 10 | 175 | 2.83 | 0 | 0 | 38 | 40 | 42 | 164 | 159 | 153 |
| 54 | 33 | 10 | 165 | 1.9 | 0.8 | 0 | 34 | 50 | 64 | 180 | 170 | 160 |
| 55 | 33 | 10 | 145 | 2 | 0 | 0.7 | 36 | 51 | 67 | 183 | 172 | 162 |

| Film No. | (A) | (B) | (C) | (D) | Re v.c. *2 | Rth v.c. *3 | Remarks |
|---|---|---|---|---|---|---|---|
| 51 | 0.64 | 1.36 | 0.60 | 1.42 | 3.8 | 7.6 | Inventive |
| 52 | 0.91 | 1.14 | 0.87 | 1.16 | 6.3 | 14.5 | Comparative |
| 53 | 0.95 | 1.05 | 0.92 | 1.09 | 7.8 | 13.5 | Comparative |
| 54 | 0.68 | 1.28 | 0.64 | 1.36 | 3.5 | 5.5 | Inventive |
| 55 | 0.71 | 1.31 | 0.66 | 1.39 | 3.6 | 5.7 | Inventive |

*1 Shrinking/shrinking temperature
*2 Re variation coefficient
*3 Rth variation coefficient

Example 6

A 1.0 N solution of potassium hydroxide (solvent: water/isopropyl alcohol/propylene glycol=69.2 parts by mass/15 parts by mass/15.8 parts by mass) was spread over the cellulose acylate films 51 to 55 prepared in Example 5 at a rate of 10 cc/m², and then kept at about 40° C. for 30 seconds. Thereafter, the alkaline solution was scratched off the coat film. The coated film was washed with purified water. Water droplets were then blown off the coated film with air from an air knife. Thereafter, the coated film was dried at 100° C. for 18 seconds.

The alkali-treated surface of the film was then measured for contact angle with respect to purified water. The result was 40°.

(Formation of Alignment Film)

An alignment film coating solution having the following formulation was spread over the alkali-treated surface of the film at a rate of 28 ml/m² using a #16 wire bar coater. The coated film was then dried with 60° C. hot air for 60 seconds and then with 90° C. hot air for 150 seconds to form an alignment film.

| Formulation of alignment film coating solution | |
|---|---|
| Modified polyvinyl alcohol shown below | 10 parts by mass |
| Water | 371 parts by mass |
| Methanol | 119 parts by mass |
| Glutaraldehyde (crosslinking agent) | 0.5 parts by mass |
| Citric acid ester (AS3, produced by Sankyo Chemical Co., Ltd.) | 0.35 parts by mass |

Modified polyvinyl alcohol

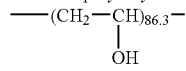
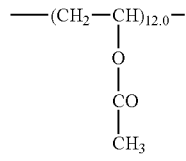
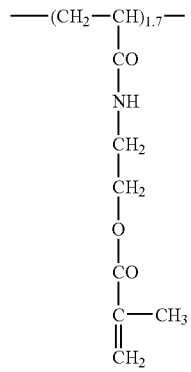

(Rubbing)

The transparent support having an alignment film formed thereon was subjected to rubbing on the alignment film surface thereof while being conveyed at a rate of 20 m/min with a rubbing roll (diameter: 300 mm) being rotated at 650 rpm. The rubbing roll had been arranged such that rubbing is effected at an angle of 45° from the longitudinal direction. The length of contact of the rubbing roll with the transparent support was 18 mm.

(Formation of Optically Anisotropic Layer)

35.03 kg of the following discotic liquid crystal compound, 4.35 kg of an ethylene oxide-modified trimethylolpropane triacrylate (V#360, produced by OSAKA ORGANIC CHEMICAL INDUSTRY LTD.), 0.35 kg of cellulose acetate butyrate (CAB531-1, produced by Eastman Chemical Co., Ltd.), 1.31 kg of a photopolymerization initiator (Irgacure 907, produced by Nihon Ciba-Geigy K.K.) and 0.47 kg of a sensitizer (Kayacure DETX, produced by Nippon Kayaku Corporation) were dissolved in 102 kg of methyl ethyl ketone. To the solution thus prepared was then added 0.1 kg of a fluoroaliphatic group-containing copolymer (Megafac F780, produced by DAINIPPON INK AND CHEMICALS, INCORPORATED) to prepare a coating solution. The coating solution thus prepared was then continuously spread over the alignment film surface of the film which was being conveyed at a rate of 20 m/min using a #3.2 wire bar which was being rotated at 391 rpm in the same direction as the conveying direction of the film.

Discotic liquid crystal compound

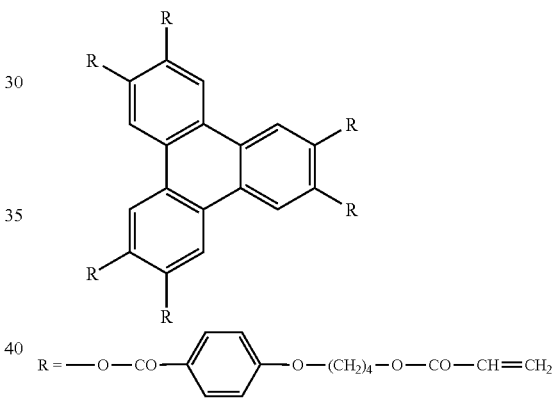

The film was continuously heated from room temperature to 100° C. so that the solvent was dried up. Thereafter, the film was dried in a 130° C. drying zone for about 90 seconds such that the wind velocity on the surface of the discotic liquid crystal compound reached 2.5 m/sec to align the discotic liquid crystal compound. Subsequently, the film was conveyed to a 80° C. drying zone where it was then irradiated with ultraviolet rays having an illuminance of 600 mW from an ultraviolet radiator (ultraviolet lamp: output of 160 W/cm; emission wavelength: 1.6 m) for 4 seconds with the surface temperature of the film kept at about 100° C. so that the crosslinking reaction was allowed to proceed to fix the discotic liquid crystal compound thus aligned. Thereafter, the film was allowed to cool to room temperature where it was cylindrically wound up to form a roll. Thus, a rolled optically compensatory film was prepared.

The optically anisotropic layer was then measured for viscosity at a film surface temperature of 127° C. The result was 695 cp. For the measurement of viscosity of optically anisotropic layer, a liquid crystal layer having the same formulation as that of the optically anisotropic layer (excluding solvent) was measured by a heated E type viscometer.

The rolled optically compensatory film thus prepared was partly cut out to prepare a sample which was then measured for optical properties. Retardation value of the optically anisotropic layer measured at a wavelength of 546 nm was 35 nm. The angle (angle of inclination) of the disc surface of the discotic liquid crystal compound with respect to the surface of the support in the optically anisotropic layer showed a continuous change in the layer depth direction and was 28° on the average. Further, only the optically anisotropic layer was peeled off the sample. The optically anisotropic layer thus peeled was then measured for average direction of molecular symmetric axes. As a result, the average direction of molecular symmetric axes was 45° with respect to the longitudinal direction of the optically compensatory film.

(Mounting Evaluation on OCB Panel)

These cellulose acylate film samples were each then worked into a polarizing plate in the same manner as in Example 1.

mode attained by 2 V for white display and 5 V for black display. With the application of a voltage by which the front transmission is minimum, i.e., black voltage, the color developed as viewed at front ways and the color shift Δx developed as viewed at viewing angles in the direction of an azimuthal angle of 0° to 90° and a polar angle of 60° were then determined. The results are set forth in Table 5 below. The results are represented according to the following ranks. Color shift during black display (Δx: maximum at an azimuthal angle of from 0° to 90°)

E: Less than 0.02
G: 0.02 to 0.04
F: 0.04 to 0.06
P: 0.06 or more

TABLE 5

| Polarizing plate No. | Used film No. | Δx | % D.R. *1 | % S.F. *2 | S/S temp *3 | Ac sub deg *4 | Pro sub deg *5 | Bu Sub deg *6 | Re (450) | Re (550) | Re (650) | Rth (450) | Rth (550) | Rth (650) |
|---|---|---|---|---|---|---|---|---|---|---|---|---|---|---|
| 61 | 51 | E | 33 | 10 | 175 | 2.83 | 0 | 0 | 29 | 45 | 61 | 177 | 165 | 158 |
| 62 | 52 | P | 33 | — | 175 | 2.83 | 0 | 0 | 40 | 44 | 50 | 168 | 160 | 157 |
| 63 | 53 | F | — | 10 | 175 | 2.83 | 0 | 0 | 38 | 40 | 42 | 164 | 159 | 153 |
| 64 | 54 | E | 33 | 10 | 165 | 1.9 | 0.8 | 0 | 34 | 50 | 64 | 180 | 170 | 160 |
| 65 | 55 | E | 33 | 10 | 145 | 2 | 0 | 0.7 | 36 | 51 | 67 | 183 | 172 | 162 |

| Polarizing plate No. | (A) | (B) | (C) | (D) | Re vc *7 | Rth vc *8 | Re. *9 |
|---|---|---|---|---|---|---|---|
| 61 | 0.64 | 1.36 | 0.60 | 1.42 | 3.8 | 7.6 | Inventive |
| 62 | 0.91 | 1.14 | 0.87 | 1.16 | 6.3 | 14.5 | Comparative |
| 63 | 0.95 | 1.05 | 0.92 | 1.09 | 7.8 | 13.5 | Comparative |
| 64 | 0.68 | 1.28 | 0.64 | 1.36 | 3.5 | 5.5 | Inventive |
| 65 | 0.71 | 1.31 | 0.66 | 1.39 | 3.6 | 5.7 | Inventive |

*1 % Draw ratio
*2 % Shrinking factor
*3 Stretching/shrinking temperature
*4 Acetyl substitution degree
*5 Propionyl substitution degree
*6 Butyryl substitution degree
*7 Re variation coefficient
*8 Rth variation coefficient
*9 Remarks
Note:
Re and Rth values are measured on support.

<Mounting Evaluation on Liquid Crystal Display Device>

(Preparation of bend-aligned liquid crystal cell) A polyimide film was provided as an alignment film on a glass substrate with ITO electrode. The alignment film was subjected to rubbing. Two sheets of the glass substrates thus obtained were laminated on each other in such an arrangement that the rubbing direction of the two sheets are parallel to each other. The cell gap was predetermined to be 4.7 μm. Into the cell gap was then injected a liquid crystal compound having Δn of 0.1396 "ZLI1132" (produced by Melc Co., Ltd.) to prepare a bend-aligned liquid crystal cell.

Two sheets of the polarizing plates prepared above were laminated on each other with the aforementioned bend-aligned cell interposed therebetween. Arrangement was made such that the film thus formed was opposed to the cell substrate and the rubbing direction of the liquid crystal cell and the rubbing direction of the other optically anisotropic layer opposed to the liquid crystal cell were not parallel to each other.

A 55 Hz rectangular voltage was applied to the liquid crystal cell. The liquid crystal cell was of normally white As can be seen in Table 5, the use of the film of the invention makes it possible to obtain a high fidelity liquid crystal display device having a small color shift change.

The invention has been worked out on the basis of the knowledge obtained as a result of the inventors' extensive studies. In the invention, materials and production methods are properly selected to control the wavelength dispersion of in-plane retardation and thickness direction retardation of optical resin film independently of each other. Thus, optimum optical value of the optical resin film can be determined, allowing viewing angle compensation of liquid crystal cell, particularly of VA mode, in black state over all wavelength ranges. As a result, the liquid crystal display device of the invention is subject to light leakage in oblique direction during black display and thus shows a remarkably enhanced viewing angle contrast. Further, the liquid crystal display device of the invention can inhibit light leakage in oblique direction during black display substantially over the visible light wavelength range and thus exhibits drastic reduction of color shift during black display dependent on viewing angle, which has heretofore been a problem to be solved. Accordingly, the invention can provide an optical resin film which exhibits a high contrast ratio over a wide range and can inhibit color shift and a polarizing plate and a liquid crystal display device comprising same.

The entire disclosure of each and every foreign patent application from which the benefit of foreign priority has been claimed in the present application is incorporated herein by reference, as if fully set forth.

What is claimed is:

1. An optical resin film, which has Re ($\lambda$) and Rth ($\lambda$) satisfying retardation requirements (A) to (D), and has an in-plane width direction retardation (Re) variation coefficient of 5% or less and a thickness direction retardation (Rth) variation coefficient of 10% or less:
   (A) $0.1 < Re(450)/Re(550) < 0.95$
   (B) $1.03 < Re(650)/Re(550) < 1.93$
   (C) $0.4 < (Re/Rth(450))/(Re/Rth(550)) < 0.95$
   (D) $1.05 < (Re/Rth(650))/(Re/Rth(550)) < 1.9$
   wherein Re ($\lambda$) represents an in-plane retardation value of the optical resin film with respect to light having a wavelength of $\lambda$ nm;
   Rth ($\lambda$) represents a thickness direction retardation value of the optical resin film with respect to light having a wavelength of $\lambda$ nm; and
   Re/Rth ($\lambda$) represents a ratio of an in-plane retardation value to a thickness direction retardation value of the optical resin film with respect to light having a wavelength of $\lambda$ nm (unit: nm).

2. The optical resin film according to claim 1, which comprises a cellulose acylate film.

3. The optical resin film according to claim 1, which comprises at least one selected from the group consisting of plasticizer, ultraviolet absorber, peel accelerator, dye and matting agent.

4. The optical resin film according to claim 1, which comprises at least one retardation developer comprising a rod-shaped compound or a discotic compound.

5. A polarizing plate comprising:
   a polarizer having a polyvinyl alcohol; and
   at least two protective films provided on both sides of the polarizer,
   wherein at least one of the at least two protective films is an optical resin film according to claim 1.

6. The polarizing plate according to claim 5, which further comprises at least one layer selected from the group consisting of a hard coat layer, an anti-glare layer and an anti-reflection layer provided on a surface of one of the at least two protective films.

7. The polarizing plate according to claim 5, which further comprises an optically anisotropic layer provided on at least one of the at least two protective films.

8. A liquid crystal display device comprising a polarizing plate according to claim 5.

* * * * *